US012527770B2

(12) United States Patent
Shudo et al.

(10) Patent No.: US 12,527,770 B2
(45) Date of Patent: Jan. 20, 2026

(54) METHODS OF MANAGING PAIN USING DEXMEDETOMIDINE TRANSDERMAL DELIVERY DEVICES

(71) Applicant: Teikoku Pharma USA, Inc., San Jose, CA (US)

(72) Inventors: Jutaro Shudo, San Jose, CA (US); Wan-Ning Song, San Jose, CA (US); Rose Marie Gonsalves, Santa Clara, CA (US); Stephen Shipping Hwang, Palo Alto, CA (US)

(73) Assignee: Teikoku Pharma USA, Inc., San Jose, CA (US)

( * ) Notice: Subject to any disclaimer, the term of this patent is extended or adjusted under 35 U.S.C. 154(b) by 0 days.

(21) Appl. No.: 15/799,602

(22) Filed: Oct. 31, 2017

(65) Prior Publication Data

US 2018/0117012 A1 May 3, 2018

Related U.S. Application Data

(60) Provisional application No. 62/547,582, filed on Aug. 18, 2017, provisional application No. 62/415,248, filed on Oct. 31, 2016.

(51) Int. Cl.
*A61K 31/4174* (2006.01)
*A61K 9/70* (2006.01)
(Continued)

(52) U.S. Cl.
CPC ........ *A61K 31/4174* (2013.01); *A61K 9/7038* (2013.01); *A61K 9/7053* (2013.01);
(Continued)

(58) Field of Classification Search
None
See application file for complete search history.

(56) References Cited

U.S. PATENT DOCUMENTS 4,544,664 A 10/1985 Karjalainen et al.
4,994,267 A 2/1991 Sablotsky
(Continued)

FOREIGN PATENT DOCUMENTS

CN 1049450 A 2/1991
CN 1994290 A 7/2007
(Continued)

OTHER PUBLICATIONS

"DURO-TAK and GELVA Transdermal Pressure Sensitive Adhesives". (Year: 2013).*
(Continued)

*Primary Examiner* — Isis A Ghali
(74) *Attorney, Agent, or Firm* — Miho Kaneko; Carl Morales; Goodwin Procter LLP

(57) ABSTRACT

Aspects of the invention include methods of managing pain in a subject by applying a transdermal delivery device containing a dexmedetomidine composition formulated to deliver a pain relieving effective amount of dexmedetomidine to a subject. In practicing methods according to certain embodiments, a transdermal delivery device having a dexmedetomidine composition is applied to a subject and is maintained in contact with the subject in a manner sufficient to deliver an amount of dexmedetomidine effective to manage pain in the subject. In some embodiments, methods include hydrating the subject, such as by administering a hydration fluid composition to the subject. Methods according to certain embodiments may also include co-administering an opioid to the subject. Also provided is a transdermal delivery device configured to deliver dexmedetomidine sufficient for practicing the subject methods, as well as kits containing the transdermal delivery device.

19 Claims, 29 Drawing Sheets

(51) Int. Cl.
  *A61K 45/06* (2006.01)
  *A61P 29/00* (2006.01)
(52) U.S. Cl.
  CPC ............ *A61K 9/7061* (2013.01); *A61P 29/00* (2018.01); *A61K 45/06* (2013.01)

(56) References Cited

U.S. PATENT DOCUMENTS

| | | | |
|---|---|---|---|
| 5,091,402 A | 2/1992 | Kalso et al. |
| 5,124,157 A | 6/1992 | Colley et al. |
| 5,176,916 A | 1/1993 | Yamanaka et al. |
| 5,217,718 A | 6/1993 | Colley et al. |
| 5,304,569 A | 4/1994 | Lammintausta et al. |
| 5,352,456 A | 10/1994 | Fallon et al. |
| 5,438,067 A | 8/1995 | Jalonen et al. |
| 5,447,947 A | 9/1995 | Campbell |
| 5,712,301 A | 1/1998 | Jaatinen et al. |
| 5,817,332 A | 10/1998 | Urtti et al. |
| 5,891,461 A | 4/1999 | Jona et al. |
| 5,994,384 A | 11/1999 | Akerman et al. |
| 6,071,531 A | 6/2000 | Jona et al. |
| 6,329,369 B1 | 12/2001 | Chow et al. |
| 6,562,363 B1 | 5/2003 | Mantell et al. |
| 6,689,379 B1 | 2/2004 | Bracht |
| 7,001,609 B1 | 2/2006 | Matson et al. |
| 7,097,853 B1 | 8/2006 | Garbe et al. |
| 7,722,897 B2 | 5/2010 | Dupont et al. |
| 7,838,563 B2 | 11/2010 | DeJovin et al. |
| 8,011,146 B2 | 9/2011 | Krause |
| 8,017,146 B2 | 9/2011 | Stefano et al. |
| 8,114,090 B2 | 2/2012 | Kertzner et al. |
| 8,114,898 B2 | 2/2012 | Shanler et al. |
| 8,242,158 B1 | 8/2012 | Roychowdhury et al. |
| 8,563,031 B2 | 10/2013 | Wang et al. |
| 8,669,233 B2 | 3/2014 | Jomard et al. |
| 8,673,953 B2 | 3/2014 | Shanler et al. |
| 8,703,175 B2 | 4/2014 | Kanios et al. |
| 9,974,754 B2 | 5/2018 | Yamazaki et al. |
| 10,772,871 B2 | 9/2020 | Pongpeerapat et al. |
| 10,874,642 B2 | 12/2020 | Pongpeerapat et al. |
| 10,987,342 B2 | 4/2021 | Pongpeerapat et al. |
| 2001/0053777 A1 | 12/2001 | Brecht |
| 2002/0016319 A1 | 2/2002 | Olney et al. |
| 2002/0020600 A1 | 2/2002 | Reik et al. |
| 2002/0044966 A1 | 4/2002 | Bartholomaeus et al. |
| 2002/0068754 A1 | 6/2002 | Olney et al. |
| 2002/0102291 A1 | 8/2002 | Mantelle et al. |
| 2002/0177592 A1 | 11/2002 | Olney et al. |
| 2003/0170195 A1 | 9/2003 | Houze et al. |
| 2004/0209907 A1 | 10/2004 | Franklin |
| 2005/0020600 A1 | 1/2005 | Scherer |
| 2005/0042173 A1 | 2/2005 | Besse et al. |
| 2005/0042194 A1 | 2/2005 | Ng et al. |
| 2005/0058696 A1 | 3/2005 | Donello et al. |
| 2005/0059664 A1 | 3/2005 | Gil et al. |
| 2005/0059744 A1 | 3/2005 | Donello et al. |
| 2005/0208116 A1* | 9/2005 | Stefano .............. A61K 9/7061 424/449 |
| 2006/0210613 A1 | 9/2006 | Carliss |
| 2006/0240086 A1 | 10/2006 | Tateishi et al. |
| 2006/0264515 A1 | 11/2006 | Dejovin et al. |
| 2007/0098771 A1 | 5/2007 | Audett et al. |
| 2007/0134310 A1 | 6/2007 | Nedberge et al. |
| 2007/0161543 A1 | 7/2007 | Yu et al. |
| 2007/0207222 A1 | 9/2007 | Yu et al. |
| 2009/0041832 A1 | 2/2009 | Govil et al. |
| 2009/0098191 A1 | 4/2009 | Anderson et al. |
| 2009/0130027 A1 | 5/2009 | Shanler et al. |
| 2009/0258063 A1 | 10/2009 | Udagawa et al. |
| 2009/0285877 A1 | 11/2009 | Yasukochi et al. |
| 2010/0081669 A1 | 4/2010 | Yang et al. |
| 2010/0196286 A1 | 8/2010 | Armer et al. |
| 2010/0197694 A1 | 8/2010 | Horn |
| 2010/0202979 A1 | 8/2010 | Horn |
| 2010/0305160 A1 | 12/2010 | Brummett |
| 2011/0244058 A1 | 10/2011 | Horn |
| 2011/0257188 A1 | 10/2011 | Horn |
| 2011/0263542 A1 | 10/2011 | Gulati |
| 2011/0264028 A1 | 10/2011 | Ramdas et al. |
| 2012/0095104 A1 | 4/2012 | Zachar |
| 2012/0202864 A1 | 8/2012 | Horn |
| 2012/0309720 A1 | 12/2012 | Horn |
| 2013/0072532 A1 | 3/2013 | Henwood et al. |
| 2013/0172428 A1 | 7/2013 | Audett et al. |
| 2013/0211351 A1 | 8/2013 | Fuhrherr et al. |
| 2013/0237576 A1 | 9/2013 | Roychowdhury et al. |
| 2013/0331803 A1 | 12/2013 | Fleschhut et al. |
| 2014/0037710 A1 | 2/2014 | Hashimoto et al. |
| 2014/0155446 A1 | 6/2014 | Roychowdhury et al. |
| 2014/0343160 A1 | 11/2014 | Govil et al. |
| 2015/0044148 A1 | 2/2015 | Scherer |
| 2015/0098980 A1 | 4/2015 | Pongpeerapat et al. |
| 2015/0098981 A1 | 4/2015 | Pongpeerapat et al. |
| 2015/0098982 A1 | 4/2015 | Pongpeerapat et al. |
| 2015/0098983 A1 | 4/2015 | Pongpeerapat et al. |
| 2015/0098997 A1 | 4/2015 | Pongpeerapat et al. |
| 2018/0117012 A1 | 5/2018 | Shudo et al. |
| 2020/0093800 A1 | 3/2020 | Pongpeerapat et al. |
| 2022/0202781 A1 | 6/2022 | Uchitomi et al. |
| 2024/0245652 A1 | 7/2024 | Pongpeerapat et al. |
| 2024/0342110 A1 | 10/2024 | Liu et al. |
| 2025/0099399 A1 | 3/2025 | Song et al. |

FOREIGN PATENT DOCUMENTS

| | | |
|---|---|---|
| CN | 102753169 A | 10/2012 |
| CN | 102970986 A | 3/2013 |
| CN | 116098876 A | 5/2023 |
| DE | 19938823 A1 | 2/2001 |
| EA | 200501166 A1 | 2/2006 |
| EA | 14504 B1 | 12/2010 |
| EP | 0072615 B1 | 12/1985 |
| EP | 270267 A2 | 6/1988 |
| EP | 0413487 A1 | 2/1991 |
| EP | 0187471 B1 | 7/1991 |
| EP | 452837 A2 | 10/1991 |
| EP | 0300652 B1 | 1/1992 |
| EP | 0424059 B1 | 3/1993 |
| EP | 0331374 B1 | 2/1994 |
| EP | 0413487 B1 | 5/1995 |
| EP | 0680754 A2 | 11/1995 |
| EP | 0587819 B1 | 2/1997 |
| EP | 818470 A1 | 1/1998 |
| EP | 1329225 A2 | 7/2003 |
| EP | 0517850 B1 | 11/2003 |
| EP | 1444977 A1 | 8/2004 |
| EP | 1227807 B1 | 3/2005 |
| EP | 1069893 B1 | 12/2006 |
| EP | 2165706 A1 | 3/2010 |
| EP | 2363147 A1 | 9/2011 |
| EP | 2370136 A1 | 10/2011 |
| EP | 2395997 A1 | 12/2011 |
| EP | 2429521 A2 | 3/2012 |
| EP | 2481412 A1 | 8/2012 |
| EP | 2481747 A1 | 8/2012 |
| EP | 2521544 A2 | 11/2012 |
| EP | 2696874 A2 | 2/2014 |
| EP | 2815748 A1 | 12/2014 |
| EP | 2890376 A1 | 7/2015 |
| GB | 2290964 A | 1/1996 |
| JP | S60163811 A | 8/1985 |
| JP | H01-294623 A | 11/1989 |
| JP | H041127 A | 1/1992 |
| JP | H05503916 A | 6/1993 |
| JP | H06507888 A | 9/1994 |
| JP | H776526 A | 3/1995 |
| JP | H07-304672 A | 11/1995 |
| JP | 2003-526680 A | 9/2003 |
| JP | 2007-505113 A | 3/2007 |
| JP | 2011-518180 A | 6/2011 |
| JP | 2011-524345 A | 9/2011 |
| JP | 2011529490 A | 12/2011 |
| JP | 2012-158521 A | 8/2012 |
| JP | 2016-504359 A | 2/2016 |

(56) References Cited

FOREIGN PATENT DOCUMENTS

| | | |
|---|---|---|
| JP | 2016-532645 A | 10/2016 |
| JP | 2019-534288 A | 11/2019 |
| KR | 10-2001-0075528 A | 8/2001 |
| KR | 10-2016-0062159 A | 6/2016 |
| TW | 187070 A1 | 7/1992 |
| TW | 200732001 A | 9/2007 |
| TW | 200738645 A2 | 10/2007 |
| TW | 201332546 A | 8/2013 |
| WO | WO9102505 A1 | 3/1991 |
| WO | WO9307842 A1 | 4/1993 |
| WO | WO9325199 A1 | 12/1993 |
| WO | WO9601626 A1 | 1/1996 |
| WO | WO9610429 A2 | 4/1996 |
| WO | WO9949854 A2 | 10/1999 |
| WO | WO0019987 A1 | 4/2000 |
| WO | WO0023066 A2 | 4/2000 |
| WO | WO0041681 A2 | 7/2000 |
| WO | WO0076545 A1 | 12/2000 |
| WO | WO0147512 A2 | 7/2001 |
| WO | WO 01/68140 A2 | 9/2001 |
| WO | WO0189448 A2 | 11/2001 |
| WO | WO2004032927 A1 | 4/2004 |
| WO | WO2004080468 A1 | 9/2004 |
| WO | WO2006034343 A2 | 3/2006 |
| WO | WO2006074114 A2 | 7/2006 |
| WO | WO2007050369 A1 | 5/2007 |
| WO | WO2007085556 A2 | 8/2007 |
| WO | WO2007100775 A2 | 9/2007 |
| WO | WO2008059190 A1 | 5/2008 |
| WO | WO 2009/129437 A2 | 10/2009 |
| WO | WO2009124755 A1 | 10/2009 |
| WO | WO 2009/148613 A1 | 12/2009 |
| WO | 2010/031819 A1 | 3/2010 |
| WO | WO2010050211 A1 | 5/2010 |
| WO | WO2010063030 A2 | 6/2010 |
| WO | WO2010065547 A1 | 6/2010 |
| WO | WO2010092312 A1 | 8/2010 |
| WO | 2010/132882 A2 | 11/2010 |
| WO | WO2011070069 A1 | 6/2011 |
| WO | WO2011085162 A2 | 7/2011 |
| WO | WO2011127586 A1 | 10/2011 |
| WO | WO2011133212 A1 | 10/2011 |
| WO | WO2012065740 A1 | 5/2012 |
| WO | WO2012097197 A1 | 7/2012 |
| WO | WO2012142372 A2 | 10/2012 |
| WO | WO2012144405 A1 | 10/2012 |
| WO | WO2013055528 A1 | 4/2013 |
| WO | WO2013072763 A2 | 5/2013 |
| WO | WO2013090278 A2 | 6/2013 |
| WO | WO2013173317 A1 | 11/2013 |
| WO | WO2014035446 A1 | 3/2014 |
| WO | WO2014076453 A1 | 5/2014 |
| WO | WO 2014/105480 A1 | 7/2014 |
| WO | WO 2015/054062 A2 | 4/2015 |
| WO | WO2015093503 A1 | 6/2015 |
| WO | WO2016105449 A1 | 6/2016 |
| WO | 2018/081812 A2 | 5/2018 |
| WO | 2023/025095 A1 | 3/2023 |

OTHER PUBLICATIONS

Barry et al. "Prevention of Surgical Oliguria and Renal-Hemodynamic Suppression by Sustained Hydration", The New England Journal of Medicine. (Year: 1964).*

Weinbroum et al. (Dextromethorphan and Dexmedetomidine: New Agents for the Control of Perioperative Pain); Eur J Surg 2001; 167: 563-569. (Year: 2001).*

Kivisto et al.("Pharmacokinetics and pharmacodynamics of transdermal dexmedetomidine", European Journal of Clinical Pharmacology, 46:345-349 (Year: 1994).*

Baddigam et al., Dexmedetomidine in the treatment of withdrawal syndromes in cardiothoracic surgery patients, J Intensive Care Med (2005), 20(2):118-123.

Cheung et al., Analgesic and sedative effects of intranasal dexmedetomidine in third molar surgery under local anaesthesia, Br J Anaesth. Sep. 2011;107(3):430-7.

Demuro et al., Use of dexmedetomidine for the treatment of alcohol withdrawal syndrome in critically ill patients: a retrospective case series, J Anesth (2012), 26(4):601-605.

Ebert et al., The effects of increasing plasma concentrations of dexmedetomidine in humans, Anesthesiology. Aug. 2000;93(2):382-94.

Finkel et al., The Use of Dexmedetomidine to Facilitate Opioid and Benzodiazepine Detoxification in an Infant, Anesth Analg (2004), 98(6):1658-1659.

Hadgraft, Transdermal Drug Delivery Systems, CRC Press 2002, p. 306, 307, 309 and 317.

Hayashi et al., P1-2 Two Cases with Use of Dexmedetomidine (Precedex) for Palliative Care, Japanese Society for Palliative Medicine, Congress Program vol. 18, p. 368 (2013).

Huang et al., Topical/Transdermal Drug Delivery System for Natural Antioxidants: Resveratrol and Soy Isoflavones, Journal of Chang Gung Institute of Technology (2009), 11:1-10.

Kamibayashi et al., Clinical uses of alpha2 -adrenergic agonists, Anesthesiology. Nov. 2000;93(5):1345-9.

Kanwaljeet et al., Tolerance and Withdrawal From Prolonged Opioid Use in Critically Ill Children, Pediatrics (2010), 125(5): e1208-e1225.

Kivistö et al., Pharmacokinetics and pharmacodynamics of transdermal dexmedetomidine, Eur J Clin Pharmacol. 1994;46(4):345-9.

Li et al., Topical Delivery of Breviscapine-loaded Cataplasma, Journal of Liaoning University of TCM (2012), 14(9):45-47.

Maccioli, Dexmedetomidine to Facilitate Drug Withdrawal, Anesthesiology 2003, 98:575-7.

Muzyk et al., Dexmedetomidine for the treatment of alcohol withdrawal syndrome: rationale and current status of research, CNS Drugs. Nov. 2013;27(11):913-20.

Oschman et al., Dexmedetomidine for opioid and benzodiazepine withdrawal in pediatric patients, Am J Health Syst Pharm (2011), 68(13):1233-1238.

Owens, A Clinical Overview of Sleep and Attention-Deficit/Hyperactivity Disorder in Children and Adolescents, J Can Acad Child Adolesc Psychiatry (2009), 18(2): 92-102.

Phan et al., Clinical uses of dexmedetomidine in pediatric patients, Paediatr Drugs. 2008; 10(1):49-69.

Precedex® Dosing for Intensive Care Setting Sedation,www.precedex.com, 4 pages.

Ramsay, How to use the Ramsay Score to assess the level of ICU Sedation, Article, Conscious Sedation Consulting.

Smith et al., Alpha2 receptors and agonists in pain management, Current Opinion in Anaesthesiology (2001), 14:513-518.

Stern et al., Current approaches to the recognition and treatment of alcohol withdrawal and delirium tremens: "old wine in new bottles" or "new wine in old bottles", Prim Care Companion J Clin Psychiatry. 2010;12(3). pii: PCC.10r00991. doi: 10.4088/PCC.10r00991ecr, 14 pages.

Taghizadeh et al., A statistical experimental design approach to evaluate the influence of various penetration enhancers on transdermal drug delivery of buprenorphine, Journal of Advanced Research (2014), 6(2):155-162, Accepted manuscript.

Tan et al., Pressure-sensitive adhesives for transdermal drug delivery systems, Pharm Sci Technolo Today. Feb. 1999;2(2):60-69.

Zhang et al., In vitro enhancement of lactate esters on the percutaneous penetration of drugs with different lipophilicity, AAPS PharmSciTech. Jun. 2010;11(2):894-903.

Dexmedetomidine Transdermal System (DMTS) for Post-Operative Analgesia Following Bunionectomy (DMTS), Study Details for Clinical Trial NCT02953054, First Posted on Nov. 2, 2016, 8 pages.

Non-Opioid Pain Management Patch in Bunionectomy Surgery, PR Newswire, Aug. 22, 2017, 3 pages.

Kim et al., Effect of vehicles and pressure sensitive adhesives on the permeation of tacrine across hairless mouse skin, Int J Pharm. Feb. 25, 2000;196(1):105-13.

(56) References Cited

OTHER PUBLICATIONS

Daniels et al., Efficacy and safety of oxycodone HCl/niacin tablets for the treatment of moderate-to-severe postoperative pain following bunionectomy surgery, Curr Med Res Opin. Mar. 2011;27(3):593-603, Abstract Only.

Soto et al., Analgesic effect of intra-articularly administered morphine, dexmedetomidine, or a morphine-dexmedetomidine combination immediately following stifle joint surgery in dogs, J Am Vet Med Assoc. Jun. 1, 2014;244 (11):1291-7, Abstract Only.

Tang et al., Dexmedetomidine in perioperative acute pain management: a non-opioid adjuvant analgesic, J Pain Res. Aug. 11, 2017;10:1899-1904.

Lundorf et al., Perioperative dexmedetomidine for acute pain after abdominal surgery in adults, Cochrane Database Syst Rev. Feb. 18, 2016;2:CD010358.

Wang et al., Effect of Oxycodone Combined With Dexmedetomidine for Intravenous Patient-Controlled Analgesia After Video-Assisted Thoracoscopic Lobectomy, Journal of Cardiothoracic and Vascular Anesthesia, vol. 30, No. 4 (Aug. 2016): pp. 1015-1021.

Taiji, New sedative in intensive care, Dexmedetomidine hydrochloride (Precedex), its pharmacological characteristics and clinical study result, Sep. 2004Folia Pharmacologica Japonica 124(3):171-9; Abstract.

Momotaro's Pain Clinic, "Neuropathic Pain", [online], searched on Mar. 8, 2023, https://www.momotarou-painclinic.com/sick/reason/pain23.html (a well-known technique to show neuropathic pain): English abstract enclosed.

Kunisawa, T. "Pharmacokinetics and Pharmacodynamics of Dexmedetomidine." The Journal of Japan Society for Clinical Anesthesia, vol. 30, No. 2, 2010, pp. 181-189, (with English abstract).

Morrison et al. Organic Chemistry, Allyn and Bacon, Inc., 1959, p. 444.

PCT International Search Report and Written Opinion, PCT Application No. PCT/US2014/059057, mailed Apr. 21, 2016, 6 pages.

Cho et al., "Enhancement of percutaneous absorption of ketoprofen: effect of vehicles and adhesive matrix", International Journal of Pharmaceutics 169 (1998) 95-104.

Robert Thornton Morrison & Robert Neilson Boyd, Organic Chemistry 444 (Allyn and Bacon, Inc.) (Year: 1959).

PCT International Search Report and Written Opinion, PCT Application No. PCT/US2024/045404, Nov. 26, 2024, 71 pages.

\* cited by examiner

METHODS OF MANAGING PAIN USING DEXMEDETOMIDINE TRANSDERMAL DELIVERY DEVICES

CROSS REFERENCE To RELATED APPLICATIONS

Pursuant to 35 U.S.C. § 119(e), this application claims priority to the filing date of U.S. Provisional Patent Application Ser. No. 62/415,248, filed Oct. 31, 2016 and U.S. Provisional Patent Application Ser. No. 62/547,582 filed Aug. 18, 2017; the disclosures of which applications are herein incorporated by reference.

INTRODUCTION

Pain is the most common reason for physician consultation in the United States. Pain is the unpleasant sensory and emotional experience associated with actual or potential tissue, bone, nerve or cellular damage. Most pain resolves promptly once the painful stimulus is removed and the body has healed, but sometimes pain persists despite removal of the stimulus and apparent healing of the body. (Foye's Principles of Medicinal Chemistry (Seventh Edition, 2013), page 660)

In the United States, about twenty million surgical procedures are performed under general anesthesia each year. Surgical pain or pain that occurs after surgery or traumatic injury is a serious and often intractable medical problem. Pain is usually localized within the vicinity of the surgical site. Surgical pain can have two clinically important aspects, namely resting pain, or pain that occurs when the patient is not moving and mechanical pain which is exacerbated by movement (coughing/sneezing, getting out of bed, physiotherapy, etc.). The major problem with surgical pain management for major surgery is that the drugs currently used have a variety of prominent side effects.

Dexmedetomidine is the S-enantiomer of medetomidine and is an agonist of $\alpha_2$-adrenergic receptors that is used as a sedative medication in intensive care units and by anesthetists for intubated and nonintubated patients requiring sedation for surgery or short term procedures. The $\alpha_2$-adrenergic receptor is a G-protein coupled receptor associated with the $G_i$ heterotrimeric G-protein that includes three highly homologous subtypes, including $\alpha_{2a}$, $\alpha_{2b}$ and $\alpha_{2c}$-adrenergic receptors. Agonists of the $a_2$-adrenergic receptor are implicated in sedation, muscle relaxation and analgesia through effects on the central nervous system.

Dexmedetomidine is used in clinical settings as a sedative through intravenous administration and thus, requires close supervision by a health care professional in a hospital setting. Dexmedetomidine is currently employed for sedation of intubated or mechanically ventilated subjects during treatment in an intensive care setting as well as for sedation of non-intubated subjects prior to and/or during non-surgical procedures.

SUMMARY

Aspects of the invention include methods of managing pain in a subject by applying a transdermal delivery device containing a dexmedetomidine composition formulated to deliver a pain relieving effective amount of dexmedetomidine to a subject. In practicing methods according to certain embodiments, a transdermal delivery device having a dexmedetomidine composition is applied to a subject and is maintained in contact with the subject in a manner sufficient to deliver an amount of dexmedetomidine effective to manage pain in the subject. In some embodiments, methods include hydrating the subject. Methods according to certain embodiments may also include co-administering an opioid to the subject. Also provided is a transdermal delivery device configured to deliver dexmedetomidine sufficient for practicing the subject methods, as well as kits containing the transdermal delivery device.

BRIEF DESCRIPTION OF THE FIGURES

FIG. 2, Panel B shows an example of a plot of average dexmedetomidine flux as a function of transdermal delivery device application time for a dexmedetomidine transdermal composition having a non-functionalized acrylate adhesive according to one embodiment. FIG. 2, Panel C shows an example of dexmedetomidine utilization with time according to one embodiment.

DETAILED DESCRIPTION

Figure 1:
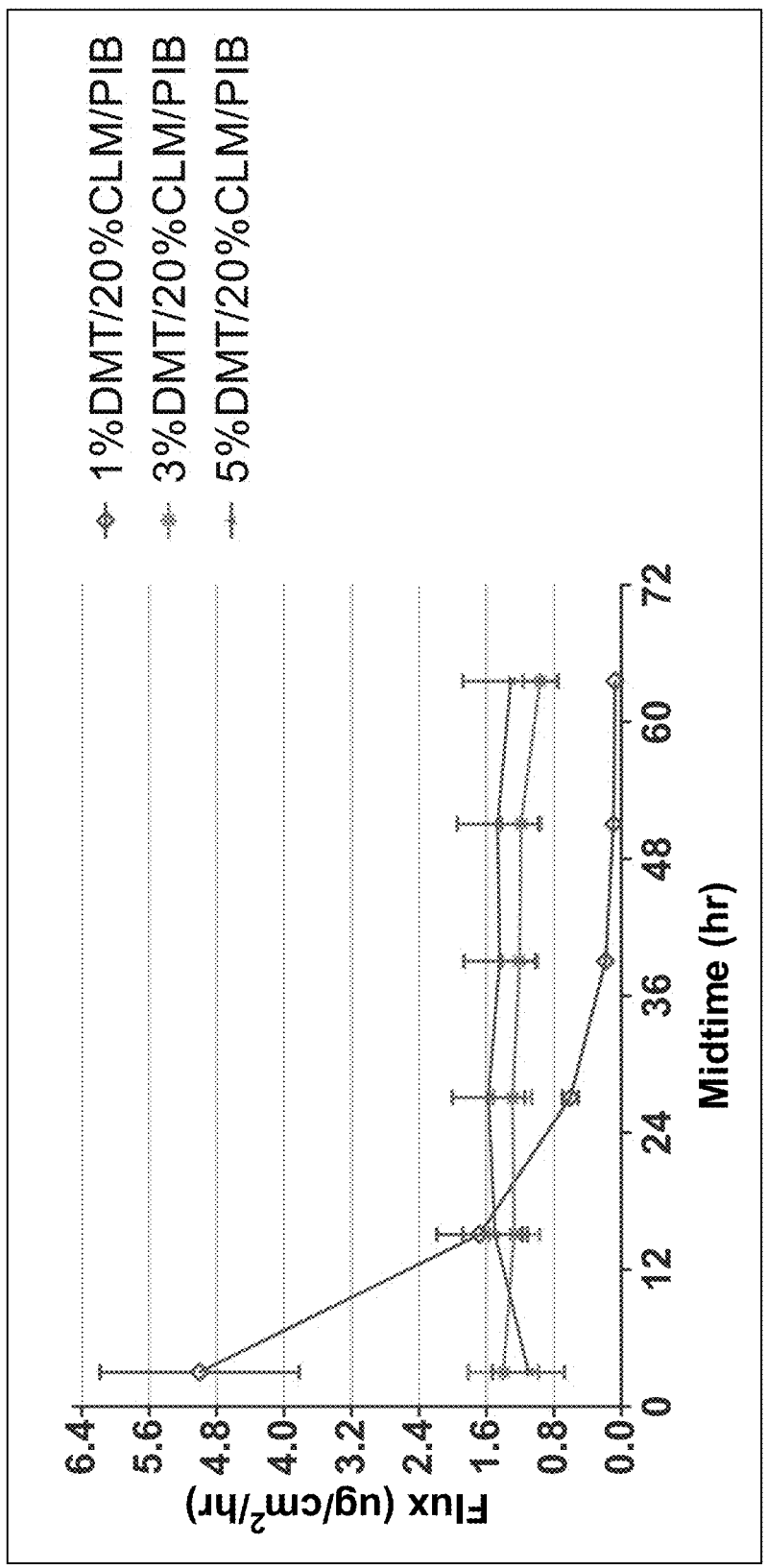
FIG. 1 shows an example of a plot of average dexmedetomidine flux as a function of transdermal delivery device application time for a dexmedetomidine transdermal composition with polyisobutylene/polybutene and crosslinked polyvinylpyrrolidone adhesive according to one embodiment.

Aspects of the invention include methods of managing pain in a subject by applying a transdermal delivery device containing a dexmedetomidine composition formulated to deliver a pain relieving effective amount of dexmedetomidine to a subject. In practicing methods according to certain embodiments, a transdermal delivery device having a dexmedetomidine composition is applied to a subject and is maintained in contact with the subject in a manner sufficient to deliver an amount of dexmedetomidine effective to manage pain in the subject. In some embodiments, methods include hydrating the subject. Methods according to certain embodiments may also include co-administering an opioid to the subject. Also provided is a transdermal delivery device configured to deliver dexmedetomidine sufficient for practicing the subject methods, as well as kits containing the transdermal delivery device.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various embodiments of the invention, methods for applying to a subject a transdermal delivery device having a dexmedetomidine composition and maintaining the transdermal delivery device in contact with the subject in a manner sufficient to deliver a non-sedative amount of dexmedetomidine to the subject are first reviewed in greater detail. Next, a transdermal delivery device suitable for practicing the subject methods is described. Kits that include a transdermal delivery device of interest are then reviewed.

Methods for Managing Pain with Dexmedetomidine Transdermal Delivery Devices

Aspects of the invention include methods of managing pain by applying a transdermal delivery device containing a dexmedetomidine composition formulated to deliver a pain relieving effective amount of dexmedetomidine to a subject experiencing pain. In practicing methods according to embodiments of the invention, a transdermal delivery device having a dexmedetomidine composition is applied to a subject and is maintained in contact with the subject in a manner sufficient to deliver a pain relieving effective amount of dexmedetomidine to the subject. The term "transdermal" is used in its conventional sense to refer to the route of administration where an active agent (i.e., drug) is delivered across the skin (e.g., topical administration) or mucous membrane for systemic distribution. As such, transdermal dexmedetomidine compositions as described herein include compositions that are formulated to deliver dexmedetomidine to the subject through one or more of the subcutis, dermis and epidermis, including the stratum corneum, stratum germinativum, stratum spinosum and stratum basale. Accordingly, extended transdermal delivery devices containing a transdermal dexmedetomidine composition may be applied at any convenient location, such as for example, the arms, legs, buttocks, abdomen, back, neck, scrotum, vagina, face, behind the ear and buccally, as well as sublingually. In describing methods of the present invention, the term "subject" is meant the person or organism to which the transdermal delivery device is applied and maintained in contact. As such, subjects of the invention may include but are not limited to mammals, e.g., humans and other primates, such as chimpanzees and other apes and monkey species; and the like, where in certain embodiments the subject are humans. The term subject is also meant to include a person or organism of any age, weight or other physical characteristic, where the subjects may be an adult, a child, an infant or a newborn.

Transdermal administration of dexmedetomidine may be passive or active. By "passive" transport is meant that the dexmedetomidine composition is delivered across the skin or mucous membrane in the absence of applied energy (e.g., rubbing or heat) and is primarily dependent on the permeability of the barrier (e.g., skin or mucous membrane) and by entropy of delivery. However, transdermal administration according to certain embodiments may also include active transport of the dexmedetomidine composition across the skin or mucous membrane. Active transport can be any convenient protocol sufficient to transport the composition through the skin or mucous membrane in conjunction with applied energy and may include, but is not limited to microneedle delivery, facilitated diffusion, electrochemically-produced gradients, iontophoretic systems, among other protocols.

In some embodiments, methods include applying a transdermal delivery device having a dexmedetomidine composition to a subject experiencing pain and maintaining the transdermal delivery device in contact with the subject in a manner sufficient to deliver a pain relieving effective amount of dexmedetomidine to the subject. By pain relieving effective amount is meant an amount that provides for at least some, if not substantial, pain relief as experienced by the subject, where in some instances the amount of pain relief is a complete cessation of the feeling or perception of pain. The amount of pain relief may be quantified or otherwise evaluated using any convenient protocol.

In other embodiments, methods include applying a transdermal delivery device having a dexmedetomidine composition to a subject that is not experiencing pain and maintaining the transdermal delivery device in contact with the subject in a manner sufficient to deliver an amount of dexmedetomidine that is effective to prevent an amount of pain in the subject. By "prevent an amount of pain" is meant that when the transdermal delivery device is applied to and maintained in contact with the subject that is not experiencing pain, the subject will experience at least less pain in response to a pain-inducing event (e.g., physical trauma such as surgery) as compared to a subject not applied with the subject transdermal delivery devices containing dexmedetomidine. For example, the subject transdermal delivery device containing dexmedetomidine may be applied to a skin surface of a subject not experiencing pain and maintained in contact with the subject in a manner to reduce the amount of pain experienced by the subject in response to a pain-inducing event (e.g., surgery) by 5% or more, such as 10% or more, such as by 15% or more, such as 25% or more, such as 50% or more, such as 75% or more, such as by 90% or more, such as by 95% or more and including 99% or more. In certain instances, the subject transdermal delivery device is configured to deliver an amount of dexmedetomidine to the subject not experiencing pain sufficient to altogether eliminate any pain (i.e., reduce the amount of pain by 100%) experienced by the subject in response to a pain-inducing event. As described in greater detail below, the amount of time the transdermal delivery device is applied to the subject before the pain-inducing event (e.g., surgery) may vary and may depend on a number of factors, such as on the amount of dexmedetomidine present in the transdermal delivery device or the type of pain-inducing event. In some instances, a transdermal delivery device may be applied to a skin surface of a subject 1 hour or more, such as 2 hours or more, such as 3 hours or more, such as 4 hours or more, such as 6 hours or more, such as 8 hours or more, such as 12 hours or more, such as 16 hours or more and including 24 hours or more before the pain-inducing event (e.g., surgery).

In some instances, the amount of dexmedetomidine that is delivered to the subject is a non-sedative amount. By "non-sedative" is meant that the dexmedetomidine composition is formulated to deliver an amount of dexmedetomidine to the subject that does not cause complete sedation of the subject. In other words, a subject remains conscious and responsive throughout the entire time dexmedetomidine is transdermally administered to the subject. In certain instances, throughout administration of the dexmedetomidine transdermal composition, the subject remains in a cooperative, oriented and tranquil state. In other instances, throughout administration of the dexmedetomidine transdermal composition, the subject remains alert and capable of responding to commands (e.g., oral or written commands). In yet other instances, throughout administration of the dexmedetomidine transdermal composition, the subject is in an alert, cooperative, oriented and tranquil state and is capable of responding to commands (e.g., oral or written commands). Non-sedative as used herein includes instances where some sedation is present, e.g., as determined by using a suitable sedation scale, such as described above. In some instances, the subject is not completely sedated. By the term "not completely sedated" is meant that the subject experiences at least some sedation, but is rousable by mild physical stimulation or oral command. For example, where a subject is not completely sedated, the eyes of the subject may be closed with body relaxed but the can be awoken by one or more of physical stimulation or on command, such as by a health care practitioner.

Suitable protocols for determining level of sedation may include but are not limited to the Ramsay Sedation Scale, the Vancouver Sedative Recovery Scale, the Glasgow Coma Scale modified by Cook and Palma, the Comfort Scale, the New Sheffield Sedation Scale, the Sedation-Agitation Scale, and the Motor Activity Assessment Scale, the Wilson Sedation Score, among other convenient protocols for determining the level of sedation.

In some embodiments, methods may further include evaluating the level of sedation of the subject to determine whether any reduction in responsiveness or cognitive or motor activity has resulted from administration of a transdermal delivery device formulated to deliver a non-sedative amount of dexmedetomidine. The level of sedation may be evaluated by any convenient protocol, such as with those mentioned above. In certain embodiments, the level of sedation is evaluated using the Wilson Sedation Scale, details of which are available at the website produced by placing "http://www." prior to "sedationsolutions.co.uk/training-series6.php" and below:

The Wilson Sedation Score

1. Fully awake and oriented
2. Drowsy
3. Eyes closed but rousable to command
4. Eyes closed but rousable to mild physical stimulation (earlobe tug)
5. Eyes closed but unrousable to mild physical stimulation In some embodiments, during administration of subject dexmedetomidine transdermal compositions the level of sedation of a subject is evaluated and the subject is assigned a Wilson score of 3 or less, such as a Wilson score of 2 or less, including where the subject is assigned a Wilson score of 1. In these instances, throughout administration of dexmedetomidine by the dexmedetomidine transdermal delivery device, the subject exhibits brisk response to light glabellar tap or loud auditory stimulus. In other instances, throughout application of the dexmedetomidine transdermal device, the subject is responsive to oral commands. In yet other instances, throughout application of the dexmedetomidine transdermal device, the subject is co-operative, oriented and tranquil. In yet other instances, throughout administration of the dexmedetomidine by the transdermal delivery device, the subject is anxious, agitated or restless. In other instances, during administration of subject dexmedetomidine by the transdermal device the level of sedation of a subject is evaluated and the subject is assigned a Wilson score of 4. In these instances, the subject may be identified as being not-completely sedated.

The level of sedation of a subject may be evaluated at any time during the methods. In some instances, the level of sedation is evaluated while maintaining the extended transdermal delivery device in contact with the subject at regular intervals, e.g., every 0.25 hours, every 0.5 hours, every 1 hour, every 2 hours, every 4 hours or some other interval. For instance, the level of sedation may be evaluated while maintaining the transdermal delivery device in contact with the subject, such as 15 minutes after applying the transdermal delivery device to the subject, 30 minutes after applying the transdermal delivery device, 1 hour after applying the transdermal delivery device, 2 hours after applying the transdermal delivery device, 4 hours after applying the transdermal delivery device including 8 hours after applying the transdermal delivery device.

The level of sedation of the subject may be evaluated one or more times during a dosage interval, such as 2 or more times, such as 3 or more times, including 5 or more times before, during or after a dosage interval. An upper limit for the number of times the subject may be evaluated during a dosage interval is, in some instances, 10 times or fewer, such as 7 times or fewer, such as 5 times or fewer, such as 3 times or fewer and including 2 times or fewer. In certain embodiments, the number of times the subject may be evaluated during a dosage interval ranges such as from 2 times to 10 times, such as from 3 times to 9 times, such as from 4 times to 8 times and including from 5 times to 7 times.

In certain embodiments, sedation level may be monitored throughout the entire time the transdermal delivery device is maintained in contact with the subject, such by heart rate monitors, breathing monitors or by visual observation, including with the aid of a video monitor.

In some embodiments, the subject being managed is in a non-sedated state and is awake, alert, oriented, coherent and capable of responding to oral or written commands including questions or requests. For example, the subject may be in a non-sedated state when administration commences. In other embodiments, the subject is in a non-sedated state when administration commences and remains in a non-sedated state throughout one or more dosage intervals (i.e. the period of time dexmedetomidine transdermal delivery devices of interest are maintained in contact with the subject). In yet other embodiments, the subject is in a non-sedated state when administration commences and remains in a non-sedated stated throughout the entire management protocol.

In yet other embodiments, the amount of dexmedetomidine that is delivered to the subject is a sedative amount. By "sedative" is meant that the dexmedetomidine composition is formulated to deliver an amount of dexmedetomidine to the subject that causes sedation of the subject. In such embodiments, the patient may have a Wilson score of 4 or more including 5, where as described above, if the subject is assigned a score of 4, the subject may be viewed as one that is not completely sedated.

As summarized above, in practicing methods according to embodiments of the invention a transdermal delivery device having a dexmedetomidine composition is applied to a subject and is maintained in contact with the subject in a manner sufficient to deliver an effective amount of dexmedetomidine to manage pain in the subject. The term "pain" is used in its conventional sense to refer to the unpleasant sensory and emotional experience associated with actual or potential tissue damage, or described in terms of such damage (e.g., as defined by the International Association for the Study of Pain). In certain instances, pain includes any sensory experience that causes suffering in a subject. In embodiments, pain may include but is not limited to acute pain, chronic pain, neuropathic pain, pain associated with cancer, postoperative pain, moderate to severe pain, labor pain, perioperative pain, among other types of pain. In some embodiments, the subject methods and transdermal delivery devices containing dexmedetomidine are used to supplement anesthesia, for preoperative and postoperative analgesia as well as for obstetric analgesia during or after labor and delivery.

In some embodiments, the pain is surgical pain. Surgical pain (interchangeably termed "post-surgical", "post-incisional" or "posttraumatic pain") refers to pain arising or resulting from an external trauma such as a cut, puncture, incision, tear, or wound into tissue of an individual (including those that arise from all surgical procedures, whether invasive or non-invasive). Surgical pain that may be treated according to embodiments of the invention includes perioperative pain, e.g., pain experienced during and/or after a surgical procedure, as well as post-operative pain, e.g., pain experienced after a surgical procedure. As used herein, "surgical pain" does not include pain that occurs without an external physical trauma. In some embodiments, surgical pain is internal or external pain, and the wound, cut, trauma, tear or incision may occur accidentally (as with a traumatic wound) or deliberately (as with a surgical incision). As used herein, "pain" includes nociception and the sensation of pain, and pain can be assessed objectively and subjectively, using pain scores and other methods, e.g., with protocols well-known in the art. Surgical pain, as used herein, includes allodynia (i.e., pain due to a stimulus that does not normally provoke pain) and hyperalgesia (i.e., increased response to a stimulus that is normally painful), which can in turn, be thermal or mechanical (tactile) in nature. In some embodiments, the pain is characterized by thermal sensitivity, mechanical sensitivity and/or resting pain (e.g. persistent pain in the absence of external stimuli). In some embodiments, the surgical pain includes mechanically-induced pain or resting pain. In other embodiments, the surgical pain includes resting pain. The pain can be primary (e.g., resulting directly from the pain-causing event) or secondary pain (e.g., pain associated with, but not directly resulting, from the pain-causing event).

Aspects of the invention include methods of treating a subject for pain. In some embodiments, methods include treating a subject for surgical pain such as one or more of: allodynia, hyperalgesia, thermally induced pain, mechanically induced pain, or resting pain. For instance, surgical pain can include mechanically induced pain and/or resting pain. In some cases, the surgical pain includes resting pain. By "treating" or "treatment" is meant at least a suppression or an amelioration of the symptoms associated with the condition afflicting the subject, where suppression and amelioration are used in a broad sense to refer to at least a reduction in the magnitude of a parameter, e.g., symptom, associated with the condition being treated, such as pain. As such, treatment also includes situations where the condition is completely inhibited, e.g., prevented from happening, or stopped, e.g., terminated, such that the subject no longer experiences the condition. As such, treatment includes both preventing and managing a condition. In certain embodiments, allodynia is suppressed, ameliorated and/or prevented, and in some embodiments, hyperalgesia is suppressed, ameliorated and/or prevented. In some instances, the pain is chronic pain. In other cases, the pain is at, proximal and/or near to one or more site(s) of external trauma, wound or incision. Additional aspects of the subject methods include methods of ameliorating and/or preventing the development or progression of surgical pain by administering the subject dexmedetomidine by the transdermal delivering device.

As discussed above, methods include in some instances applying to a skin surface of a subject, which may be non-sedated, a transdermal delivery device having a dexmedetomidine composition that contains dexmedetomidine and a pressure sensitive adhesive and maintaining the transdermal delivery device in contact with the subject in a manner sufficient to deliver an effective amount dexmedetomidine over a period of time to manage pain in the subject. As discussed above, the amount may be non-sedative or sedative, as desired. A non-sedative amount may allow for responsiveness or alertness of the patient and may be related to a score of not greater than 3, including 2 or less, on the Wilson sedation scale. By "managing pain" or "management of pain" is meant at least a suppression or amelioration of the pain, where suppression and amelioration refer to at least a reduction in the magnitude of the pain.

In some embodiments, methods include extended transdermal delivery of dexmedetomidine to the subject. By "extended transdermal delivery" is meant that transdermal administration is formulated to provide for delivery of the dexmedetomidine composition over an extended period of time, such as over the course of hours, days and including weeks, including 1 hour or longer, such as 2 hours or longer, such as 4 hours or longer, such as 8 hours or longer, such as 12 hours or longer, such as 24 hours or longer, such as 48 hours or longer, such as 72 hours or longer, such as 96 hours or longer, such as 120 hours or longer, such as 144 hours or longer and including 168 hours or longer. For the above ranges an upper limit period of time is, in some instances, 168 hours or shorter, such as 144 hours or shorter, such as 120 hours or shorter, such as 96 hours or shorter, such as 72 hours or shorter, such as 48 hours or shorter and including 24 hours or shorter. In certain embodiments, extended transdermal delivery ranges such as from 0.5 hours to 168 hours, such as from 1 hour to 144 hours, such as from 1.5 hours to 120 hours, such from 2 hours to 96 hours, such as from 2.5 hours to 72 hours, such as from 3 hours to 72 hours.

In some embodiments, sustained release transdermal administration of the dexmedetomidine composition includes multi-day delivery of a therapeutically effective amount of the dexmedetomidine active agent that is applied to the skin of a subject. By multi-day delivery is meant that the transdermal composition is formulated to provide a therapeutically effective amount to a subject when the transdermal delivery device is applied to the skin of a subject for a period of time that is 1 day or longer, such as 2 days or longer, such as 4 days or longer, such as 7 days or longer, such as 14 days and including 30 days or longer. For multi-day delivery, an upper limit period of time is, in some instances, 30 days or shorter, such as 28 days or shorter, such as 21 days or shorter, such as 14 days or shorter, such as 7 days or shorter and including 3 days or shorter. In certain embodiments, multi-day transdermal delivery ranges such as from 2 days to 30 days, such as from 2 days to 15 days, such as from 2 days to 7 days, such as from 2 days to 4 days and including from 2 days to 4 days, e.g., 3 days, or 4 days.

Depending on the specific protocol employed, management of pain according to embodiments of the invention may include one or more management dosage intervals. The term "dosage interval" is used herein in its conventional sense to mean the duration of a single administration of applying and maintaining the transdermal delivery device in contact with the subject. In other words, a dosage interval begins with applying the transdermal dexmedetomidine composition to the skin or mucous membrane of the subject and ends with the removal of the transdermal dexmedetomidine composition from contact with the subject. As such, a dosage interval is the period of time that an amount of dexmedetomidine is in contact with the skin or mucous membrane of the subject and may last about 0.5 hours or longer, such as 1 hour or longer, such as 2 hours or longer, such as 4 hours or longer, such as 8 hours or longer, such as 12 hours or longer, such as 16 hours or longer, such as 20 hours or longer, such as 24 hours or longer, such as 30 hours or longer, such as 36 hours or longer, such as 48 hours or longer, such as 72 hours or longer, such as 96 hours or longer, such as 120 hours or longer, such as 144 hours or longer and including 168 hours or longer. An upper limit period of time for the duration of dosage intervals is, in some instances, 168 hours or shorter, such as 144 hours or shorter, such as 120 hours or shorter, such as 96 hours or shorter, such as 72 hours or shorter, such as 48 hours or shorter and including 40 hours or shorter. In certain embodiments, the duration of dosage intervals ranges from 0.5 hours to 168 hours, such as from 24 hours to 144 hours, such as from 30 hours to 120 hours, such from 36 hours to 96 hours, such as from 48 hours to 84 hours, such as from 60 hours to 84 hours, such as 66 hours to 78 hours, e.g., 72 hours.

The term "management protocol" as used herein refers to one or more sequential dosage intervals sufficient to produce the desired therapeutic effect of the dexmedetomidine transdermal delivery device. In certain embodiments, protocols may include a single dosage interval, such that only one dose made up of one or more transdermal devices is applied to a subject. In such instances, a single transdermal delivery device may be applied to a subject. In other instances of such embodiments, two or more distinct transdermal delivery devices may be applied to a subject at substantially the same time. In these instances, two or more, such as three or more, including four or more are applied to a subject a substantially the same time. In certain of these instances, the number of distinct transdermal delivery devices that are applied to the subject is ten or less, such as eight or less, including six or less, e.g., five or less. By "substantially the same time" is meant that the multiple transdermal delivery devices are applied to the subject at the same time, i.e., simultaneously, or sequentially with a minimal time interval between administration of each transdermal delivery device, where the minimal time interval may vary, but in some instances ranges is ten minutes or less, such as five minutes or less, including two minutes or less, such as one minute or less, e.g., 30 seconds or less, including 15 seconds or less. As such, if any time interval is present between the administration of multiple transdermal delivery devices in these embodiments, the interval has little if any practical impact on the active agent delivery profile to the subject from the transdermal delivery devices.

In certain embodiments, protocols may include multiple dosage intervals. By "multiple dosage intervals" is meant more than one transdermal delivery device is applied and maintained in contact with the subject in a sequential manner. As such, a transdermal delivery device is removed from contact with the subject and a new transdermal delivery device is reapplied to the subject. In practicing methods of the invention, management regimens may include two or more dosage intervals, such as three or more dosage intervals, such as four or more dosage intervals, such as five or more dosage intervals, including ten or more dosage intervals.

The duration between dosage intervals in a multiple dosage interval management protocol may vary, depending on the physiology of the subject or by the management protocol as determined by a health care professional. For example, the duration between dosage intervals in a multiple dosage management protocol may be predetermined and follow at regular intervals. As such, the time between dosage intervals may vary and may be 1 day or longer, such as 2 days or longer, such as 3 days or longer, such as 4 days or longer, such as 5 days or longer, such as 6 days or longer, such as 7 days or longer, such as 10 days or longer, including 30 days or longer. An upper limit period of time between dosage intervals is, in some instances, 30 days or shorter, such as 28 days or shorter, such as 21 days or shorter, such as 14 days or shorter, such as 7 days or shorter and including 3 days or shorter. In certain embodiments, the time between dosage intervals ranges such as from 2 days to 30 days, such as from 3 days to 28 days, such as from 4 days to 21 days, such as from 5 days to 14 days and including from 6 days to 10 days.

In certain instances, the duration between dosage intervals may depend on the plasma concentration of dexmedetomidine during the time the transdermal delivery device is not in contact with the subject between dosage intervals. For example, a subsequent dosage interval may commence when the plasma concentration of dexmedetomidine reaches below a particular threshold.

In certain embodiments, the dexmedetomidinecan be administered by the transdermal delivery device prior to an activity likely to result in external trauma, wound or incision, such as surgery. For example, the dexmedetomidine can be administered by the transdermal delivery device 30 minutes or more, 1 hour or more, 2 hours or more, 5 hours or more, 10 hours or more, 15 hours or more, 24 hours or more, such as 1 day or more, prior to the activity likely to result in external trauma, wound or incision, such as prior to surgery. In other embodiments, the dexmedetomidine can be administered by the transdermal delivery device during and/or after surgery or activity that resulted in external trauma, wound or incision. In some instances, the dexmedetomidine is administered by the transdermal delivery device 1 hour or more, 2 hours or more, 3 hours or more, 4 hours or more, 6 hours or more, 8 hours or more, 12 hours or more, 18 hours or more, 24 hours or more, 30 hours or more, 36 hours or more, after surgery, or activity that resulted in external trauma, wound or incision.

In some instances active agent from the compositions is administered perioperatively to a subject. The term perioperative as used herein means before, during and after an operation, e.g., in which a surgical procedure is performed. As such, the transdermal delivery device is applied to the subject prior to a surgical procedure and then maintained on the subject during the surgical procedure and for some time after the surgical procedure. For example, the dexmedetomidine can be administered by the transdermal delivery device 30 minutes or more, 1 hour or more, 2 hours or more, 5 hours or more, 8 hours or more, 9 hours or more, 10 hours or more, 11 hours or more, 12 hours or more, 15 hours or more, 18 hours or more, 24 hours or more, such as 1 day or more, prior to a surgical procedure and maintained on the subject during the surgical procedure. In some instances, the transdermal delivery device is applied anywhere from 0.50 to 30 hours prior to surgery, such 1 to 24 hours prior to surgery. The subject compositions are then maintained on the subject for a period of time following the surgical procedure, where this post-surgical maintenance period of time may vary, and in some instances is 1 hour or longer, such as 2 hours or longer, such as 4 hours or longer, such as 8 hours or longer, such as 12 hours or longer, such as 24 hours or longer, such as 48 hours or longer, such as 72 hours or longer, such as 96 hours or longer, such as 120 hours or longer, such as 144 hours or longer and including 168 hours or longer. For the above ranges an upper limit period of time is, in some instances, 168 hours or shorter, such as 144 hours or shorter, such as 120 hours or shorter, such as 96 hours or shorter, such as 72 hours or shorter, such as 48 hours or shorter and including 24 hours or shorter. In certain embodiments, extended transdermal delivery ranges such as from 0.5 hours to 168 hours, such as from 1 hour to 144 hours, such as from 1.5 hours to 120 hours, such from 2 hours to 96 hours, such as from 2.5 hours to 72 hours, such as from 3 hours to 72 hours. In certain embodiments, a perioperative delivery regimen is a multi-day perioperative transdermal delivery regimen spanning a period of time prior to and after a surgical procedure, wherein some instances this regimen ranges from 2 days to 30 days, such as from 2 days to 15 days, such as from 2 days to 7 days, such as from 2 days to 4 days and including from 2 days to 4 days, e.g., 3 days.

In some embodiments, the transdermal delivery device is applied and maintained in contact with the subject for a total duration of 72 hours. In one example, the transdermal delivery device in applied 4 hours before commencement of the surgical procedure, maintained in contact with the subject during surgery and removed after a total duration of 72 hours. In another example, the transdermal delivery device in applied 6 hours before commencement of the surgical procedure, maintained in contact with the subject during surgery and removed after a total duration of 72 hours. In yet another example, the transdermal delivery device in applied 12 hours before commencement of the surgical procedure, maintained in contact with the subject during surgery and removed after a total duration of 72 hours. In yet another example, the transdermal delivery device in applied 18 hours before commencement of the surgical procedure, maintained in contact with the subject during surgery and removed after a total duration of 72 hours. In still another example, the transdermal delivery device in applied 24 hours before commencement of the surgical procedure, maintained in contact with the subject during surgery and removed after a total duration of 72 hours. In still another example, the transdermal delivery device is applied 24 hours before commencement of the surgical procedure, maintained in contact with the subject during surgery and removed after a total duration of 84 hours. In still another example, the transdermal delivery device is applied 24 hours before commencement of the surgical procedure, maintained in contact with the subject during surgery and removed after a total duration of 96 hours.

In other embodiments, one or more of subject transdermal delivery devices is applied to subject a predetermined period of time (e.g., 4 hours, 6, hours, 12 hours, 18 hours, 24 hours, etc.) prior to the commencement of the surgical procedure and maintained in contact with the subject for 72 hours or more after completion of the surgery. As such, the total duration the transdermal delivery device is maintained in contact with the subject may be 76 hours or more, such as 80 hours or more, such as 84 hours or more, such as 90 hours or more and including 96 hours or more. In one example, the transdermal delivery device in applied 4 hours before commencement of the surgical procedure, maintained in contact with the subject during surgery and retained in contact with the subject for 72 hours or more after the surgery. In another example, the transdermal delivery device in applied 6 hours before commencement of the surgical procedure, maintained in contact with the subject during surgery and retained in contact with the subject for 72 hours or more after the surgery. In yet another example, the transdermal delivery device in applied 12 hours before commencement of the surgical procedure, maintained in contact with the subject during surgery and retained in contact with the subject for 72 hours or more after the surgery. In yet another example, the transdermal delivery device in applied 18 hours before commencement of the surgical procedure, maintained in contact with the subject during surgery and retained in contact with the subject for 72 hours or more after the surgery. In still another example, the transdermal delivery device in applied 24 hours before commencement of the surgical procedure, maintained in contact with the subject during surgery and retained in contact with the subject for 72 hours or more after the surgery. In still another example, the transdermal delivery device is applied 24 hours before commencement of the surgical procedure, maintained in contact with the subject during surgery and retained in contact with the subject for 84 hours or more after the surgery. In still another example, the transdermal delivery device is applied 24 hours before commencement of the surgical procedure, maintained in contact with the subject during surgery and retained in contact with the subject for 96 hours or more after the surgery.

As described above, aspects of the invention include managing pain in a subject by applying a transdermal delivery device containing a dexmedetomidine composition to a subject formulated to deliver an effective amount of dexmedetomidine. In some instances, aspects of the invention include perioperative pain management, which in some instances results in treatment of post-operative pain, and in some instances results in treatment of perioperative pain, where perioperative pain includes post-operative pain and pain experienced during an operation. In some embodiments, methods include maintaining the transdermal delivery device in contact with a subject in a manner sufficient to deliver a target dosage of dexmedetomidine to manage pain in the subject, such as for example delivering a target dosage as determined by total drug exposure or by average daily drug exposure that will manage pain. The term target dosage is meant the desired amount of absorbed dexmedetomidine. Depending on the desired therapeutic effect of the transdermal dexmedetomidine composition, the management protocol, the physiology of the subject and the level of sedation in the subject at the time of administration, target drug exposure for managing pain may vary. In certain embodiments, the target drug exposure of dexmedetomidine is an amount that is in the non-sedative therapeutic window.

The term "non-sedative therapeutic window" is used herein to refer to the dexmedetomidine dosage range that is therapeutically effective in managing pain in a subject which results in little, if any sedation. In other words, the non-sedative therapeutic window of dexmedetomidine for a specific individual subject being managed for pain is the range of concentrations of dexmedetomidine defined as below an amount considered to be "fully sedative" or "full sedation-inducing" and above an amount considered to be "ineffective" to manage pain in the subject In certain embodiments of the invention, a non-sedative therapeutically effective amount provides for a systemic amount of dexmedetomidine that enables desired management while maintaining a Wilson score of 3 or less in the subject. For example, in managing pain in a subject the target non-sedative dosage of dexmedetomidine may range from 50 μg/day to 350 μg/day, such as from 100 μg/day to 340 μg/day, such as from 145 μg/day to 330 μg/day, such as from 155 μg/day to 320 μg/day, such as from 165 μg/day to 310 μg/day, such as from 175 μg/day to 300 μg/day, such as from 185 μg/day to 290 μg/day, such as from 195 μg/day to 280 μg/day and including from 50 μg/day to 250 μg/day over the course of a dosage interval (e.g., a 168 hour dosage interval). In certain embodiments, the target dosage of dexmedetomidine ranges from 147 μg/day to 290 μg/day over the course of a dosage interval (e.g., a 168 hour or longer dosage interval).

In some embodiments, the target dosage is an amount that when applied to a subject provides for a systemic amount of dexmedetomidine that gives a desired mean plasma concentration of dexmedetomidine at specific times during the pain management. In other embodiments, the target dosage is an amount that when applied to a subject provides for a steady state mean plasma concentration of the dexmedetomidine throughout a dosage interval or management protocol. In other embodiments, the target dosage is an amount that when applied to a subject provides for a particular rate of delivery of dexmedetomidine to the subject in vivo.

In some embodiments, applying and maintaining a transdermal delivery device containing a dexmedetomidine composition in contact with a subject includes delivery of a target amount of dexmedetomidine, such as for example an average cumulative amount of dexmedetomidine delivered over the course of a dosage interval (e.g., 7 days or longer). The term "target cumulative amount" is meant the total quantity of dexmedetomidine that is delivered to the subject through the skin and may vary due to skin or mucous membrane permeability and metabolic activity of the site of application. In some embodiments, the average cumulative amount of dexmedetomidine may be 5 μg/cm² or greater, such as 25 μg/cm² or greater, such as 50 μg/cm² or greater over a 7 day delivery interval, such as 75 μg/cm² or greater, such as 100 μg/cm² or greater, such as 125 μg/cm² or greater and including 200 μg/cm² or greater over the dosage interval. For average cumulative amount of dexmedetomidine delivery over a dosage interval, an upper limit is, in some instances, 500 μg/cm² or less, such as 400 μg/cm² or less, such as 300 μg/cm² or less, such as 200 μg/cm² or less, such as 100 μg/cm² or less and including 50 μg/cm² or less. In certain embodiments, average cumulative amount of dexmedetomidine delivery over a dosage interval ranges such as from 5 μg/cm² to 500 μg/cm², such as from 25 μg/cm² to 400 μg/cm² and including from 50 μg/cm² to 300 μg/cm².

Methods according to certain embodiments may include applying to the subject one or more transdermal delivery devices, e.g., two to four, such as three transdermal delivery devices, containing a dexmedetomidine composition and maintaining the transdermal dexmedetomidine composition in contact with the subject in a manner sufficient to provide a mean plasma concentration which ranges from 0.05 ng/mL to 0.5 ng/mL over the course of a dosage interval, such as from 0.1 ng/mL to 0.45 ng/mL, such as from 0.15 ng/mL to 0.4 ng/mL, such as from 0.2 ng/mL to 0.35 ng/mL and including from 0.25 ng/mL to 0.3 ng/mL. For example, the transdermal delivery device may be maintained in contact with the subject in a manner sufficient to provide a mean plasma concentration that ranges from 0.16 ng/mL to 0.36 ng/mL over the course of a dosage interval (e.g., a 168 hour or longer dosage interval). In other embodiments, methods include maintaining the dexmedetomidine composition in contact with the subject in a manner sufficient to provide a mean plasma concentration which ranges from 0.05 ng/mL to 0.5 ng/mL over the course of the entire management protocol (i.e., over one or more dosage intervals), such as from 0.1 ng/mL to 0.45 ng/mL, such as from 0.15 ng/mL to 0.4 ng/mL, such as from 0.2 ng/mL to 0.35 ng/mL and including from 0.25 ng/mL to 0.3 ng/mL over the course of the entire management protocol. For example, the transdermal delivery device may be maintained in contact with the subject in a manner sufficient to provide a mean plasma concentration that ranges from 0.16 ng/mL to 0.36 ng/mL over the course of the entire management protocol.

As discussed above, methods include delivering dexmedetomidine to the subject to manage surgical pain in the subject for an extended period of time, such as over 6 hours or more, such as over 12 hours or more, such as over 24 hours or more, such as over 48 hours or more, such as over 72 hours or more, such as over 96 hours or more, such as over 120 hours or more, such as over 144 hours or more and including over 168 hours or more. In certain embodiments, the methods include maintaining the transdermal dexmedetomidine composition in contact with the skin surface of the subject sufficient to provide a target average amount of absorbed dexmedetomidine over 72 hours. Depending on the surface area of the transdermal delivery device (e.g., 6 cm², 4 cm², 2 cm², etc.), the average absorbed amount of dexmedetomidine over 72 hours may vary, such as from 150 mcg to 600 mcg, such as from 175 mcg to 575 mcg, such as from 100 mcg to 400 mcg, such as from 125 mcg to 375 mcg, such as from 50 mcg to 200 mcg and including from 60 mcg to 190 mcg. In some instances, the transdermal delivery device has a surface area of 6 cm² and the transdermal dexmedetomidine composition is maintained in contact with the skin surface of the subject in a manner sufficient to provide an average absorbed amount of dexmedetomidine over 72 hours of from 192.7 mcg to 551.7 mcg, such as from 224 mcg to 437 mcg, such as from 278 mcg to 384 mcg, such as from 304 mcg to 357 mcg and including from 320 mcg to 341 mcg. In other instances, the transdermal delivery device has a surface area of 4 cm² and the transdermal dexmedetomidine composition is maintained in contact with the skin surface of the subject in a manner sufficient to provide an average absorbed amount of dexmedetomidine over 72 hours of from 100 mcg to 400 mcg, such as from 125 mcg to 375 mcg, such as from 128.5 mcg to 367.8 mcg, such as from 150 mcg to 292 mcg, such as from 185 mcg to 256 mcg, such as from 203 mcg to 238 mcg and including from 213 mcg to 228 mcg. In yet other instances, the transdermal delivery device has a surface area of 2 cm² and the transdermal dexmedetomidine composition is maintained in contact with the skin surface of the subject in a manner sufficient to provide an average absorbed amount of dexmedetomidine over 72 hours of from 50 mcg to 200 mcg, such as from 60 mcg to 190 mcg, such as from 64 mcg to 184 mcg, such as from 75 mcg to 146 mcg, such as from 93 mcg to 128 mcg, such as from 101 mcg to 119 mcg and including from 107 mcg to 114 mcg.

In other embodiments, methods may include maintaining the transdermal dexmedetomidine composition in contact with the skin surface of the subject sufficient to provide an average dexmedetomidine absorption over 72 hours. Depending on the surface area of the transdermal delivery device (e.g., 6 cm², 4 cm², 2 cm², etc.), the average dexmedetomidine absorption over 72 hours may vary, ranging in some instances from 1 mcg/h to 10 mcg/h, from 2 mcg/h to 8 mcg/h, from 0.5 mcg/h to 6 mcg/h, from 1 mcg/h to 5.5 mcg/h, from 0.1 mcg/h to 5 mcg/h and including from 0.5 mcg/h to 3 mcg/h. In some instances, the transdermal delivery device has a surface area of 6 cm² and the transdermal dexmedetomidine composition is maintained in contact with the skin surface of the subject in a manner sufficient to provide an average dexmedetomidine absorption over 72 hours of from 1 mcg/h to 10 mcg/h, such as from 2 mcg/h to 8 mcg/h, such as from 3.1 mcg/h to 6.1 mcg/h, such as from 3.9 mcg/h to 5.3 mcg/h, such as from 4.2 mcg/h to 5.0 mcg/h and including from 4.4 mcg/h to 4.7 mcg/h. In other instances, the transdermal delivery device has a surface area of 4 cm² and the transdermal dexmedetomidine composition is maintained in contact with the skin surface of the subject in a manner sufficient to provide an average dexmedetomidine absorption over 72 hours of from 0.5 mcg/h to 6 mcg/h, such as from 1 mcg/h to 5.5 mcg/h, such as from 1.8 mcg/h to 5.1 mcg/h, such as from 2.1 mcg/h to 4.1 mcg/h, such as from 2.6 mcg/h to 3.6 mcg/h, such as from 2.8 mcg/h to 3.3 mcg/h and including from 3.0 mcg/h to 3.2 mcg/h. In yet other instances, the transdermal delivery device has a surface area of 2 cm² and the transdermal dexmedetomidine composition is maintained in contact with the skin surface of the subject in a manner sufficient to provide an average dexmedetomidine absorption over 72 hours of from 0.1 mcg/h to 5 mcg/h, such as from 0.5 mcg/h to 3 mcg/h, such as from 0.9 mcg/h to 2.6 mcg/h, such as from 1.0 mcg/h to 2.0 mcg/h, such as from 1.3 mcg/h to 1.8 mcg/h, such as from 1.4 mcg/h to 1.7 mcg/h and including from 1.5 mcg/h to 1.6 mcg/h.

In other embodiments, methods may include maintaining the transdermal dexmedetomidine composition in contact with the skin surface of the subject sufficient to provide an average maximal plasma concentration of dexmedetomidine over 72 hours. Depending on the surface area of the transdermal delivery device (e.g., 6 cm², 4 cm², 2 cm², etc.), the average maximal plasma concentration of dexmedetomidine absorption over 72 hours may vary, ranging from 50 pg/mL to 250 pg/mL, from 70 pg/mL to 225 pg/mL, from 25 pg/mL to 150 pg/mL, from 40 pg/mL to 140 pg/mL, from 10 pg/mL to 80 pg/mL and including from 20 pg/mL to 70 pg/mL. In some instances, the transdermal delivery device has a surface area of 6 cm² and the transdermal dexmedetomidine composition is maintained in contact with the skin surface of the subject in a manner sufficient to provide an average maximal plasma concentration of dexmedetomidine over 72 hours of from 50 pg/mL to 250 pg/mL, such as from 70 pg/mL to 225 pg/mL, such as from 70.1 pg/mL to 205 pg/mL, such as from 77 pg/mL to 153 pg/mL, such as from 96 pg/mL to 134 pg/mL, such as from 106 pg/mL to 125 pg/mL and including from 111 pg/mL to 119 pg/mL. In other instances, the transdermal delivery device has a surface area of 4 cm² and the transdermal dexmedetomidine composition is maintained in contact with the skin surface of the subject in a manner sufficient to provide an average maximal plasma concentration of dexmedetomidine over 72 hours of from 25 pg/mL to 150 pg/mL, such as from 40 pg/mL to 140 pg/mL, such as from 47 pg/mL to 137 pg/mL, such as from 51 pg/mL to 102 pg/mL, such as from 64 pg/mL to 90 pg/mL, such as from 70 pg/mL to 83 pg/mL and including from 74 pg/mL to 79 pg/mL. In yet other instances, the transdermal delivery device has a surface area of 2 cm² and the transdermal dexmedetomidine composition is maintained in contact with the skin surface of the subject in a manner sufficient to provide an average maximal plasma concentration of dexmedetomidine over 72 hours of from 10 pg/mL to 80 pg/mL, such as from 20 pg/mL to 70 pg/mL, such as from 23.4 pg/mL to 68.3 pg/mL, such as from 26 pg/mL to 51 pg/mL, such as from 32 pg/mL to 45 pg/mL and including from 35 pg/mL to 42 pg/mL.

In other embodiments, methods may include maintaining the transdermal dexmedetomidine composition in contact with the skin surface of the subject sufficient to provide an average area under the plasma dexmedetomidine concentration curve from time of application to infinity. Depending on the surface area of the transdermal delivery device (e.g., 6 cm², 4 cm², 2 cm², etc.), the average area under the plasma dexmedetomidine concentration curve over 72 hours may vary, ranging from 3000 h×pg/mL to 10000 h×pg/mL, from 3500 h×pg/mL to 9000 h×pg/mL, from 2000 h×pg/mL to 7500 h×pg/mL, from 2250 h×pg/mL to 6000 h×pg/mL, from 1000 h×pg/mL to 3500 h×pg/mL and including from 1100 h×pg/mL to 3000 h×pg/mL. In some instances, the transdermal delivery device has a surface area of 6 cm² and the transdermal dexmedetomidine composition is maintained in contact with the skin surface of the subject in a manner sufficient to provide an average area under the plasma dexmedetomidine concentration curve over 72 hours of from 3517 h×pg/mL to 8954 h×pg/mL, such as from 4548 h×pg/mL to 7712 h×pg/mL, such as from 5339 h×pg/mL to 6921 h×pg/mL, such as from 5735 h×pg/mL to 6525 h×pg/mL and including from 5972 h×pg/mL to 6288 h×pg/mL. In other instances, the transdermal delivery device has a surface area of 4 cm² and the transdermal dexmedetomidine composition is maintained in contact with the skin surface of the subject in a manner sufficient to provide an average area under the plasma dexmedetomidine concentration curve over 72 hours of from 2345 h×pg/mL to 5969 h×pg/mL, such as from 3032 h×pg/mL to 5141 h×pg/mL, such as from 3559 h×pg/mL to 4614 h×pg/mL, such as from 3823 h×pg/mL to 4350 h×pg/mL and including from 3981 h×pg/mL to 4192 h×pg/mL. In yet other embodiments, the transdermal delivery device has a surface area of 2 cm² and the transdermal dexmedetomidine composition is maintained in contact with the skin surface of the subject in a manner sufficient to provide an average area under the plasma dexmedetomidine concentration curve over 72 hours of from 1172 h×pg/mL to 2985 h×pg/mL, such as from 1516 h×pg/mL to 2571 h×pg/mL, such as from 1780 h×pg/mL to 2307 h×pg/mL, such as from 1912 h×pg/mL to 2175 h×pg/mL and including from 1991 h×pg/mL to 2096 h×pg/mL.

In certain embodiments, methods may also include determining the plasma concentration of dexmedetomidine in the subject during management of pain in the subject. The plasma dexmedetomidine concentration may be determined using any convenient protocol, such for example by liquid chromatography-mass spectrometry (LCMS). The plasma concentration of the dexmedetomidine may be determined at any time desired. In some embodiments, the plasma concentration of dexmedetomidine may be monitored throughout the entire time the transdermal delivery device is maintained in contact with the subject, such by real-time data collection. In other instances, the plasma concentration of dexmedetomidine is monitored while maintaining the transdermal delivery device in contact with the subject by collecting data at regular intervals, e.g., collecting data every 0.25 hours, every 0.5 hours, every 1 hour, every 2 hours, every 4 hours, every 12 hours, every 24 hours, including every 72 hours, or some other interval. In yet other instances, the plasma concentration of dexmedetomidine is monitored while maintaining the transdermal delivery device in contact with the subject by collecting data according to a particular time schedule after applying the transdermal delivery device to the subject. For instance, the plasma concentration of dexmedetomidine may be determined 15 minutes after applying the transdermal delivery device to the subject, 30 minutes after applying the transdermal delivery device to the subject, 1 hour after applying the transdermal delivery device to the subject, 2 hours after applying the transdermal delivery device to the subject, 4 hours after applying the transdermal delivery device to the subject, 8 hours after applying the transdermal delivery device to the subject, 12 hours after applying the transdermal delivery device to the subject, 24 hours after applying the transdermal delivery device to the subject, 48 hours after applying the transdermal delivery device to the subject, 72 hours after applying the transdermal delivery device to the subject, 76 hours after applying the transdermal delivery device to the subject, 80 hours after applying the transdermal delivery device to the subject, 84 hours after applying the transdermal delivery device to the subject, 96 hours after applying the transdermal delivery device to the subject, 120 hours after applying the transdermal delivery device to the subject and including 168 hours after applying the transdermal delivery device to the subject.

In certain embodiments, the plasma concentration of dexmedetomidine is determined before the transdermal delivery device is applied to a subject, such as for example, to determine the basal plasma concentration of the dexmedetomidine. For example, the plasma concentration may be determined 5 minutes before applying the transdermal delivery device, such as 10 minutes before, such as 30 minutes before, such as 60 minutes before, such as 120 minutes before, such as 240 minutes before and including 480 minutes before applying the transdermal delivery device. As described detail below, methods may include multiple dosage intervals where applying and maintaining the transdermal delivery device in contact with the subject may be repeated. In these embodiments, the plasma concentration may be determined after a first transdermal delivery device is removed and before a second transdermal delivery device is applied.

The plasma concentration of the dexmedetomidine may be determined one or more times at any given measurement period, such as 2 or more times, such as 3 or more times, including 5 or more times at each measurement period. An upper limit for the number of times the blood plasma concentration of dexmedetomidine is determined at any given measurement period is, in some instances, 10 times or fewer, such as 7 times or fewer, such as 5 times or fewer, such as 3 times or fewer and including 2 times or fewer. In certain embodiments, the number of times the blood plasma concentration of dexmedetomidine is determined at any given measurement period ranges such as from 2 times to 10 times, such as from 3 times to 9 times, such as from 4 times to 8 times and including from 5 times to 7 times.

Methods for managing pain according to certain embodiments may include applying to the subject a transdermal delivery device containing a dexmedetomidine composition and maintaining the transdermal dexmedetomidine composition in contact with the subject in a manner sufficient to maintain a transdermal dexmedetomidine flux which is within 30% or more of the peak transdermal dexmedetomidine flux after reaching the peak transdermal flux. As such, once transdermal delivery devices of interest reach peak transdermal dexmedetomidine flux, the transdermal delivery device is configured to maintain a flux of dexmedetomidine to the subject that is at least 30% of peak flux during the course of any given dosage interval, such as at least 35%, such as at least 40% and including at least 50% of peak flux during the course of any given dosage interval. In other words, once peak flux is reached by the transdermal delivery device according to these particular embodiments, the transdermal flux of dexmedetomidine to the subject does not fall below 30% or more of the peak flux at any time during the dosage interval.

For example, the transdermal dexmedetomidine delivery device may be maintained in contact with the subject in a manner sufficient to maintain the transdermal dexmedetomidine flux which is within 50% or more of peak transdermal dexmedetomidine flux, such as 55% or more, such as 60% or more, such as 65% or more, such as 70% or more, such as 75% or more, such as 80% or more, such as within 85% or more, such as within 90% or more, such as within 95% and including within 99% of peak transdermal dexmedetomidine flux after reaching peak transdermal flux. In certain embodiments, the transdermal dexmedetomidine flux does not decrease at all after reaching peak flux and maintains a rate of 100% of peak dexmedetomidine flux from the moment it reaches peak flux until the end of a given dosage interval.

The flux of an active agent by transdermal administration is the rate of penetration of the active agent through the skin or mucous membrane of the subject. In some instances, the flux of the dexmedetomidine can be determined by the equation:

$$J_{skin\ flux} = P \times C \quad (1)$$

where J is the skin flux, C is the concentration gradient across the skin or mucous membrane and P is the permeability coefficient. Skin flux is the change in cumulative amount of drug entering the body across the skin or mucous membrane with respect to time.

In some instances, the transdermal dexmedetomidine delivery device is maintained in contact with the subject in a manner sufficient to provide a peak flux of 0.05 µg/cm$^2$/hr or greater, such as 0.1 µg/cm$^2$/hr or greater, such as 0.5 µg/cm$^2$/hr or greater, such as 1 µg/cm$^2$/hr, such as 2 µg/cm$^2$/hr, such as 3 µg/cm$^2$/hr or greater, such as 5 µg/cm$^2$/hr or greater, such as 7.5 µg/cm²/hr or greater and including maintaining the transdermal dexmedetomidine delivery device in contact with the subject in a manner sufficient to provide a peak flux of 10 µg/cm²/hr or greater. For peak flux of transdermal dexmedetomidine delivery, an upper limit is, in some instances, 10 µg/cm²/hr or less, such as 9 µg/cm²/hr or less, such as 8 µg/cm²/hr or less, such as 7 µg/cm²/hr or less, 6 µg/cm²/hr or less, such as 5 µg/cm²/hr or less and including 2 µg/cm²/hr or less. In certain embodiments, the peak flux of transdermal dexmedetomidine delivery ranges such as from 0.05 µg/cm²/hr to 10 µg/cm²/hr, such as from 1 µg/cm²/hr to 9 µg/cm²/hr and including from 2 µg/cm²/hr to 8 µg/cm²/hr.

As such, where the transdermal dexmedetomidine delivery device is maintained in contact with the subject in a manner sufficient to provide a transdermal dexmedetomidine flux which is within at least 30% of peak transdermal dexmedetomidine flux, the transdermal delivery device may be maintained in contact with the subject in a manner sufficient to provide a flux which is 0.15 µg/cm²/hr or greater after reaching a peak transdermal flux of 0.5 µg/cm²/hr, such as 0.18 µg/cm²/hr or greater after reaching a peak transdermal flux of 0.6 µg/cm²/hr, such as 0.225 µg/cm²/hr or greater after reaching a peak transdermal flux of 0.75 µg/cm²/hr, such as 0.27 µg/cm²/hr or greater after reaching a peak flux of 0.9 µg/cm²/hr, such as 0.3 µg/cm²/hr or greater after reaching a peak flux of 1.0 µg/cm²/hr, such as 1.5 µg/cm²/hr after reaching a peak flux of 5 µg/cm²/hr or greater and including maintaining the transdermal dexmedetomidine delivery device in contact with the subject in a manner sufficient to provide a flux which is 3.0 µg/cm²/hr or greater after reaching a peak flux of 10.0 µg/cm²/hr.

Depending on the amount of dexmedetomidine present in the dexmedetomidine composition of the transdermal delivery device, the physiology of the subject, target site of application, the time required to reach peak dexmedetomidine flux may vary. In some instances, peak dexmedetomidine flux is reached 2 hours or more after applying the transdermal delivery device to the subject, such as 4 hours or more, such as 6 hours or more, such as 12 hours or more, such as 18 hours or more and including at 24 hours or more after applying the transdermal delivery device to the subject. In other instances, the peak dexmedetomidine flux is reached at 168 hours or earlier, such as 144 hours or earlier, such as 120 hours or earlier, such as 96 hours or earlier, such as 72 hours or earlier, such as 48 hours or earlier, such as 24 hours or earlier, such as 12 hours or earlier, such as 8 hours earlier, such as 4 hours or earlier and including at 2 hours or earlier. In some embodiments, peak dexmedetomidine flux is reached at 24 hours after applying the transdermal delivery device to the subject.

In certain embodiments, during management of pain in the subject the transdermal composition is maintained in contact with the subject sufficient to provide a steady state average flux of dexmedetomidine to the subject. The term "steady state" is used in its conventional sense to mean that the amount of dexmedetomidine released from the transdermal delivery device maintains a substantially constant average flux of dexmedetomidine. As such, the dexmedetomidine flux from transdermal delivery devices of interest increases or decreases by 50% or less at any time while the transdermal delivery device is maintained in contact with the subject, such as 45% or less, such as 40% or less, such as 35% or less, such as 30% or less, such as 25% or less, such as 20% or less, such as 15% or less, such as 12% or less, such as 10% or less, such as 6% or less, such as 5% or less, such as 4% or less, and including 1% or less at any time while the transdermal delivery device is maintained in contact with the subject.

Where the dexmedetomidine transdermal delivery device is maintained in contact with the subject sufficient to provide a steady state average flux of dexmedetomidine, the steady state average dexmedetomidine flux may be maintained from for 0.5 hours or longer, such as 1 hour or longer, such as 2 hours or longer, such as 3 hours or longer, such as 4 hours or longer, such as 8 hours or longer, 12 hours or longer, such as 24 hours or longer, such as 36 hours or longer, such as 48 hours or longer, such as 72 hours or longer, such as 96 hours or longer, such as 120 hours or longer, such as 144 hours or longer and including 168 hours or longer. For maintaining a steady state average dexmedetomidine flux, an upper limit is, in some instances, for 168 hours or shorter, such as 144 hours or shorter, such as 120 hours or shorter, such as 96 hours or shorter, such as 72 hours or shorter, such as 48 hours or shorter, such as 24 hours or shorter, such as 12 hours or shorter, such as 8 hours or shorter, such as 4 hours or shorter and including 2 hours or shorter.

In these embodiments, the transdermal delivery device is configured to provide a constant flux, such as by introducing a concentration gradient across the skin or mucous membrane or providing an excess in dexmedetomidine dosage amount. For example, dexmedetomidine transdermal compositions of interest may include a dexmedetomidine dosage that is 5% or greater in excess of the normal dosage amount, such as 10% or greater, such as 15% or greater, such as 20% or greater, and including 25% or greater in excess of the normal dosage amount. For amount of excess dexmedetomidine present in the transdermal delivery device to provide a constant flux, an upper limit is, in some instances 50% or less in excess, such as 45% or less in excess, such as 25% or less in excess, such as 20% or less in excess and including 10% or less in excess of the normal dosage amount. While dexmedetomidine transdermal compositions of interest may include an excess in order to provide a constant flux, the excess dosage amount is not absorbed as part of the dosage interval and is not sufficient to result in a dosage which is fully sedative (i.e., the dexmedetomidine dosage delivered to the subject still remains a non-sedative amount). As such, in some embodiments where the transdermal dexmedetomidine delivery device is maintained in a manner sufficient to provide a constant flux, 25% or less of the available dexmedetomidine in the transdermal composition may not be utilized, such as 20% or less, such as 15% or less, such as 10% or less, such as 5% or less and including 1% or less of the available dexmedetomidine in the transdermal composition may not be utilized during the dosage interval.

Methods for managing pain (e.g., surgical pain) in a subject according to certain embodiments may include applying to the subject a transdermal delivery device containing a dexmedetomidine composition configured to deliver a non-sedative amount of dexmedetomidine and maintaining the transdermal dexmedetomidine composition in contact with the subject in a manner sufficient to provide an average flux of dexmedetomidine in vivo of from about 0.005 to about 5 µg/cm²·hr, such as from about 0.01 to about 4 µg/cm²·hr, such as from about 0.02 to about 3 µg/cm²·hr, such as from about 0.05 to about 2.5 µg/cm²·hr, such as from about 0.1 to about 2 µg/cm²·hr and including from about 0.1 to about 1 µg/cm²·hr at any time after applying the transdermal delivery device. In some embodiments, methods include applying the transdermal dexmedetomidine composition to the subject and maintaining the transdermal delivery device in contact with the subject in a manner sufficient to provide an average flux of dexmedetomidine in vivo of from about 0.005 to about 2.0 µg/cm²·hr at 24 hours after application, such as from about 0.01 to about 1.75 µg/cm²·hr, such as from about 0.02 to about 1.5 µg/cm²·hr, such as from about 0.05 to about 1.25 µg/cm²·hr and including from about 0.1 to about 1 µg/cm²·hr at 24 hours after application. In yet other embodiments, methods include applying the transdermal dexmedetomidine delivery device to the subject and maintaining the transdermal delivery device in contact with the subject in a manner sufficient to provide an average flux of dexmedetomidine in vivo of from about 0.005 to about 2.0 µg/cm²·hr at 168 hours after application, such as from about 0.01 to about 1.75 µg/cm²·hr, such as from about 0.02 to about 1.5 µg/cm²·hr, such as from about 0.05 to about 1.25 µg/cm²·hr and including from about 0.1 to about 1 µg/cm²·hr at 168 hours after application.

In certain embodiments, methods include determining the transdermal dexmedetomidine flux. The transdermal dexmedetomidine flux may be determined using any convenient protocol, such for example by protocols employing human cadaver skin with epidermal layers (stratum corneum and epidermis) in a Franz cell having donor and receptor sides clamped together and receptor solution containing phosphate buffer. The amount of permeated dexmedetomidine can further be characterized by liquid chromatography. The transdermal dexmedetomidine flux may be determined at any time during methods of the invention. In some embodiments, the transdermal dexmedetomidine flux may be monitored throughout the entire time the transdermal dexmedetomidine delivery device is maintained in contact with the permeation barrier (e.g., human cadaver skin), such by real-time data collection. In other instances, the transdermal dexmedetomidine flux is monitored by collecting data at regular intervals, e.g., collecting data every 0.25 hours, every 0.5 hours, every 1 hour, every 2 hours, every 4 hours, every 12 hours, every 24 hours, including every 72 hours, or some other regular or irregular intervals. In yet other instances, the transdermal dexmedetomidine flux is monitored by collecting data according to a particular time schedule. For instance, the transdermal dexmedetomidine flux may be determined 15 minutes after applying the transdermal delivery device, 30 minutes after applying the transdermal delivery device, 1 hour after applying the transdermal delivery device, 2 hours after applying the transdermal delivery device, 4 hours after applying the transdermal delivery device, 8 hours after applying the transdermal delivery device, 12 hours after applying the transdermal delivery device, 24 hours after applying the transdermal delivery device, 48 hours after applying the transdermal delivery device, 72 hours after applying the transdermal delivery device, 76 hours after applying the transdermal delivery device, 80 hours after applying the transdermal delivery device, 84 hours after applying the transdermal delivery device, 96 hours after applying the transdermal delivery device, 120 hours after applying the transdermal delivery device and including 168 hours after applying the transdermal delivery device.

The transdermal dexmedetomidine flux may be determined one or more times at any given measurement period, such as 2 or more times, such as 3 or more times, including 5 or more times at each measurement period. An upper limit for the number of times the transdermal dexmedetomidine flux is determined is, in some instances, 10 times or fewer, such as 7 times or fewer, such as 5 times or fewer, such as 3 times or fewer and including 2 times or fewer. In certain embodiments, the number of times the transdermal dexmedetomidine flux is determined ranges such as from 2 times to 10 times, such as from 3 times to 9 times, such as from 4 times to 8 times and including from 5 times to 7 times.

In some embodiments, in maintaining the dexmedetomidine transdermal delivery device in contact with the subject the average cumulative amount of permeated dexmedetomidine increases at a substantially linear rate over the course of the dosage interval (e.g., 2 days or longer, such as 3 days or longer). By "substantially linearly" is meant that the cumulative amount of dexmedetomidine released from the transdermal composition increases at a substantially constant rate (i.e., defined by zero-order kinetics). As such, the change in rate of cumulative permeated dexmedetomidine increases or decreases by 10% or less at any given time while maintaining the transdermal composition in contact with the subject, such as 8% or less, such as 7% or less, such as 6% or less, such as 5% or less, such as 3% or less, such as 2.5% or less, such as 2% or less, and including 1% or less at any time while maintaining the dexmedetomidine transdermal delivery device in contact with the subject.

As described above, aspects of the invention include managing pain in a subject by applying a transdermal delivery device containing a dexmedetomidine composition and maintaining the dexmedetomidine delivery device in contact with the subject over a period of time sufficient to deliver a pain relieving effective amount of dexmedetomidine to the subject. In some embodiments, methods for managing pain may include maintaining the dexmedetomidine transdermal delivery device in contact with the subject in a manner sufficient to deliver a predetermined amount of dexmedetomidine to the subject. Where protocols include delivering a predetermined amount of dexmedetomidine to the subject, the amount of dexmedetomidine in dexmedetomidine transdermal compositions of interest may range from 0.001 mg to 50 mg, such as 0.005 to 40 mg, such as 0.01 mg to 30 mg, such as 0.05 to 20 mg, such as 0.1 mg to 15 mg, such as 0.5 mg to 12.5 mg and including from 0.5 mg to 10 mg, such as 0.5 mg to 2 mg or 0.7 mg to 1.5 mg, 2 to 10 mg, including 4 to 9 mg, e.g., 6 to 8 mg.

In certain embodiments, the predetermined amount of dexmedetomidine delivered to the subject may be a percentage of the total amount of dexmedetomidine present in the dexmedetomidine transdermal composition of the transdermal delivery device. For instance, the predetermined amount of dexmedetomidine delivered to the subject may be 1% or greater of the total amount of dexmedetomidine present in the dexmedetomidine transdermal composition, such as 2% or greater, such as 5% or greater, such as 10% or greater, such as 25% or greater and including 50% or greater of the total amount of dexmedetomidine present in the dexmedetomidine transdermal composition. In other words, methods for managing pain may include maintaining the dexmedetomidine transdermal composition in contact with the subject in a manner sufficient to deliver 5% or greater of the dexmedetomidine in the dexmedetomidine transdermal composition to the subject over the course of a single dosage interval. In these embodiments, the utilization percentage of dexmedetomidine is 5% or greater during the time the transdermal delivery device is maintained in contact with the subject. As such, 95% or less of the original amount of dexmedetomidine remains in the dexmedetomidine transdermal composition after a dosage interval. As described in greater detail below, the subject transdermal delivery devices are capable of high utilization percentage. In other words, the subject transdermal delivery devices are capable of delivering dexmedetomidine to the subject leaving little residual dexmedetomidine in the transdermal delivery device after a given dosage interval. The utilization percentage may be 5% or greater over the course of a dosage interval, such as 10% or greater, such as 25% or greater, such as 40% or greater, such as 45% or greater and including 50% or greater of the dexmedetomidine over the course of a dosage interval. For utilization percentage, an upper limit over the course of a dosage interval is, in some instances, 90% or less, such as 50% or less, such as 25% or less and including 5% or less over the course of a dosage interval.

For instance, where the subject dexmedetomidine transdermal composition contains 1 mg of dexmedetomidine, methods for managing pain may include maintaining the transdermal delivery device in contact with the subject in a manner sufficient to deliver 0.05 mg or more of dexmedetomidine in the dexmedetomidine transdermal composition over the course of the dosage interval (e.g., 2 to 3 days or longer), such as 0.1 mg or more, such as 0.25 mg or more, such as 0.4 mg or more, such as 0.45 mg or more and including maintaining the transdermal delivery device in contact with the subject in a manner sufficient to deliver 0.5 mg or more of dexmedetomidine in the dexmedetomidine composition. As such, 0.95 mg or less of dexmedetomidine remains in the dexmedetomidine transdermal composition after 2 to 3 days or longer, such as 0.9 mg or less, such as 0.75 mg or less, such as 0.6 mg or less and including 0.5 mg or less of dexmedetomidine remains in the dexmedetomidine transdermal composition after the dosage interval.

As described above, methods according to certain embodiments include applying one or more of the subject transdermal delivery devices having a dexmedetomidine composition to a subject that is not experiencing pain and maintaining the transdermal delivery device in contact with the subject in a manner sufficient to deliver an amount of dexmedetomidine that is effective to prevent an amount of pain in the subject. In embodiments, the transdermal delivery device is applied to a skin surface of the subject before pain is experienced (or expected to be experienced) by the subject (e.g., in response to a pain-inducing event, such as a surgical procedure), such as 1 hour or more before pain is experienced (or expected to be experienced), such as 2 hours or more, such as 3 hours or more, such as 4 hours or more, such as 6 hours or more, such as 8 hours or more, such as 12 hours or more, such as 16 hours or more, such as 20 hours or more and including 24 hours or more before the pain inducing event.

Applying the transdermal delivery device containing dexmedetomidine according to embodiments of the present invention before the subject experiences pain is, in certain embodiments, sufficient to reduce the amount of pain experienced by the subject by 5% or more as compared to a subject not applied with the subject transdermal delivery devices containing dexmedetomidine, such as by 10% or more, such as by 15% or more, such as by 25% or more, such as by 50% or more, such as by 75% or more, such as by 90% or more, such as by 95% or more and including by 99% or more. In certain instances, methods include applying a transdermal delivery device containing dexmedetomidine to a subject not experiencing pain and maintaining the transdermal delivery device in contact with the subject in a manner sufficient to altogether eliminate any pain (i.e., reduce the amount of pain by 100%) experienced by the subject in response to a pain-inducing event. For example, subjects may experience a reduced amount of pain in response to a surgical procedure when the transdermal delivery device is applied before the onset of surgery, such as 1 hour or more before the onset of surgery, such as 2 hours or more, such as 3 hours or more, such as 4 hours or more, such as 6 hours or more, such as 8 hours or more, such as 12 hours or more, such as 16 hours or more, such as 20 hours or more and including 24 hours or more before the onset of surgery.

As described in greater detail below, in certain embodiments, transdermal delivery devices may include a single layer matrix dexmedetomidine composition that is configured to deliver a non-sedative amount of dexmedetomidine to a subject. As such, methods according to certain instances include applying to a subject a transdermal delivery device having a single layer matrix dexmedetomidine composition and maintaining the single layer dexmedetomidine composition in contact with the subject over a period of time sufficient to deliver an effective amount of dexmedetomidine to the subject.

In certain embodiments, each of the subject methods described in greater detail below may further include the step of removing the transdermal delivery device(s) from contact with the subject at the conclusion of a dosage interval. For example, a transdermal delivery device may be removed from contact with the subject after maintaining the transdermal delivery device in contact with the subject for 0.5 hours or more, such as 1 hour or more, such as 2 hours or more, such as 4 hours or more, such as 8 hours or more, such as 12 hours or more, such as 24 hours or more, such as 36 hours or more, such as 48 hours or more, such as 60 hours or more, such as 72 hours or more, such as 96 hours or more, such as 120 hours or more, including 144 hours or more, and including 168 hours or more. An upper limit for the amount of time the transdermal delivery device is maintained in contact with a subject before removal is, in some instances, 168 hours or shorter, such as 144 hours or shorter, such as 120 hours or shorter, such as 96 hours or shorter, such as 84 hours or shorter, such as 78 hours or shorter, such as 72 hours or shorter.

By "removing" the transdermal delivery device from contact with the subject is meant that the transdermal delivery device does not remain in contact with the subject. In other words, when the transdermal delivery device is removed it no longer contacts the surface of the skin or mucous membrane at the application site.

As described above, a dosage interval is a single administration of applying and maintaining one or more, e.g., two, transdermal delivery devices in contact with the subject which begins with applying the transdermal dexmedetomidine composition(s) to the skin or mucous membrane of the subject and ends with the removal of the transdermal delivery device(s) from contact with the subject. As reviewed above, in some embodiments protocols include a single dosage interval. Alternatively, in certain embodiments, protocols may include multiple dosage intervals. By "multiple dosage intervals" is meant more than one transdermal delivery device is applied and maintained in contact with the subject in a sequential manner. As such, a transdermal delivery device is removed from contact with the subject and a new transdermal delivery device is reapplied to the subject. In practicing methods of the invention, management regimens may include two or more dosage intervals, such as three or more dosage intervals, such as four or more dosage intervals, such as five or more dosage intervals, including ten or more dosage intervals.

In certain embodiments, methods further include hydrating the subject. The term "hydrating" is used herein in its conventional sense to provide hydration to the subject such as by administering a hydration fluid composition (e.g., aqueous fluids) to the subject. The hydration fluid composition may be provided to the subject by any suitable protocol, including but not limited to oral or intravenous administration. In certain embodiments, an amount of fluids is intravenously administered to the subject. Hydration fluids administered to the subject may be any suitable composition that provides increased hydration to the subject, such as determined by a qualified health care professional, including but not limited to aqueous saline solutions, electrolyte replenishing fluids, buffered fluids, nutritional fluids and the like. In some instances, the hydrating fluids are intravenously administered, such as a balanced salt/electrolyte solution, including isotonic, hypertonic and hypotonic electrolyte solutions. Example hydrating fluids according to certain embodiments may be lactated Ringer's solution, normal saline, D5 lactated Ringer's dextrose solution, D5 normal saline dextrose solution, D5,45 normal saline dextrose solution, D5,25 normal saline dextrose solution, 7.5% normal saline solution, D5 free water dextrose solution, 6% hydroxyethyl start solution, among other types of hydrating fluids.

The subject may be hydrated at any convenient time during methods of the present invention. An amount of the hydration fluid composition may be administered to the subject before a surgical procedure, during the surgical procedure, after the surgical procedure or any combination thereof. In some embodiments, the hydration fluid composition is administered to the in conjunction with applying the transdermal delivery device to the subject and may continue for as long as the transdermal delivery device is maintained in contact with the subject. In certain instances, the hydration fluid composition is administered for a duration before applying the transdermal delivery device to the subject, such as for 1 minute or more before applying the transdermal delivery device to the subject, such as for 2 minutes or more before, such as for 5 minutes or more before, such as for 10 minutes or more before, such as for 15 minutes or more before, such as for 30 minutes or more before, such as for 1 hour or more before, such as for 2 hours or more before, such as for 3 hours or more before, such as 6 for hours or more before and including for 12 hours or more before applying the transdermal delivery device to the subject. In some embodiments, the hydration fluid composition is continuously administered to the subject while the transdermal delivery device is maintained in contact with the subject. Hydration may also be continued after removing the transdermal delivery device from the subject, such as for 1 minute or longer, such as for 2 minutes or longer, such as for 5 minutes or longer, such as for 10 minutes or longer, such as for 15 minutes or longer, such as for 30 minutes or longer, such as for 1 hour or longer, such as for 2 hours or longer, such as for 3 hours or longer, such as for 6 hours or longer and including for 12 hours or longer after removing the transdermal delivery device from the subject.

In other instances, the hydration fluid composition is administered at a time before commencement of the surgical procedure on the subject, such as 1 minute or more before commencement of the surgical procedure on the subject, such as 2 minutes or more before, such as 5 minutes or more before, such as 10 minutes or more before, such as 15 minutes or more before, such as 30 minutes or more before, such as 1 hour or more before, such as 2 hours or more before, such as 3 hours or more before, such as 6 hours or more before and including for 12 hours or more before commencement of the surgical procedure on the subject. In some embodiments, the hydration fluid composition is continuously administered to the subject while the transdermal delivery device is maintained in contact with the subject and during the surgical procedure. Hydration may also be continued after the surgical procedure on the subject is completed, such as for 1 minute or longer, such as 2 minutes or longer, such as for 5 minutes or longer, such as for 10 minutes or longer, such as for 15 minutes or longer, such as for 30 minutes or longer, such as from 1 hour or longer, such as for 2 hours or longer, such as for 3 hours or longer, such as for 6 hours or longer and including for 12 hours or longer after the surgical procedure on the subject is completed.

In some embodiments, the method includes administering the hydration fluid composition to the subject at a first rate for a first predetermined period of time; and administering the hydration fluid composition to the subject at a second rate for a second predetermined period of time.

In one example, the method includes orally administering the hydration fluid composition to the subject at a first rate for a first predetermined period of time; and orally administering the hydration fluid composition to the subject at a second rate for a second predetermined period of time. For example, the method may include orally administering the hydration fluid composition to the subject at a rate of from 450 mL/h to 550 mL/h for two hours; and orally administering the hydration fluid composition to the subject at a rate of from 100 mL/h to 150 mL/h for 12 hours after the initial two hours. In certain instances, methods for hydrating a subject include orally administering the hydration fluid composition to the subject at a rate of 500 mL/h for two hours; and orally administering the hydration fluid composition to the subject at a rate of 125 mL/h for 12 hours after the initial two hours.

In another example, the method includes intravenously administering the hydration fluid composition to the subject at a first infusion rate for a first predetermined period of time; and intravenously administering the hydration fluid composition to the subject at a second infusion rate for a second predetermined period of time. For example, the method may include intravenously administering the hydration fluid composition to the subject at a rate of from 450 mL/h to 550 mL/h for two hours; and intravenously administering the hydration fluid composition to the subject at a rate of from 100 mL/h to 150 mL/h for 12 hours after the initial two hours. In certain instances, methods for hydrating a subject include intravenously administering the hydration fluid composition to the subject at a rate of 500 mL/h for two hours; and intravenously administering the hydration fluid composition to the subject at a rate of 125 mL/h for 12 hours after the initial two hours.

In certain embodiments, a dexmedetomidine transdermal delivery device can be administered prior to, concurrent with, or subsequent to other therapeutic agents for treating or managing pain. If provided at the same time as another therapeutic agent, the subject dexmedetomidine may be administered by the transdermal delivery device in the same or in a different composition. Thus, dexmedetomidine delivery devices of interest and other therapeutic agents can be administered to the subject by way of concurrent therapy. By "concurrent therapy" is intended administration to a subject such that the therapeutic effect of the combination of the substances is caused in the subject undergoing therapy. For example, concurrent therapy may be achieved by administering dexmedetomidine by the transdermal delivery device of the invention and administering a pharmaceutical composition having at least one other agent, such as pain treatment compositions including but not limited to anesthetics, including anesthetics, e.g., intravenous agents, including non-opioid general anesthetic intravenous agents (such as but not limited to Propofol, Etomidate, Ketamine, Barbiturates (e.g., Amobarbital, Methohexital, Thiamylal, and Thiopental), Benzodiazepines (e.g., Diazepam, Lorazepam and Midazolam), opioid general anesthetic intravenous agents (such as but not limited to Alfentanil, Fentanyl, Remifentanil, Sufentanil, Buprenorphine, Butorphanol, diacetyl morphine, Hydromorphone, Levorphanol, Meperidine, Methadone, Morphine, Nalbuphine, Oxycodone, Oxymorphone, Pentazocine), inhaled general anesthetic agents (e.g., Desflurane, Enflurane, Halothane, Isoflurane, Methoxyflurane, Nitrous oxide, Sevoflurane and Xenon), local anesthetic agents (such as but not limited to procaine, amethocaine, lidocaine, prilocaine, bupivacaine, levobupivacaine, ropivacaine, mepivacaine and dibucaine), NSAIDS and COX2 inhibitors (aspirin, ibuprofen, naproxen, celecoxib, acetaminophen), opioids such as codeine, oxycodone, morphine, methadone, buprenorphine and fentanyl, antidepressants, anticonvulsants, dexmedetomidine agents, cannabinoids, N-methyl-D-Asparate, neuromodulators among other which in combination make up a therapeutically effective dose, according to a particular dosing regimen. Administration of the separate pharmaceutical compositions can be performed simultaneously or at different times (i.e., sequentially, in either order, on the same day, or on different days), so long as the therapeutic effect of the combination of these substances is caused in the subject undergoing therapy.

Depending on the second therapeutic agent being administered and the condition indicated, concurrent administration with dexmedetomidine may reduce the required administration amount of the second therapeutic agent. For example, concurrent administration with dexmedetomidine may reduce the amount of opioid or other analgesic required to effectively treat or manage pain, such as post-operative pain, chemotherapy-induced pain or radiation therapy induced pain. Concurrent administration with dexmedetomidine may reduce the required administration amount of the second therapeutic agent by 10% or more, such as 25% or more, such as 35% or more and including reducing the required administration amount of second therapeutic agent by 50% or more.

In certain embodiments, methods include co-administering one or more opioids to the subject. The term "opioid" is used herein in its conventional sense to refer to the naturally occurring or synthetic chemical substances that exert pharmacological action by interaction at opioid receptors (i.e., µ, κ and δ opioid receptors). In certain embodiments opioids are biosynthetic benzylisoquinoline alkaloids and may be opioid receptor agonists, antagonists and inverse agonists. The opioid may be administered to the subject at any time during the subject methods, such as before applying the dexmedetomidine transdermal delivery devices to the skin surface of the subject or after applying the dexmedetomidine transdermal delivery devices to the skin surface of the subject. Any convenient protocol may be employed to deliver the opioid to the subject, including but not limited to oral, intravenous, injection, transdermal or other delivery protocol. In some embodiments, methods include intravenously administering the opioid. In some embodiments, the opioid is perioperatively administered.

The type of opioid co-administered to the subject in methods according to these embodiments may vary, including but not limited to codeine, morphine, oripavine, pseudomorphine, thebaine, 14-dydroxymorphine, 2,4-dinitrophenylmorphine, 6-methyldihydromorphine, 6-methylenedihydrodesoxymorphine, 6-acetyldihydromorphine, azidomorphine, chlornaltrexamine, chloroxymorphamine, desomorphine (dihydrodesoxymorphine), dihydromorphine, ethyldihydromorphine, hydromorphinol, methyldesorphine, N-phenethylnormorphine, RAM-378, 6-nicotinoyldihydromorphine, acetylpropionylmorphine, diacetyldihydromorphine (dihydroheroin, acetylmorphinol), dibutyrylmorphine, dibenzoylmorphine, diformylmorphine, dipropanoylmorphine, heroin (diacetylmorphine), nicomorphine, 6-monoacetylcodeine, benzylmorphine, codeine methylbromide, desocodeine, dimethylmorphine (6-O-methylcodeine), ethyldihydromorphine, methyldihydromorphine (dihydroheterocodeine), ethylmorphine (dionine), heterocodeine, isocodeine, pholcodine (morpholinylethylmorphine), myrophine, nalodeine (N-allyl-norcodeine), transisocodeine, 14-cinnamoyloxycodeinone, 14-ethoxymetopon, 14-methoxymetopon, 14-phenylpropoxymetopon, 7-spiroindanyloxymorphone, 8,14-dihydroxydihydromorphinone, acetylcodone, acetylmorphone, α-hydrocodol, bromoisopropropyldihydromorphinone, codeinone, codorphone, codol, codoxime, IBNtxA, acetyldihydrocodeinone, dihydrocodeinone enol acetate, hydrocodone, hydromorphone, hydroxycodeine, methyldihydromorphinone, morphenol, morphinone, morphol, N-phenethyl-14-ethoxymetopon, oxycodone, oxymorphol, oxymorphone, pentamorphone, semorphone, α-chlorocodide, β-chlorocodide, α-chloromorphide, bromocodide, bromomorphide, chlorodihydrocodide, chloromorphide, codide, 14-hydroxydihydrocodeine, acetyldihydrocodeine, dihydrocodeine, dihydrodesoxycodeine, dihydroisocodeine, nicocodeine, nicodicodeine, 1-nitrocodeine, codeine-N-oxide, morphine-N-oxide, oxymorphazone, 1-bromocodeine, 1-chlorocodeine, 1-iodomorphine, codeine-N-oxide, heroin-7,8-oxide, morphine-6-glucuronide, 6-monoacetylmorphine, morphine-N-oxide, naltrexol, norcodeine, normorphine, 4-chlorophenylpyridomorphinan, cyclorphan, dextrallorphan, levargorphan, levorphanol, levophenacylmorphan, levomethorphan, norlevorphanol, N-methylmorphinan, oxilorphan, phenomorphan, methorphan, morphanol, Ro4-1539, stephodeline, Xorphanol, 1-nitroaknadinine, 14-episinomenine, 5,6-dihydronorsalutaridine, 6-keto nalbuphine, aknadinine, butorphanol, cephakicine, cephasamine, cyprodime, drotebanol, fenfangjine G, nalbuphine, sinococuline, sinomenine, tannagine, 5,9 alpha-diethyl-2-hydroxybenzomorphan (5,9-DEHB), 8-carboxamidocyclazocine (8-CAC), alazocine, anazocine, bremazocine, butinazocine, carbazocine, cogazocine, cyclazocine, dezocine, eptazocine, etazocine, ethylketocyclazocine, fedotozine, fluorophen, gemazocine, ibazocine, ketazocine, metazocine, moxazocine, pentazocine, phenazocine, quadazocine, thiazocine, tonazocine, volazocine, zenazocine, 4-fluoromeperidine, allylnorpethidine, anileridine, benzethidine, carperidine, difenoxin, diphenoxylate, etoxeridine, carbetidine, furethidine, hydroxypethidine, bemidone, morpheridine, meperidine-N-oxide, oxpheneridine, carbamethidine, pethidine, meperidine, norpethidine, pethidinic acid, pheneridine, phenoperidine, piminodine, properidine, ipropethidine, sameridine, allylprodine, (α/β)-meprodine, desmethylprodine (MPPP), PEPAP, (α/β)-prodine, prosidol, trimeperidine (promedol), acetoxyketobemidone, droxypropine, ketobemidone, methylketobemidone, propylketobemidone, alvimopan, loperamide, picenadol, dextromethadone, dipipanone, isomethadone, levoisomethadone, levomethadone, methadone, normethadone, norpipanone, phenadoxone (heptazone), pipidone (6-piperidine-4,4-diphenyl-5-methyl-hexanone-3 hydrochloride), alphaacetylmethadol, dimepheptanol (racemethadol), levacetylmethadol, noracetylmethadol, desmethylmoramide, dextromoramide, levomoramide, moramide intermediate, racemoramide, diethylthiambutene, dimethylthiambutene, ethylmethylthiambutene, piperidylthiambutene, pyrrolidinylthiambutene, thiambutene, tipepidine, dextropropoxyphene (propoxyphene), dimenoxadol, dioxaphetyl butyrate, levopropoxyphene, norpropoxyphene, diampromide, phenampromide, propiram, IC-26, isoaminile, lefetamine, R-4066, 3-allylfentanyl, 3-methylfentanyl, 3-methylthiofentanyl, 4-phenylfentanyl, alfentanil, alphamethylacetylfentanyl, alphamethylfentanyl, alphamethylthiofentanyl, benzylfentanyl, betahydroxyfentanyl, betahydroxythiofentanyl, betamethylfentanyl, brifentanil, carfentanil, fentanyl, lofentanil, mirfentanil, ocfentanil, ohmefentanyl, parafluorofentanyl, phenaridine, remifentanil, sufentanil, thenylfentanyl, thiofentanyl, trefentanil, 7-PET, acetorphine, alletorphine (N-allyl-noretorphine), BU-48, dexmedetomidine, cyprenorphine, dihydroetorphine, etorphine, homprenorphine, 18,19-dehydrodexmedetomidine, N-cyclopropylmethylnoretorphine, nepenthone, nordexmedetomidine, thevinone, thienorphine, ethoheptazine, meptazinol, metheptazine, metethoheptazine, proheptazine, bezitramide, piritramide, clonitazene, etonitazene, nitazene, 18-methoxycoronaridine, 7-acetoxymitragynine, 7-hydroxymitragynine, akuammidine, akuammine, eseroline, hodgkinsine, mitragynine, pericine, pseudoakuammigine, BW373U86, DPI-221, DPI-287, DPI-3290, SNC-80, dynorphin A, dynorphin B, β-endorphin, α-endorphin, γ-endorphin.α-neo-endorphin.β-neo-endorphin, DADLE, DAMGO, dermenkephalin, met-enkephalin, leu-enkephalin, adrenorphin, amidorphin, casomorphin, DALDA (Tyr-D-Arg-Phe-Lys-NH2), deltorphin, dermorphin, DPDPE, endomorphin, gliadorphin, morphiceptin, nociception, octreotide, opiorphin, rubiscolin, TRIMU 5, 3-(3-methoxyphenyl)-3-ethoxycarbonyltropane, AD-1211, AH-7921, azaprocin, BDPC, bisnortilidine, BRL-52537, bromadoline, C-8813, ciramadol, doxpicomine, enadoline, faxeladol, GR-89696, herkinorin, ICI-199,441, ICI-204,448, J-113,397, JTC-801, ketamine, KNT-42, LPK-26, methopholine, MT-45, desmethylclozapine, NNC 63-0532, nortilidine, O-desmethyltramadol, phenadone, phencyclidine, prodilidine, profadol, Ro64-6198, salvinorin A, SB-612,111, SC-17599, RWJ-394,674, TAN-67, tapentadol, oxycodone, tifluadom, tilidine, tramadol, trimebutine, α-50,488, U-69,593, viminol, 1-(4-nitrophenylethyl)piperidylidene-2-(4-chlorophenyl)sulfonamide (W-18), 5'-guanidinonaltrindole, β-fundaltrexamine, 6β-naltrexol, alvimopan, binaltorphimine, chlornaltrexamine, clocinnamox, cyclazocine, cyprodime, diacetylnalorphine, difenamizole, diprenorphine, fedotozine, JDTic, levallorphan, methocinnamox, methylnaltrexone, nalfurafine, nalmefene, nalmexone, naloxazone, naloxonazine, naloxone, naloxone benzoylhydrazone, nalorphine, naltrexone, naltriben, naltrindole, norbinaltorphimine, oxilorphan, S-allyl-3-hydroxy-17-thioniamorphinan, alimadol, anilopam HCl, asimadoline, FE 200665, fedotozine, MCOPPB, nalfurafine, nalorphine, nalorphine dinicotinate, SoRI-9409, among other opioids.

In certain embodiments, the applied dexmedetomidine transdermal delivery device as described herein when co-administered with an opioid may reduce the amount of opioid required to effectively treat or manage pain (e.g., post-surgical pain). In some instances, applying the dexmedetomidine transdermal delivery device according to the methods described above reduces the amount of co-administered opioid needed to manage pain by 1% or more by weight, such as by 2% or more by weight, such as by 3% or more by weight, such as by 5% or more by weight, such as by 10% or more by weight, such as by 15% or more by weight, such as by 25% or more by weight and including reducing the amount of co-administered opioid needed to manage pain by 50% or more by weight. In other words, the amount of opioid needed to manage the pain is reduced by 1% or more by weight as compared to the amount of opioid alone that is needed to manage pain, such as by 2% or more by weight, such as by 3% or more by weight, such as by 5% or more by weight, such as by 10% or more by weight, such as by 15% or more by weight, such as by 25% or more by weight and including where the amount of opioid needed to manage pain is reduced by 50% or more by weight as compared to the amount of opioid alone that is needed to manage the pain.

In some embodiments, the opioid are administered before applying the transdermal delivery device to the subject, such as 1 minute or more before applying the transdermal delivery device to the subject, such as 2 minutes or more before, such as 5 minutes or more before, such as 10 minutes or more before, such as 15 minutes or more before, such as 30 minutes or more before, such as 1 hour or more before, such as 2 hours or more before, such as 3 hours or more before, such as 6 hours or more before and including 12 hours or more before applying the transdermal delivery device to the subject. In other embodiments, the opioid is administered to the subject after applying the transdermal delivery device to the subject, such as 1 minute or more after applying the transdermal delivery device to the subject, such as 2 minutes or more, such as 5 minutes or more, such as 10 minutes or more, such as 15 minutes or more, such as 30 minutes or more, such as 1 hour or more, such as 2 hours or more, such as 3 hours or more, such as 6 hours or more and including 12 hours or more after applying the transdermal delivery device to the subject.

In other embodiments, the opioid are administered before commencement of the surgical procedure on the subject, such as 1 minute or more before commencement of the surgical procedure on the subject, such as 2 minutes or more before, such as 5 minutes or more before, such as 10 minutes or more before, such as 15 minutes or more before, such as 30 minutes or more before, such as 1 hour or more before, such as 2 hours or more before, such as 3 hours or more before, such as 6 hours or more before and including 12 hours or more before commencement of the surgical procedure on the subject. In other embodiments, the opioid is administered to the subject after commencement of the surgical procedure, such as 1 minute or more after commencement of the surgical procedure on the subject, such as 2 minutes or more, such as 5 minutes or more, such as 10 minutes or more, such as 15 minutes or more, such as 30 minutes or more, such as 1 hour or more, such as 2 hours or more, such as 3 hours or more, such as 6 hours or more and including 12 hours or more after commencement of the surgical procedure on the subject.

In certain embodiments, methods include replacing one or more dosages of administered opioids (e.g., opioid agonists) in an opioid pain-management regimen with a transdermal delivery device containing dexmedetomidine as described herein. The term "opioid pain-management regimen" refers to pain-management protocols (e.g., by a healthcare professional in a medical care facility, under the supervision by a health care professional or at a subject's home under the direction/prescription of a health care professional) having scheduled dose administrations of opioids to manage pain in the subject. For example, opioid pain-management regimens of interest may include pain-management protocols which employ a plurality of scheduled administrations of opioid dosages to manage, reduce or eliminate acute pain, chronic pain, neuropathic pain, pain associated with cancer, postoperative pain, moderate to severe pain, labor pain, perioperative pain, among other types of pain known for being managed my opioids. In certain embodiments, the opioid pain-management regimen replaced or supplemented by applying a transdermal delivery device containing dexmedetomidine as described herein is moderate-to-severe pain that typically require opioids and for which alternative pain alleviation protocols have proven inadequate.

Methods according to these embodiments include replacing one or more scheduled administration of opioids by applying a transdermal delivery device containing dexmedetomidine as described herein, such as 2 or more, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more scheduled administrations of opioids to manage pain. As such, applying and maintaining the transdermal delivery device containing dexmedetomidine as described herein may be sufficient to reduce the number of scheduled administrations of opioids in the opioid pain-management regimen by 5% or more, such as by 10% or more, such as by 15% or more, such as by 20% or more, such as by 25% or more, such as by 50% or more, such as by 75% or more, such as by 90% or more, such as by 95% or more and including reducing the number of scheduled administrations of opioids in the opioid pain-management regimen by 99% or more.

In certain embodiments, the subject methods are suitable for entirely replacing opioids (i.e., 100% of the administered opioid dosages) in the opioid pain-management regimen with a transdermal delivery device containing dexmedetomidine as described herein. In certain embodiments, methods include applying and maintaining one or more of the subject transdermal delivery devices containing dexmedetomidine in conjunction with administration of opioids in the opioid pain-management regimen, as described above. In some instances, a reduced dosage of opioid may be administered to the subject in the opioid pain-management regimen when the dexmedetomidine transdermal delivery device is in contact with the subject, such as where the dosage of each schedule administration of opioid in the opioid pain-management regimen is reduced by 5% or more, such as by 10% or more, such as by 15% or more, such as by 20% or more, such as by 25% or more, such as by 50% or more and including by 75% or more. In some instances, one or more of the scheduled doses of opioid administration is eliminated (i.e., skipped), such as every other scheduled dose of opioid administration, every 2 scheduled doses, every 3 scheduled doses, every 4 scheduled doses or some other interval. In certain instances, applying one of or more of the subject dexmedetomidine transdermal delivery devices is sufficient to eliminate sequential scheduled doses of opioid administration in the opioid pain-management regimen, such as 2 or more sequentially scheduled doses, such as 3 or more sequentially scheduled doses and include 4 or more sequentially scheduled doses of opioid administration in the opioid pain-management regimen.

In certain embodiments, methods include applying one or more of the subject dexmedetomidine transdermal delivery devices to manage obstetric pain associated with childbirth (e.g., labor and delivery). In these embodiments, the transdermal delivery device may be applied to the subject after the onset of labor (e.g., after the initial onset of labor contractions) or prior to the onset of labor and then maintained on the subject throughout labor and delivery as well as for an amount of time postpartum. For example, the dexmedetomidine can be administered by the transdermal delivery device 30 minutes or more, 1 hour or more, 2 hours or more, 5 hours or more, 8 hours or more, 9 hours or more, 10 hours or more, 11 hours or more, 12 hours or more, 15 hours or more, 18 hours or more, 24 hours or more, such as 1 day or more, prior to the onset of labor and maintained on the subject throughout labor and delivery. In some instances, the transdermal delivery device is applied anywhere from 0.50 to 30 hours prior to the onset of labor, such 1 to 24 hours prior to surgery. The subject compositions are then maintained on the subject for a period of time postpartum, where this postpartum maintenance period of time may vary, and in some instances is 1 hour or longer, such as 2 hours or longer, such as 4 hours or longer, such as 8 hours or longer, such as 12 hours or longer, such as 24 hours or longer, such as 48 hours or longer, such as 72 hours or longer, such as 96 hours or longer, such as 120 hours or longer, such as 144 hours or longer and including 168 hours or longer. For the above ranges an upper limit period of time is, in some instances, 168 hours or shorter, such as 144 hours or shorter, such as 120 hours or shorter, such as 96 hours or shorter, such as 72 hours or shorter, such as 48 hours or shorter and including 24 hours or shorter. In certain embodiments, extended transdermal delivery ranges such as from 0.5 hours to 168 hours, such as from 1 hour to 144 hours, such as from 1.5 hours to 120 hours, such from 2 hours to 96 hours, such as from 2.5 hours to 72 hours, such as from 3 hours to 72 hours. In certain embodiments, labor and delivery regimen is a multi-day transdermal dexmedetomidine delivery regimen spanning a period of time prior to and after labor and delivery procedure, wherein some instances this regimen ranges from 2 days to 30 days, such as from 2 days to 15 days, such as from 2 days to 7 days, such as from 2 days to 4 days and including from 2 days to 4 days, e.g., 3 days.

In some embodiments, the transdermal delivery device is applied and maintained in contact with the subject for a total duration of 72 hours. In one example, the transdermal delivery device in applied 4 hours before the onset of labor, maintained in contact with the subject during delivery and removed after a total duration of 72 hours. In another example, the transdermal delivery device in applied 6 hours before the onset of labor, maintained in contact with the subject during delivery and removed after a total duration of 72 hours. In yet another example, the transdermal delivery device in applied 12 hours before the onset of labor, maintained in contact with the subject during delivery and removed after a total duration of 72 hours. In yet another example, the transdermal delivery device in applied 18 hours before onset of labor, maintained in contact with the subject during delivery and removed after a total duration of 72 hours. In still another example, the transdermal delivery device in applied 24 hours before the onset of labor, maintained in contact with the subject during delivery and removed after a total duration of 72 hours. In still another example, the transdermal delivery device in applied 24 hours before the onset of labor, maintained in contact with the subject during delivery and removed after a total duration of 84 hours. In still another example, the transdermal delivery device in applied 24 hours before the onset of labor, maintained in contact with the subject during delivery and removed after a total duration of 96 hours.

In other embodiments, one or more of subject transdermal delivery devices is applied to subject a predetermined period of time (e.g., 4 hours, 6, hours, 12 hours, 18 hours, 24 hours, etc.) prior to the onset of labor and maintained in contact with the subject for 72 hours or more postpartum. As such, the total duration the transdermal delivery device is maintained in contact with the subject may be 76 hours or more, such as 80 hours or more, such as 84 hours or more, such as 90 hours or more and including 96 hours or more. In one example, the transdermal delivery device in applied 4 hours before the onset of labor, maintained in contact with the subject during delivery and retained in contact with the subject for 72 hours or more after the surgery. In another example, the transdermal delivery device in applied 6 hours before the onset of labor, maintained in contact with the subject during delivery and retained in contact with the subject for 72 hours or more postpartum. In yet another example, the transdermal delivery device in applied 12 hours before the onset of labor, maintained in contact with the subject during delivery and retained in contact with the subject for 72 hours or more postpartum. In yet another example, the transdermal delivery device in applied 18 hours before the onset of labor, maintained in contact with the subject during delivery and retained in contact with the subject for 72 hours or more postpartum. In still another example, the transdermal delivery device in applied 24 hours before the onset of labor, maintained in contact with the subject during delivery and retained in contact with the subject for 72 hours or more postpartum. In still another example, the transdermal delivery device in applied 24 hours before the onset of labor, maintained in contact with the subject during delivery and retained in contact with the subject for 84 hours or more postpartum. In still another example, the transdermal delivery device in applied 24 hours before onset of labor, maintained in contact with the subject during delivery and retained in contact with the subject for 96 hours or more postpartum.

Dexmedetomidine Transdermal Delivery Devices Containing a Dexmedetomidine Composition for Managing Surgical Pain in a Subject Aspects of the invention also include dexmedetomidine transdermal delivery devices for delivering an effective (e.g., sedative or non-sedative amount) amount of dexmedetomidine to a subject suitable for practicing the subject methods. Transdermal delivery devices of interest include a composition having dexmedetomidine and a pressure sensitive adhesive. Dexmedetomidine is the S-enantiomer of medetomidine described by the formula:

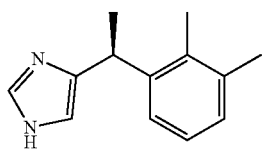

Dexmedetomidine according to embodiments of the invention may be in the form of a free base, salt, solvate, hydrate or complex. For example, dexmedetomidine may be in the form of a pharmaceutically acceptable salt including, but not limited to, a mesylate, maleate, fumarate, tartrate, hydrochloride, hydrobromide, esylate, p-toluenesulfonate, benzoate, acetate, phosphate and sulfate salt. Dexmedetomidine according to some embodiments may be a free base. In other instances, dexmedetomidine may form a complex.

Depending on the site of application, the type of pain being managed and the physiology of the subject (e.g., body mass), the amount of dexmedetomidine in compositions of interest may vary, in some instances, the amount of dexmedetomidine ranges from 0.001 mg to 50 mg, such as 0.005 mg to 40 mg, such as 0.01 to 30 mg, such as 0.05 to 20 mg, and including 0.1 mg to 10 mg. In some embodiments, the amount of dexmedetomidine in the transdermal composition ranges from 0.1% to 20% w/w, such as 0.5% to 18% w/w, such as 1% to 15%, such as 2% to 12.5% w/w and including 3% to 10% w/w. In other embodiments, the amount of dexmedetomidine in the subject transdermal compositions is 10% by weight or less of the total weight of the transdermal composition, such as 9% by weight or less, such as 8% by weight or less, such as 7% by weight or less, such as 6% by weight or less, such as 5% by weight or less and including 3% by weight or less of the total weight of the transdermal composition. In certain embodiments, dexmedetomidine compositions include an amount that is below the saturation point of dexmedetomidine. In other embodiments, dexmedetomidine compositions include a saturated amount of dexmedetomidine. In yet other embodiments, dexmedetomidine compositions include a supersaturated amount of dexmedetomidine.

In some embodiments of the invention, dexmedetomidine compositions described herein are formulated to deliver a non-sedative amount of dexmedetomidine. As described above, by non-sedative is meant that the dexmedetomidine composition is formulated to deliver an amount of dexmedetomidine to the subject that does not cause complete sedation of the subject. In other words, a subject remains conscious and responsive throughout the entire time dexmedetomidine compositions of interest are transdermally administered to the subject. In certain instances, throughout administration of the dexmedetomidine transdermal composition, the subject remains in a cooperative, oriented and tranquil state. In other instances, throughout administration of the dexmedetomidine transdermal composition, the subject remains alert and capable of responding to commands (e.g., oral or written commands). In yet other instances, throughout administration of the dexmedetomidine transdermal composition, the subject is in an alert, cooperative, oriented and tranquil state and is capable of responding to commands (e.g., oral or written commands).

As described in greater detail below, in some embodiments dexmedetomidine transdermal compositions of interest are formulated such that throughout transdermal administration the subject may be evaluated according to the Wilson Sedation Score system and assigned a Wilson score of 3 or less, such as a Wilson score of 2 or less, including where the subject is assigned a Wilson score of 1. In certain instances, throughout administration of the dexmedetomidine transdermal composition, the subject exhibits brisk response to light glabellar tap or loud auditory stimulus. In other instances, throughout administration of the dexmedetomidine transdermal composition, the subject is responsive to oral commands. In yet other instances, throughout administration of the dexmedetomidine transdermal composition, the subject is co-operative, oriented and tranquil. In yet other instances, throughout administration of the dexmedetomidine transdermal composition, the subject is anxious, agitated or restless.

In embodiments of the present invention, transdermal dexmedetomidine compositions also include a pressure sensitive adhesive. Pressure sensitive adhesives may include, but are not limited to, poly-isobutene adhesives, poly-isobutylene adhesives, poly-isobutene/polyisobutylene adhesive mixtures, carboxylated polymers, acrylic or acrylate copolymers, such as carboxylated acrylate copolymers.

Where the pressure sensitive adhesive includes polybutene, the polybutene may be saturated polybutene. Alternatively, the polybutene may be unsaturated polybutene. Still further, the polybutene may be a mixture or combination of saturated polybutene and unsaturated polybutene. In some embodiments, the pressure sensitive adhesive may include a composition that is, or is substantially the same as, the composition of Indopol® L-2, Indopol® L-3, Indopol®

L-6, Indopol® L-8, Indopol® L-14, Indopol® H-7, Indopol® H-8, Indopol® H-15, Indopol® H-25, Indopol® H-35, Indopol® H-50, Indopol® H-100, Indopol® H-300, Indopol® H-1200, Indopol® H-1500, Indopol® H-1900, Indopol® H-2100, Indopol® H-6000, Indopol® H-18000, Panalane® L-14E, Panalane® H-300E and combinations thereof. In certain embodiments, the polybutene pressure-sensitive adhesive is Indopol® H-1900. In other embodiments, the polybutene pressure-sensitive adhesive is Panalane® H-300E.

Acrylate copolymers of interest include copolymers of various monomers, such as "soft" monomers, "hard" monomers or "functional" monomers. The acrylate copolymers can be composed of a copolymer including bipolymer (i.e., made with two monomers), a terpolymer (i.e., made with three monomers), or a tetrapolymer (i.e., made with four monomers), or copolymers having greater numbers of monomers. The acrylate copolymers may be crosslinked or non-crosslinked. The polymers can be cross-linked by known methods to provide the desired polymers. The monomers from of the acrylate copolymers may include at least two or more exemplary components selected from the group including acrylic acids, alkyl acrylates, methacrylates, copolymerizable secondary monomers or monomers with functional groups. Monomers ("soft" and "hard" monomers) may be methoxyethyl acrylate, ethyl acrylate, butyl acrylate, butyl methacrylate, hexyl acrylate, hexyl methacrylate, 2-ethylbutyl acrylate, 2-ethylbutyl methacrylate, isooctyl acrylate, isooctyl methacrylate, 2-ethylhexyl acrylate, 2-ethylhexyl methacrylate, decyl acrylate, decyl methacrylate, dodecyl acrylate, dodecyl methacrylate, tridecyl acrylate, tridecyl methacrylate, acrylonitrile, methoxyethyl acrylate, methoxyethyl methacrylate, and the like. Additional examples of acrylic adhesive monomers are described in Satas, "Acrylic Adhesives," Handbook of Pressure-Sensitive Adhesive Technology, 2nd ed., pp. 396-456 (D. Satas, ed.), Van Nostrand Reinhold, New York (1989), the disclosure of which is herein incorporated by reference. In some embodiments, the pressure sensitive adhesive is an acrylate-vinyl acetate copolymer. In some embodiments, the pressure sensitive adhesive may include a composition that is, or is substantially the same as, the composition of Duro-Tak® 87-9301, Duro-Tak® 87-200A, Duro-Tak® 87-2353, Duro-Tak® 87-2100, Duro-Tak® 87-2051, Duro-Tak® 87-2052, Duro-Tak® 87-2194, Duro-Tak® 87-2677, Duro-Tak® 87-201A, Duro-Tak® 87-2979, Duro-Tak® 87-2510, Duro-Tak® 87-2516, Duro-Tak® 87-387, Duro-Tak® 87-4287, Duro-Tak® 87-2287, and Duro-Tak® 87-2074 and combinations thereof. The term "substantially the same" as used in this context refers to a composition that is an acrylate-vinyl acetate copolymer in an organic solvent solution. In certain embodiments, the acrylic pressure-sensitive adhesive is Duro-Tak® 87-2054.

For example, acrylate copolymers of interest may be formed from monomers of having the formula:

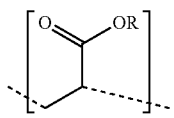

where R is hydrogen, linear alkyl, branched alkyl or a substituted alkyl thereof. In certain embodiments, the pressure sensitive adhesive is an acrylate adhesive that is a non-functionalized acrylate, hydroxyl-functionalized acrylate or an acid functionalized acrylate. For example, the acrylate adhesive may be an acrylic adhesive having one or more —OH functional groups. Where the acrylic adhesive has one or more —OH functional groups, in some instances, the pressure sensitive adhesive may be a composition that is, or is substantially the same as, the composition of Duro-Tak® 87-4287, Duro-Tak® 87-2287, Duro-Tak® 87-2510 and Duro-Tak® 87-2516 and combinations thereof. The acrylate adhesive may alternatively be an acrylic adhesive having one or more —COOH functional groups. Where the acrylic adhesive has one or more —COOH functional groups, in some instances, the pressure sensitive adhesive may be a composition that is or is substantially the same as, the composition of Duro-Tak® 87-387, Duro-Tak® 87-2979 and Duro-Tak® 87-2353 and combinations thereof. Still further, the acrylate adhesive may be a non-functionalized acrylic adhesive. Where the acrylic adhesive is non-functionalized, in some instances the pressure sensitive adhesive may be a composition that is or is substantially the same as, the composition of Duro-Tak® 87-9301.

The amount of pressure sensitive adhesive in transdermal dexmedetomidine compositions of interest may vary, the amount of pressure sensitive adhesive ranging from 0.1 mg to 2000 mg, such as 0.5 mg to 1500 mg, such as 1 to 1000 mg, such as 10 to 750 mg, and including 10 mg to 500 mg. As such, the amount of pressure sensitive adhesive in the transdermal composition ranges from 1% to 99% w/w, such as 5% to 95% w/w, such as 10% to 95%, such as 15% to 90% w/w and including 20% to 85% w/w. In other embodiments, the amount of pressure sensitive adhesive in the subject transdermal compositions is 70% by weight or greater of the total weight of the transdermal composition, such as 75% by weight or greater, such as 80% by weight or greater, such as 85% by weight or greater, such as 90% by weight or greater, such as 95% by weight or greater and including 97% by weight or greater of the total weight of the transdermal composition.

The weight ratio of pressure sensitive adhesive to dexmedetomidine in the subject compositions may range from 1:2 and 1:2.5; 1:2.5 and 1:3; 1:3 and 1:3.5 1:3.5 and 1:4; 1:4 and 1:4.5; 1:4.5 and 1:5; 1:5 and 1:10; 1:10 and 1:25; 1:25 and 1:50; 1:50 and 1:75; and 1:75 and 1:99 or a range thereof. For example, the weight ratio of pressure sensitive adhesive to dexmedetomidine in compositions of interest may range between 1:1 and 1:5; 1:5 and 1:10; 1:10 and 1:15; 1:15 and 1:25; 1:25 and 1:50; 1:50 and 1:75 or 1:75 and 1:99. Alternatively, the weight ratio of dexmedetomidine to pressure sensitive adhesive in the subject compositions ranges between 2:1 and 2.5:1; 2.5:1 and 3:1; 3:1 and 3.5:1; 3.5:1 and 4:1; 4:1 and 4.5:1; 4.5:1 and 5:1; 5:1 and 10:1; 10:1 and 25:1; 25:1 and 50:1; 50:1 and 75:1; and 75:1 and 99:1 or a range thereof. For example, the ratio of dexmedetomidine to pressure sensitive adhesive in compositions of interest may range between 1:1 and 5:1; 5:1 and 10:1; 10:1 and 15:1; 15:1 and 25:1; 25:1 and 50:1; 50:1 and 75:1; or 75:1 and 99:1.

In some embodiments, transdermal dexmedetomidine compositions may further include one or more crosslinked hydrophilic polymers. For example, the crosslinked polymer may be an amine-containing hydrophilic polymer. Amine-containing polymers may include, but are not limited to, polyethyleneimine, amine-terminated polyethylene oxide, amine-terminated polyethylene/polypropylene oxide, polymers of dimethyl amino ethyl methacrylate, and copolymers of dimethyl amino ethyl methacrylate and vinyl pyrrolidone. In certain embodiments, the crosslinked polymer is crosslinked polyvinylpyrrolidone, such as for example PVP-CLM.

The matrix may contain other additives depending on the adhesive used. For example, materials, such as PVP-CLM, PVP K17, PVP K30, PVP K90, that inhibit drug crystallization, have hygroscopic properties that improve the duration of wear, and improve the physical properties, e.g., cold flow, tack, cohesive strength, of the adhesive.

The amount of crosslinked polymer in dexmedetomidine compositions of interest may vary, the amount of crosslinked polymer ranging from 0.1 mg to 500 mg, such as 0.5 mg to 400 mg, such as 1 to 300 mg, such as 10 to 200 mg, and including 10 mg to 100 mg. As such, the amount of crosslinked polymer in the transdermal composition ranges from 2% to 30% w/w, such as 4% to 30% w/w, such as 5% to 25%, such as 6% to 22.5% w/w and including 10% to 20% w/w. In other embodiments, the amount of crosslinked polymer in the subject transdermal compositions is 8% by weight or greater of the total weight of the transdermal composition, such as 10% by weight or greater, such as 12% by weight or greater, such as 15% by weight or greater, such as 20% by weight or greater, such as 25% by weight or greater and including 30% by weight crosslinked polymer or greater of the total weight of the transdermal composition.

In certain embodiments, the subject transdermal dexmedetomidine compositions further include a dexmedetomidine solubility enhancer. By "solubility enhancer" is meant a compound or composition which increases the dexmedetomidine solubility in the subject compositions, such as, for example, to prevent any unwanted crystallization of dexmedetomidine in the composition. The dexmedetomidine solubilization enhancer may be incorporated into the dexmedetomidine composition in an amount ranging from 0.01% to 20% (w/w), such as from 0.05% to 15% (w/w), such as from 0.1% to 10% (w/w), such as from 0.5% to 8% (w/w) and including from 1% to 5% (w/w).

Example solubility enhancers include, but are not limited to acids including linolic acid, oleic acid, linolenic acid, stearic acid, isostearic acid, levulinic acid, palmitic acid, octanoic acid, decanoic acid, dodecanoic acid, tetradecanoic acid, hexadecanoic acid, octadecanoic acid (i.e., stearic acid), N-lauroyl sarcosine, L-pyroglutamic acid, lauric acid, succinic acid, pyruvic acid, glutaric acid, sebacic acid, cyclopentane carboxylic acid; acylated amino acids. Other solubility enhancers of interest may include, but is not limited to aliphatic alcohols, such as saturated or unsaturated higher alcohols having 12 to 22 carbon atoms (e.g., oleyl alcohol or lauryl alcohol); fatty acid esters, such as isopropyl myristate, diisopropyl adipate, lauryl lactate, propyl laurate, ethyl oleate and isopropyl palmitate; alcohol amines, such as triethanolamine, triethanolamine hydrochloride, and diisopropanolamine; polyhydric alcohol alkyl ethers, such as alkyl ethers of polyhydric alcohols such as glycerol, ethylene glycol, propylene glycol, 1,3-butylene glycol, diglycerol, polyglycerol, diethylene glycol, polyethylene glycol, dipropylene glycol, polypropylene glycol, polypropylene glycolmonolaurate, sorbitan, sorbitol, isosorbide, methyl glucoside, oligosaccharides, and reducing oligosaccharides, where the number of carbon atoms of the alkyl group moiety in the polyhydric alcohol alkyl ethers is preferably 6 to 20; polyoxyethylene alkyl ethers, such as polyoxyethylene alkyl ethers in which the number of carbon atoms of the alkyl group moiety is 6 to 20, and the number of repeating units (e.g. —O—$CH_2CH_2$—) of the polyoxyethylene chain is 1 to 9, such as but not limited to polyoxyethylene lauryl ether, polyoxyethylene cetyl ether, polyoxyethylene stearyl ether, and polyoxyethylene oleyl ether; glycerides (i.e., fatty acid esters of glycerol), such as glycerol esters of fatty acids having 6 to 18 carbon atoms, where the glycerides may be monoglycerides (i.e., a glycerol molecule covalently bonded to one fatty acid chain through an ester linkage), diglycerides (i.e., a glycerol molecule covalently bonded to two fatty acid chains through ester linkages), triglycerides (i.e., a glycerol molecule covalently bonded to three fatty acid chains through ester linkages), or combinations thereof, where the fatty acid components forming the glycerides include octanoic acid, decanoic acid, dodecanoic acid, tetradecanoic acid, hexadecanoic acid, octadecanoic acid (i.e., stearic acid) and oleic acid; middle-chain fatty acid esters of polyhydric alcohols; lactic acid alkyl esters; dibasic acid alkyl esters; acylated amino acids; pyrrolidone; pyrrolidone derivatives and combinations thereof. Additional types of solubility enhancers may include lactic acid, tartaric acid, 1,2,6-hexanetriol, benzyl alcohol, lanoline, potassium hydroxide (KOH), tris(hydroxymethyl)aminomethane, glycerol monooleate (GMO), sorbitan monolaurate (SML), sorbitan monooleate (SMO), laureth-4 (LTH), and combinations thereof. In certain embodiments, the solubility absorption enhancer is levulinic acid, lauryl lactate or propylene glycolmonolaurate.

The formulation of the subject transdermal dexmedetomidine composition may vary. For example, compositions of the invention may be in the form of a liquid solution or suspension, syrup, gel, foam or any combination thereof for application by the transdermal delivery device.

In some embodiments, the transdermal delivery device is configured to include a single layer matrix dexmedetomidine composition. By "single layer" is meant that the transdermal delivery device includes only a single layer of dexmedetomidine composition disposed on the surface of a substrate of the transdermal delivery device and does not include separate distinct layers for the pressure sensitive adhesive, transdermal dexmedetomidine composition, or if present any solubility enhancers. Likewise, single layer transdermal delivery devices of the present invention do not further include a separate dexmedetomidine reservoir (i.e., active agent reservoir) separate from the pressure sensitive adhesive. As such, single layer transdermal delivery devices of the present invention may include in a single matrix an amount of each of the components of the transdermal dexmedetomidine compositions necessary for practicing the subject methods, as described in greater detail below. For example, in some embodiments, single layer transdermal delivery devices of interest include a single layer matrix of dexmedetomidine and a pressure sensitive adhesive that is configured to deliver a non-sedative amount of dexmedetomidine to a subject. In another embodiment, single layer transdermal delivery devices of interest include a single layer matrix of dexmedetomidine, a pressure sensitive adhesive and a solubility enhancer that is configured to deliver a non-sedative amount of dexmedetomidine to a subject. In another embodiment, single layer transdermal delivery devices of interest include a single layer matrix of dexmedetomidine, a pressure sensitive adhesive and a fatty acid ester that is configured to deliver a non-sedative amount of dexmedetomidine to a subject. In certain embodiments, single layer transdermal delivery devices of interest include a single layer matrix having only dexmedetomidine and a pressure sensitive adhesive. Depending on the length of the dosage interval and the desired target dosage, the thickness of single layer matrices of interest may vary, in some instances ranging in thickness from 10 to 260 microns, such as 15 to 250 microns, such as 25 to 225 microns, such as 50 to 200 microns, such as 75 to 175 microns and including 20 to 130 microns such as 35 to 110 microns.

The size of subject transdermal delivery devices may vary, in some instances sized to cover the entire application site on the subject. As such, the transdermal delivery device may have a length ranging from 1 to 100 cm, such as from 1 to 60 cm and a width ranging from 1 to 100 cm, such as from 1 to 60 cm. As such, the area of the transdermal delivery device may range from 4 cm$^2$ to 10,000 cm$^2$, such as from 5 cm$^2$ to 1000 cm$^2$, such as from 10 cm$^2$ to 100 cm$^2$, such as from 15 cm$^2$ to 50 cm$^2$ and including from 20 cm$^2$ to 40 cm$^2$. In certain embodiments, the transdermal delivery device is sized to have an area of 30 cm$^2$. In certain instances, the transdermal delivery device is insoluble in water. By insoluble in water is meant that that the transdermal delivery device may be immersed in water for a period of 1 day or longer, such as 1 week or longer, including 1 month or longer, and exhibit little if any dissolution, e.g., no observable dissolution.

In certain embodiments, the transdermal delivery device as described above furthers includes an overlay backing layer. The overlay backing may be flexible, such as so that it can be brought into close contact with the desired application site on the subject. The overlay backing may be fabricated from a material that does not absorb the dexmedetomidine, and does not allow the dexmedetomidine to be leached from the matrix. Overlay backing layers of interest may include, but are not limited to, non-woven fabrics, woven fabrics, films (including sheets), porous bodies, foamed bodies, paper, composite materials obtained by laminating a film on a non-woven fabric or fabric, and combinations thereof.

Non-woven fabric may include polyolefin resins such as polyethylene and polypropylene; polyester resins such as polyethylene terephthalate, polybutylene terephthalate and polyethylene naphthalate; rayon, polyamide, poly(ester ether), polyurethane, polyacrylic resins, polyvinyl alcohol, styrene-isoprene-styrene copolymers, and styrene-ethylene-propylene-styrene copolymers; and combinations thereof. Fabrics may include cotton, rayon, polyacrylic resins, polyester resins, polyvinyl alcohol, and combinations thereof. Films may include polyolefin resins such as polyethylene and polypropylene; polyacrylic resins such as polymethyl methacrylate and polyethyl methacrylate; polyester resins such as polyethylene terephthalate, polybutylene terephthalate and polyethylene naphthalate; and besides cellophane, polyvinyl alcohol, ethylene-vinyl alcohol copolymers, polyvinyl chloride, polystyrene, polyurethane, polyacrylonitrile, fluororesins, styrene-isoprene-styrene copolymers, styrene-butadiene rubber, polybutadiene, ethylene-vinyl acetate copolymers, polyamide, and polysulfone; and combinations thereof. Papers may include impregnated paper, coated paper, wood free paper, Kraft paper, Japanese paper, glassine paper, synthetic paper, and combinations thereof.

Depending on the dosage interval and the desired target dosage, the size of the overlay backing may vary, and in some instances sized to cover the entire application site on the subject. As such, the backing layer may have a length ranging from 2 to 100 cm, such as 4 to 60 cm and a width ranging from 2 to 100 cm, such as 4 to 60 cm. In certain instances, the overlay backing layer may insoluble in water. By insoluble in water is meant that that the backing layer may be immersed in water for a period of 1 day or longer, such as 1 week or longer, including 1 month or longer, and exhibit little if any dissolution, e.g., no observable dissolution.

Transdermal delivery devices having a dexmedetomidine composition according to embodiments of the invention are non-irritable to the skin of the subject at the site of application. Irritation of the skin is referred to herein in its general sense to refer to adverse effects, discoloration or damage to the skin, such as for example, redness, pain, swelling or dryness. As such, in practicing methods with the subject transdermal delivery devices the quality of the skin remains normal and transdermal delivery is consistent throughout the entire dosage interval.

In some embodiments, skin irritation is evaluated to determine the quality and color of the skin at the application site and to determine whether any damage, pain, swelling or dryness has resulted from maintaining the transdermal composition in contact with the subject. The skin may be evaluated for irritation by any convenient protocol, such as for example using the Draize scale, as disclosed in Draize, J. H., *Appraisal of the Safety of Chemicals in Foods, Drugs and Cosmetics*, pp. 46-49, The Association of Food and Drug Officials of the United States: Austin, Texas, the disclosure of which is herein incorporated by reference. In particular, the skin may be evaluated at the transdermal application site for erythema or edema. For example, grades for erythema and edema may be assigned based on visual observation or palpation:

Erythema: 0=no visible redness; 1=very slight redness (just perceptible); 2=slight but defined redness; 3=moderately intense redness; 4=severe erythema (dark red discoloration of the skin) 5=eschar formation Edema: 0=no visible reactions or swelling; 1=very mild edema (just perceptible swelling); 2=mild edema (corners of area are well defined due to swelling); 3=moderate edema (up to 1 mm swelling); 4=severe edema (more than 1 mm swelling).

The site of application may be evaluated for skin irritation at any time during the subject methods. In some instances, the skin is evaluated for irritation while maintaining the transdermal delivery device in contact with the subject by observing or palpating the skin at regular intervals, e.g., every 0.25 hours, every 0.5 hours, every 1 hour, every 2 hours, every 4 hours, every 12 hours, every 24 hours, including every 72 hours, or some other interval. For instance, the site of application may be evaluated for skin irritation while maintaining the transdermal delivery device in contact with the subject, such as 15 minutes after applying the transdermal delivery device to the subject, 30 minutes after applying the transdermal delivery device, 1 hour after applying the transdermal delivery device, 2 hours after applying the transdermal delivery device, 4 hours after applying the transdermal delivery device, 8 hours after applying the transdermal delivery device, 12 hours after applying the transdermal delivery device, 24 hours after applying the transdermal delivery device, 48 hours after applying the transdermal delivery device, 72 hours after applying the transdermal delivery device, 76 hours after applying the transdermal delivery device, 80 hours after applying the transdermal delivery device, 84 hours after applying the transdermal delivery device, 96 hours after applying the transdermal delivery device, 120 hours after applying the transdermal delivery device, including 168 hours after applying the transdermal delivery device.

In other embodiments, the site of transdermal application is evaluated for skin irritation after the transdermal delivery device has been removed from contact with the subject. For example, the site of application may be evaluated for skin irritation 30 minutes after removing the transdermal delivery device, such as 1 hour after removing the transdermal delivery device, such as 2 hours after removing the transdermal delivery device, such as 4 hours after removing the transdermal delivery device, such as 8 hours after removing the transdermal delivery device, such as 12 hours after removing the transdermal delivery device, such as 24 hours after removing the transdermal delivery device, such as 48 hours after removing the transdermal delivery device, including 72 hours after removing the transdermal delivery device.

In some embodiments, the site of transdermal application is evaluated for skin irritation before the transdermal delivery device is applied to a subject, such as to record the skin color and texture before commencing a dosage interval. For example, the site of application may be evaluated for skin irritation 5 minutes before applying the transdermal delivery device, such as 10 minutes, such as 30 minutes, such as 60 minutes, such as 120 minutes, such as 240 minutes and including 480 minutes before applying the transdermal delivery device. Where methods include multiple dosage intervals applied sequentially, the site of application may be evaluated for skin irritation after each transdermal delivery device is removed and before the subsequent transdermal delivery device is applied. For example, when a first transdermal delivery device is removed, the site of application may be evaluated for skin irritation 2 hours, 24 hours and 48 hours after removal and before application of a second transdermal delivery device. A subsequent transdermal delivery device may be applied to the previous site of application immediately after evaluating the skin for irritation or may be applied after a predetermined time after evaluating the skin for irritation, such as 4 hours, 12 hours, 24 hours, 48 hours, 72 hours, 96 hours, 120 hours, 144 hours or 168 hours after evaluating the skin for irritation.

The site of application may be evaluated for skin irritation one or more times before, during or after a dosage interval, such as 2 or more times, such as 3 or more times, including 5 or more times before, during or after a dosage interval. An upper limit for the number of times the site of application may be evaluated for skin irritation before, during or after a dosage interval is, in some instances, 10 times or fewer, such as 7 times or fewer, such as 5 times or fewer, such as 3 times or fewer and including 2 times or fewer. In certain embodiments, the number of times the site of application may be evaluated for skin irritation before, during or after a dosage interval ranges such as from 2 times to 10 times, such as from 3 times to 9 times, such as from 4 times to 8 times and including from 5 times to 7 times. In certain embodiments, skin irritation may be monitored throughout the entire time the transdermal delivery device is maintained in contact with the subject, such by video monitoring.

Further aspects of the subject methods include methods for increasing pain threshold. As used herein, "increasing pain threshold" refers to a reduction, diminishment and/or minimization of pain associated with surgery, incision, trauma or wound (including reduced, diminished, and/or minimized subjective perception of pain). In yet another aspect, the subject methods provide for enhancing recovery from surgery, as well as enhancing recovery from wound, traumatic injury, and/or incision.

In certain embodiments, the subject methods include a diagnostic step. Individuals may be diagnosed as being in need of the subject methods using any convenient protocol. In addition, individuals may be known to be in need of the subject methods, e.g., they are suffering from a target disease condition or have been determined to be at risk for suffering from a target disease condition, prior to practicing the subject methods. Diagnosis or assessment of pain is well-established in the art. Assessment may be performed based on objective measure, such as observation of behavior such as reaction to stimuli, facial expressions and the like. Assessment may also be based on subjective measures, such as patient characterization of pain using various pain scales. See, e.g., Katz et al, Surg. CHn. North Am. (1999) 79 (2):231-52; Caraceni et al. J. Pain Symptom Manage (2002) 23(3):239-55.

Pain relief may also be characterized by time course of relief. Accordingly, in some embodiments, pain relief is subjectively or objectively observed after 1, 2, or a few hours (and in some embodiments, peaks at about 12-18 hours). In other embodiments, pain relief is subjectively or objectively observed at 24, 36, 48, 60, 72 or more hours following surgery (or activity associated with wound or trauma).

Utility

The subject dexmedetomidine transdermal delivery device and methods find use in a variety of applications, including preventing or treating surgical pain. Accordingly, the subject dexmedetomidine transdermal delivery device and methods are useful for treating, delaying development of and/or preventing surgical pain in subjects, including all mammals, both human and non-human, including the orders carnivore (e.g., dogs and cats), rodentia (e.g., mice, guinea pigs, and rats), lagomorpha (e.g. rabbits) and primates (e.g., humans, chimpanzees, and monkeys). In certain embodiments, the subjects, e.g., patients, are humans. Moreover, the subject dexmedetomidine transdermal delivery device and methods are useful in individuals having an incisional wound to tissue whether a cut, puncture or tear, whether internal or external. Such an incisional wound may occur accidentally as with traumatic wound or deliberately as with surgery.

Methods and transdermal delivery device of the invention, e.g., as described above, in some embodiments find use in the treatment of surgical pain arising from surgical procedures, e.g., which involve making an incision to a patient. The surgical pain may be perioperative pain and/or post-surgical pain. Surgical procedures with which the transdermal delivery device and methods may be used may vary, where surgical procedures may be a bony model surgery or a soft tissue surgery, including, but are not limited to: median sternotomies, laparoscopies, mastectomies, arthroplasties, osteotomies, cancer surgeries, knee surgeries, shoulder surgeries, among other types of surgeries. In embodiments, the surgeries are bunionectomies, total knee arthoplasties, hernia repairs, open cholecystectomies, total hip arthroplasties, or arthroscopic procedures for the shoulder and knee in a patient. In some embodiments, the surgical procedure is a dental surgical procedure, such as the surgical extraction of the molars (e.g., first, second or third adult molars)

In some instances, the methods and transdermal delivery device of the invention find use in the treatment of surgical pain associated with a bunionectomy. A bunion or hallux valgus is an inflammation or thickening of the joint capsule of the great toe. This inflammation causes injury and deformity to the joint due to abnormal bone growth. The great toe is forced in toward the rest of the toes, causing the head of the first metatarsal bone to jut out and rub against the side of the shoe; the underlying tissue becomes inflamed and a painful growth forms. As this bony growth develops, the bunion is formed as the big toe is forced to grow at an increasing angle towards the rest of the toes. A bunion may also develop in the fifth metatarsal bone, in which case it is known as a bunionette or tailors bunion. Bunions often develop from wearing narrow, high-heeled shoes with pointed toes, which puts enormous pressure on the front of the foot and causes the foot and toes to rest at unnatural angles. Injury in the joint may also cause a bunion to develop over time. Genetics play a factor in 10% to 15% of all bunion problems; one inherited deformity, hallux valgus, causes the bone and joint of the big toe to shift and grow inward, so that the second toe crosses over it. Flat feet, gout, and arthritis increase the risk for bunions. Bunion surgery, usually called a bunionectomy, is almost always done as an outpatient procedure. The procedure itself varies depending on the type and severity of the deformity. Although the procedure varies, the recovery is the same for all. Some of the bunionectomy procedures are named Akin, Austin Akin, Keller, Silver, Silver Akin, and Kalish depending on which area of the bone is cut and the type of cut that is made. Once the subject is in the operating room and after anesthesia has been started, a tourniquet is applied to either the thigh or ankle depending on the type of anesthesia. The tourniquet is used to prevent bleeding during surgery. After the tourniquet is applied, the foot and lower leg are washed in a sterile fashion to help prevent infection. The surgeon then makes an incision at the top of the great toe into the joint capsule.

Once the bone is exposed, the surgeon makes a cut in the bone in order to correct the deformity. This is called an "osteotomy". As defined herein, an osteotomy is a surgical procedure in which a bone is cut to shorten, lengthen or change its alignment. It is used for example to straighten a bone that has healed crookedly following a fracture. Bone is defined herein as a connective tissue consisting of bone-building osteoblasts, stationary osteocytes, and bone-destroying osteoclasts, embedded in a mineralized matrix infused with spaces and canals. In the case of the hallux valgus, a small piece of bone is removed and the bone realigned to correct the deformity. Tendon and other soft tissue correction may also be required in order to assure full correction is made.

Depending on the type of bunionectomy, fixation may be required. Fixation may be internal, percutaneous or by external means such as a cast or splint, surgical shoe, adhesive form or a dressing. In the bunionectomy the fixation is often internal. This is usually done with either screws or wire. Once the bone is realigned, the wound is irrigated with warm sterile saline and then sutured closed and a dressing applied. Recovery varies according to extent of the surgical procedure and each individual's rate of healing.

Usual post-operative care consists of rest, elevation, and ice for the first 3-5 days. Depending on the procedure performed some walking may be done in a special shoe during this time. A check-up is performed in the office and the bandage is changed. Often subjects will return to work after 3-7 days, depending on the requirements of the job. Skin usually heals in two weeks and at this time the stitches are removed. Bone takes 6-8 weeks to heal. Taking X-rays at regular intervals can assess the rate of bone healing. Any bunion surgery results in some stiffness. Physical therapy starts at the second or third week to minimize this stiffness, usually home exercises are sufficient. If these exercises are not performed, a poor result may occur due to excessive stiffness. Swelling gradually decreases and, at two months, providing sufficient healing of the bone has occurred, regular shoes may be worn. Regular activities can often be resumed at two to three months as tolerated. Some swelling may be present for six months or more. The recovery period varies according to procedure and each individual's rate of healing. Some factors such as circulation, smoking, bone quality, and general health can also have an effect.

As reviewed above, the methods and transdermal delivery device of the invention find use in the treatment for pain after bunionectomy surgery, and are effective in providing immediate effective relief of moderate to severe acute pain to patients following post-surgical procedures, particularly outpatient post-surgical procedures such as bunionectomy, such that the need for alternative pain relieve agents, e.g., NSAIDS, opioids, etc., can be delayed, reduced or eliminated altogether.

The term "acute pain" as used herein means pain that has a sudden onset and commonly declines over a short time (days, hours, minutes) and follows injury to the body and which generally disappears when the bodily injury heals. The intensity of the acute pain following a bunionectomy can be mild to moderate, moderate to moderately severe, or moderate to severe. Pain rating scales are used in daily clinical practice to measure pain intensity. The commonly used measurement scales include the Visual Analog Scale (VAS), the Graphic Rating Scale (GRS), the Simple Descriptor Scale (SDS), the Numerical Rating Scale (NRS), and the Faces Rating Scale (FRS). All of these scales have been documented as being valid measures of pain intensity. The three scales most commonly used in the U.S. are the numerical, word and faces scales. The visual analog scale (VAS) is a 10 cm. vertical or horizontal line with word anchors at the extremes, such as "no pain" on one end and "pain as bad as it could be" at the other. The patient is asked to make a mark along the line to represent pain intensity. The graphic rating scale (GRS) is a variation of the visual scale which adds words or numbers between the extremes. Wording added might include "no pain", "mild", "severe". The descriptor scale (SDS) is a list of adjectives describing different levels of pain intensity. For example pain intensity may be described as "no pain", "mild", "moderate" or "severe". The numerical pain rating scale (NPRS) refers to a numerical rating of 0 to 10 or 0 to 5 or to a visual scale with both words and numbers. The patient is asked to rate the pain with 0 being no pain and 10 being the worst possible pain. The faces scale was developed for use with children. This scale exists in several variations but relies on a series of facial expressions to convey pain intensity.

Grouping patients' rating of pain intensity as measured with a numerical scale ranging from 0 to 10 into categories of mild, moderate, and severe pain is useful for informing treatment decisions, and interpreting study outcomes. In 1995, Serlin and colleagues (Pain, 1995, 277-84) developed a technique to establish the cut points for mild, moderate, and severe pain by grading pain intensity and functional inference. Since then, a number of studies have been conducted to correlate the numerical scales, for example the NPRS, with cutpoints related to levels of pain intensity. Common severity cutpoints are (1 to 4) for mild pain, (5 to 6) for moderate pain, and (7 to 10) for severe pain.

The term "patient" as used herein refers to a warm blooded animal such as a mammal which is the subject of surgical trauma. It is understood that at least dogs, cats, mice and humans are within the scope of the meaning of the term. As used herein, the term "treatment", or a derivative thereof, contemplates partial or complete inhibition of acute pain, when a transdermal delivery device of the present invention is administered following the onset of acute pain. In one embodiment, a method is provided for treatment of acute pain following a post-surgical procedure, particularly following an osteotomy such as a bunionectomy.

Kits

Kits for use in practicing certain methods described herein are also provided. In certain embodiments, the kits include one or more transdermal delivery devices containing a dexmedetomidine composition having an amount of dexmedetomidine and pressure sensitive adhesive as described above. In certain embodiments, the kits include an adhesive overlay as described above. In a given kit that includes two or more of the subject transdermal delivery devices, the compositions may be individually packaged or present within a common container.

In certain embodiments, the kits will further include instructions for practicing the subject methods or means for obtaining the same (e.g., a website URL directing the user to a webpage which provides the instructions), where these instructions may be printed on a substrate, where substrate may be one or more of: a package insert, the packaging, reagent containers and the like. In the subject kits, the one or more components are present in the same or different containers, as may be convenient or desirable.

The following examples are offered by way of illustration and not by way of limitation. Specifically, the following examples are of specific embodiments for carrying out the present invention. The examples are for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

EXPERIMENTAL

I. MATERIALS AND METHODS

Preparation of Example Dexmedetomidine Transdermal Formulations

Formulations were prepared by mixing dexmedetomidine and a pressure sensitive adhesive in organic solvents (e.g., 30-60 wt % solid content in ethyl acetate, isopropyl alcohol, hexane, or heptane), followed by mixing. Once a homogeneous mixture was formed, the solution was cast on a release liner (siliconized polyester or fluoropolymer coated polyester sheets of 2-3 mils) and dried at 60°-80° C. for 10-90 minutes. The single layer adhesive films were then laminated to a PET backing, cut to the desired size, and pouched. In some instances, crosslinked polyvinylpyrrolidone (PVP-CLM), polyvinylpyrrolidone K90 (PVP K90), levulinic acid (LA), oleic acid (OA), lauryl lactate (LL), or propylene glycolmonolaurate (PGML) was added to the adhesive composition.

Transdermal Flux Tests

Human cadaver skin was used and epidermal layers (stratum corneum and viable epidermis) were separated from the full-thickness skin as skin membrane. Samples were die-cut with an arch punch to a final diameter of about 2.0 cm². The release liner was removed and the system was placed on top of the epidermis/stratum corneum with the dexmedetomidine adhesive layer facing the outer surface of the stratum corneum. Gentle pressure was applied to effect good contact between the adhesive layer and stratum corneum. The donor and receptor sides of the Franz cell were clamped together and the receptor solution containing a phosphate buffer at pH 6.5 and 0.01% gentamicin was added to the Franz cell. The cells were kept at 32° C.-35° C. for the duration of the experiment. Samples of the receptor solution were taken at regular intervals and the active agent concentration was measured by HPLC. The removed receptor solution was replaced with fresh solution to maintain sink conditions. The flux was calculated from the slope of cumulative amount of the drug permeated into the receiver compartment versus time plot.

II. EXAMPLES

Example 1

In-Vitro Flux Obtained from Dexmedetomidine Transdermal Composition Formulations in PIB/PB Polymers Pressure-sensitive adhesives used in this example are polyisobutylene/polybutene (PIB/PB) adhesives. The PIB/PB adhesives are mixtures of high molecular weight PIB (5% Oppanol B100), low molecular weight PIB (25% Oppanol B12) and a polybutene tackifier, e.g., Indopol H1900 or Panalane H-300e (20%) in organic solvent, e.g., heptane (50%). The combination was mixed for about 3 days, until the mixture was homogeneous. Example dexmedetomidine transdermal composition formulations are shown in Tables 1 and 2.

An in-vitro skin flux study was performed as described above with transdermal delivery devices having different concentrations of dexmedetomidine as shown in Table 1. The average dexmedetomidine in-vitro skin flux with respect to time is illustrated in FIG. 1. As depicted in FIG. 1, dexmedetomidine in-vitro skin flux was high in the initial hours in the case of 1% formulation (Formulation 1) as compared to higher drug loading (Formulations 2 and 3). Formulations 2 and 3 were found to have needle-like crystals of dexmedetomidine, therefore flux profile is constant and did not change with drug loading. However, no crystals were observed in Formulation 1. Formulation 1 includes a saturated or supersaturated amount of dexmedetomidine.

Figure 2:
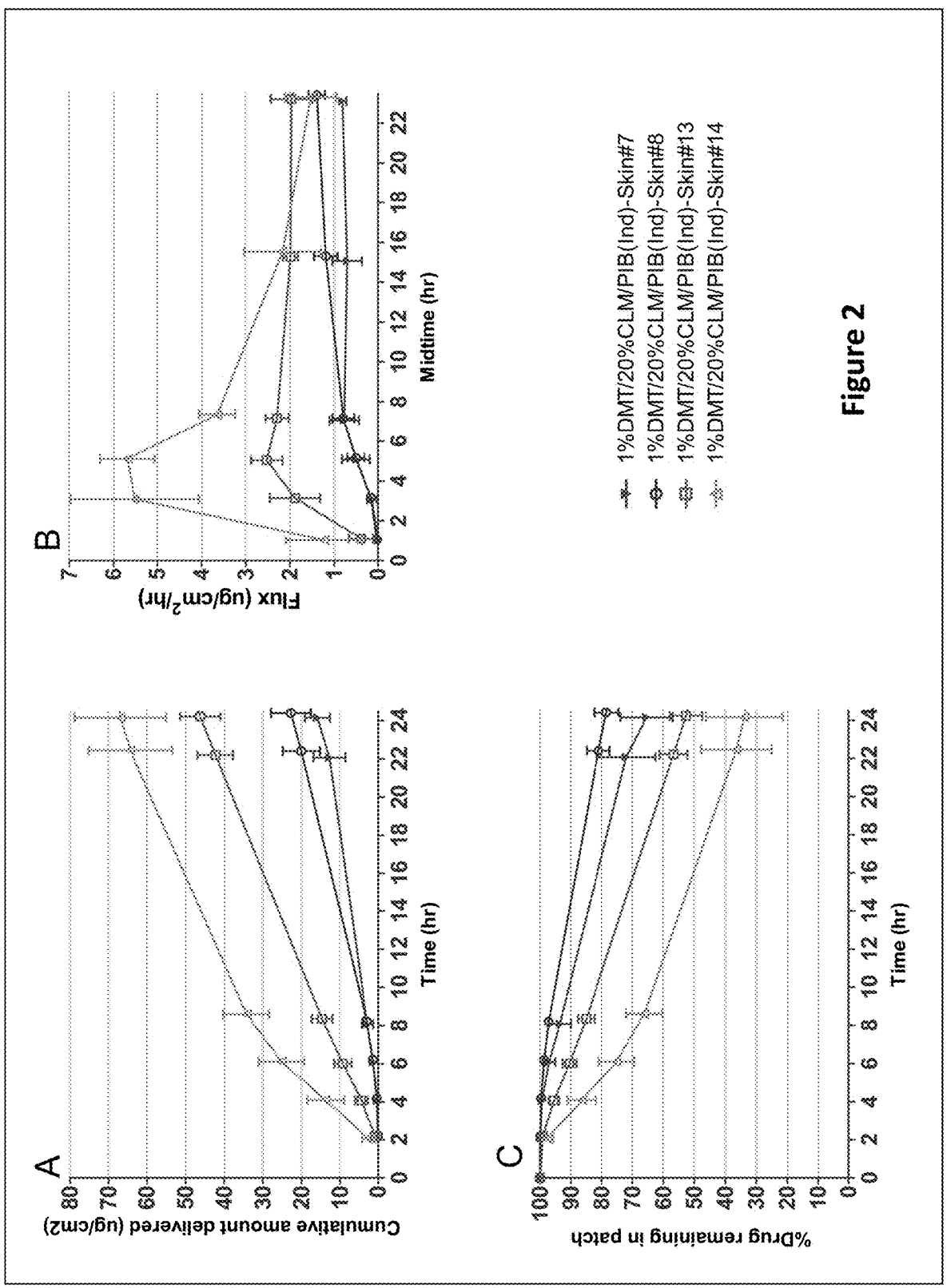
FIG. 2, Panel A shows an example of cumulative dexmedetomidine delivered amount with time according to one embodiment.

Dexmedetomidine transdermal formulation was also made using PIB made from Indopol H1900 as shown in Table 2. The results of dexmedetomidine in-vitro permeation from 1% dexmedetomidine formulation made with 20% PVP-CLM in PIB/PB adhesive (Formulation 4) through skins that have different skin permeability are illustrated in FIG. 2. FIG. 2(A) shows the cumulative dexmedetomidine delivered amount with time. The in-vitro permeation of dexmedetomidine deviated depending on the permeability of the skin. The in-vitro dexmedetomidine delivered amount could vary from 4-35 µg/cm2 at 8 hr. and 15-67 µg/cm2 at 24 hr. FIG. 2(B) shows the flux or derivative of cumulative drug delivered amount with respect to time. The delivery rate of dexmedetomidine from Formulation 2 reached the maximum at about 5-7 hr, then maintain constant for at least 24 hr. In case of high permeable skin (Skin#14), the flux might have decreased due to depletion. FIG. 2(C) shows the % drug remaining in patch with time. As depicted in FIG. 2(C), the utilization of dexmedetomidine obtained from Formulation 4 was 20-70% after applying the patch for 24 hr.

TABLE 1

| | % w/w | | |
| --- | --- | --- | --- |
| Components | Formulation 1 (1% DMT/20% CLM/PIB) | Formulation 2 (3% DMT/20% CLM/PIB) | Formulation 3 (5% DMT/20% CLM/PIB) |
| Dexmedetomidine | 1.00 | 3.00 | 5.00 |
| PVP-CLM | 20.00 | 20.00 | 20.00 |
| PIB/PB (Panalane H-300e) | 79.00 | 77.00 | 75.00 |

TABLE 2

| Components | % w/w Formulation 4 [1% DMT/20% CLM/PIB(Ind)] |
|---|---|
| Dexmedetomidine | 1.00 |
| PVP-CLM | 20.00 |
| PIB/PB (Indopol H1900) | 79.00 |

Example 2

Figure 3:
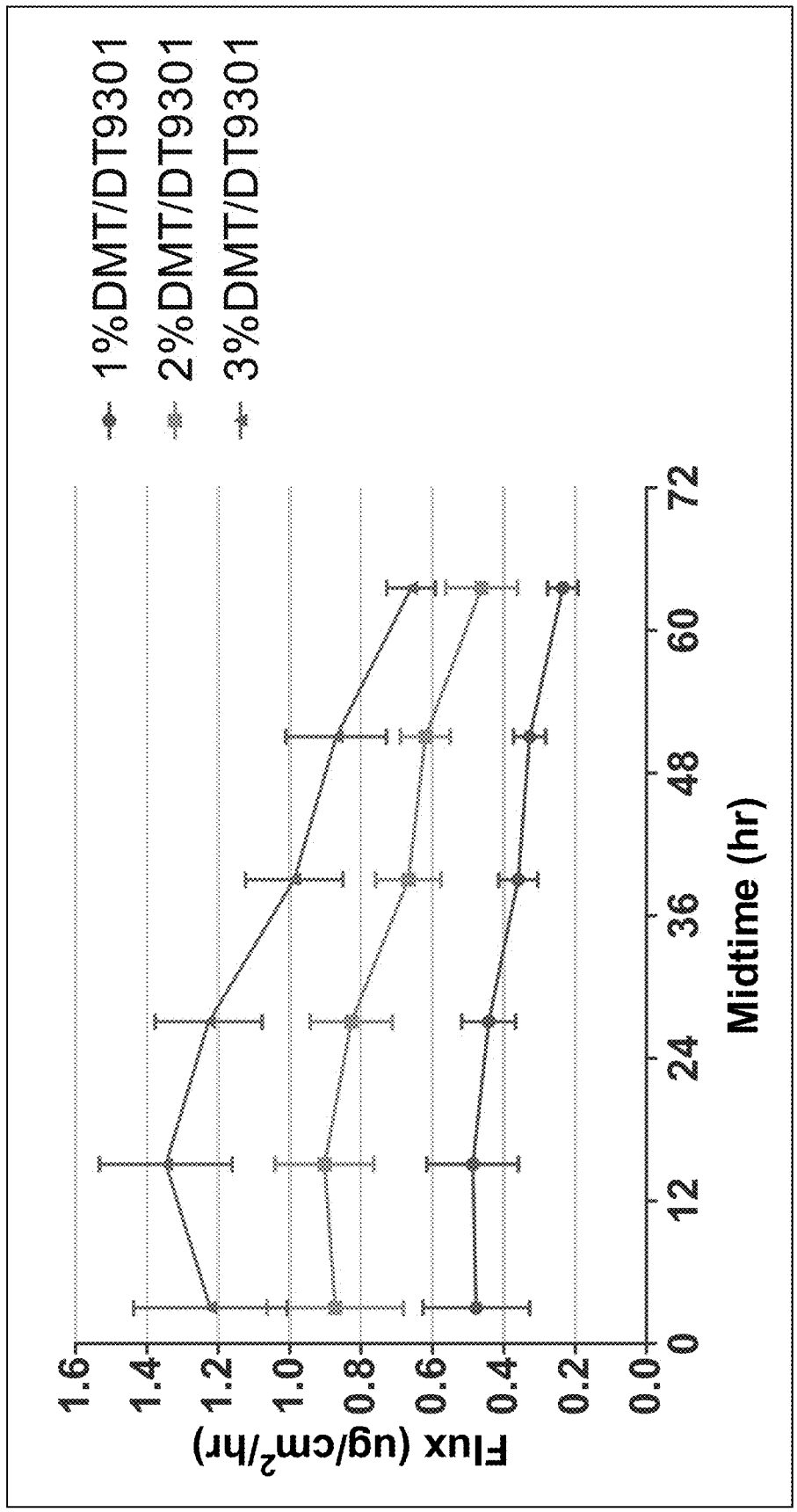
FIG. 3 shows an example of a plot of average dexmedetomidine flux as a function of transdermal delivery device application time for a dexmedetomidine transdermal composition having a non-functionalized acrylate adhesive according to one embodiment.

In-vitro Flux Obtained from Dexmedetomidine Transdermal Composition Formulations in Non-Functionalized Acrylate Polymers Dexmedetomidine in-vitro flux was measured using non-functionalized acrylate adhesive. An example of a non-functionalized acrylate adhesive used experimentally includes non-functionalized acrylate polymer Duro-Tak 87-9301. An in-vitro skin flux study was performed as described above with transdermal delivery devices having different concentrations of dexmedetomidine in non-functional Duro-Tak 87-9301. Dexmedetomidine transdermal composition formulations are shown in Table 3. The average dexmedetomidine in-vitro flux with respect to time is illustrated in FIG. 3. As depicted in FIG. 3, higher dexmedetomidine loading gave increased in-vitro skin flux.

TABLE 3

| | % w/w | | |
|---|---|---|---|
| Components | Formulation 5 (1% DMT/ DT9301) | Formulation 6 (2% DMT/ DT9301) | Formulation 7 (3% DMT/ DT9301) |
| Dexmedetomidine base | 1.00 | 2.00 | 3.00 |
| Pressure Sensitive Adhesive Duro-Tak 87-9301 | 99.00 | 98.00 | 97.00 |

Example 3

In-Vitro Flux Obtained from Dexmedetomidine Transdermal Composition Formulations in Hydroxyl (—OH) Functionalized Acrylate Polymers Dexmedetomidine in-vitro flux was measured using hydroxyl (—OH) functionalized acrylate adhesives. Examples of a hydroxyl functionalized acrylate adhesive used experimentally include hydroxyl functionalized acrylate polymers, e.g., Duro-Tak 87-4287, Duro-Tak 387/87-2510, Duro-Tak 387/87-2287 and Duro-Tak 387/87-2516. An in-vitro skin flux study was performed as described above with transdermal delivery devices having different concentrations of dexmedetomidine with different hydroxyl functionalized acrylate adhesives.

Figure 4:
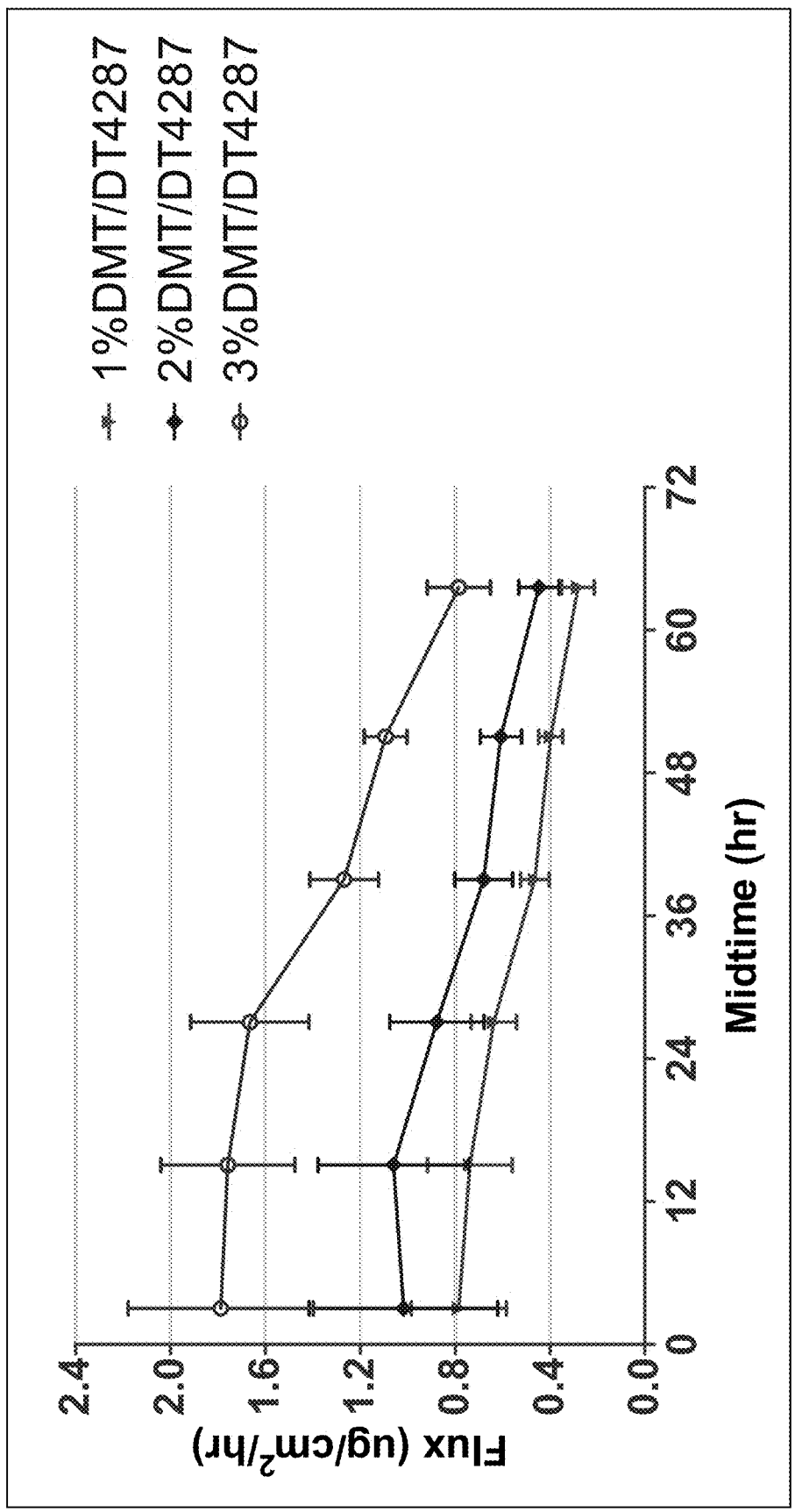
FIG. 4 shows an example of a plot of average dexmedetomidine flux as a function of transdermal delivery device application time for a dexmedetomidine transdermal composition having a hydroxyl functionalized acrylate adhesive containing vinyl acetate according to one embodiment.
Figure 5:
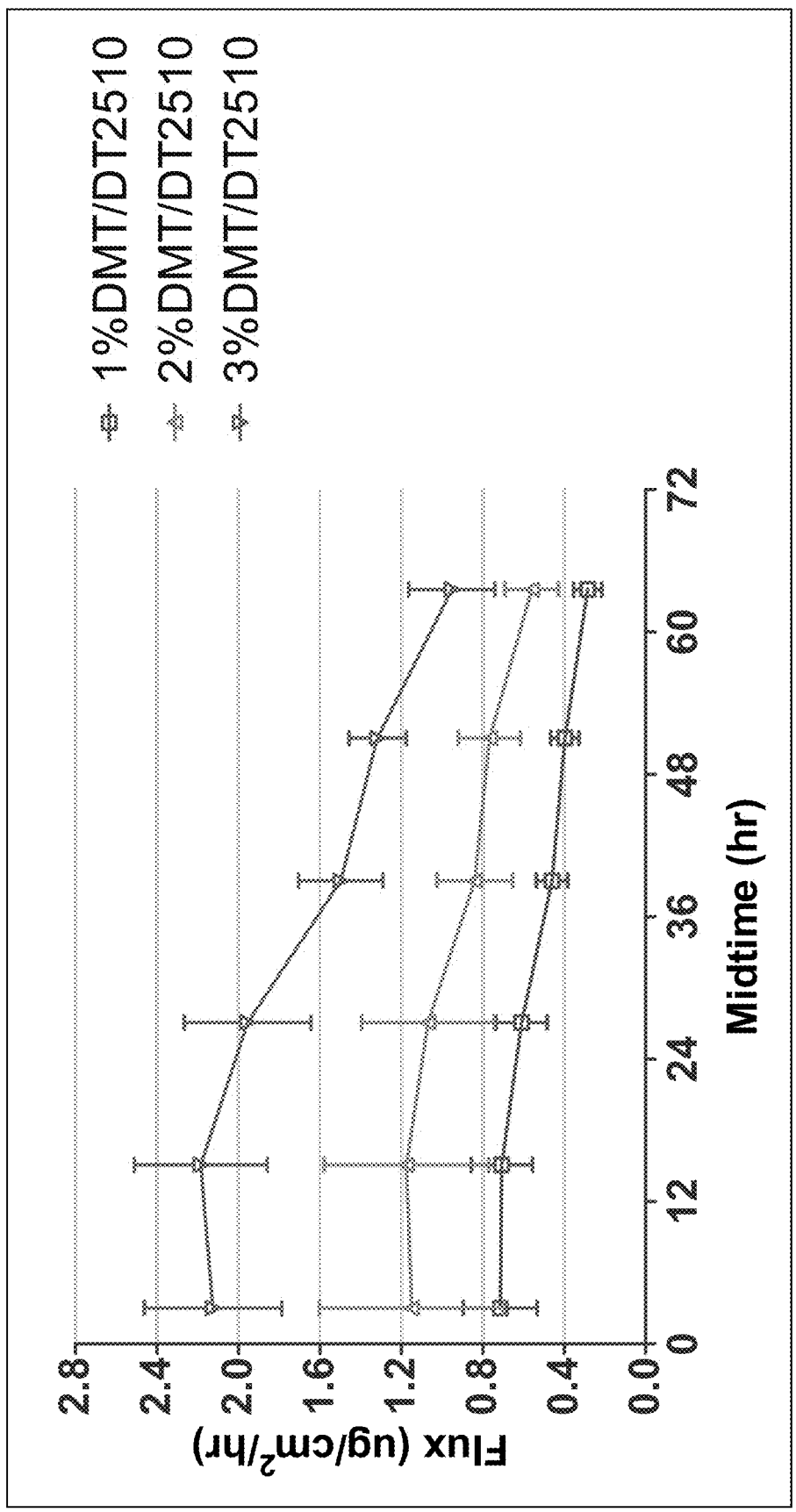
FIG. 5 shows an example of a plot of average dexmedetomidine flux as a function of transdermal delivery device application time for a dexmedetomidine transdermal composition having a hydroxyl functionalized acrylate adhesive according to another embodiment.

Tables 4 and 5 show the dexmedetomidine transdermal composition formulations with different concentrations of dexmedetomidine in Duro-Tak 87-4287 (acrylate-vinyl acetate polymer) or Duro-Tak 387/87-2510 (acrylate polymer). The mean dexmedetomidine in-vitro fluxes are illustrated in FIGS. 4 and 5. As depicted in FIGS. 4 and 5, dexmedetomidine in-vitro flux increased with the dexmedetomidine loading in the formulation.

TABLE 4

| | % w/w | | |
|---|---|---|---|
| Components | Formulation 8 (1% DMT/ DT4287) | Formulation 9 (2% DMT/ DT4287) | Formulation 10 (3% DMT/ DT4287) |
| Dexmedetomidine base | 1.00 | 2.00 | 3.00 |
| Pressure Sensitive Adhesive Duro-Tak 87-4287 | 99.00 | 98.00 | 97.00 |

TABLE 5

| | % w/w | | |
|---|---|---|---|
| Components | Formulation 11 (1% DMT/ DT2510) | Formulation 12 (2% DMT/ DT2510) | Formulation 13 (3% DMT/ DT2510) |
| Dexmedetomidine base | 1.00 | 2.00 | 3.00 |
| Pressure Sensitive Adhesive Duro-Tak 387/87-2510 | 99.00 | 98.00 | 97.00 |

Figure 6:
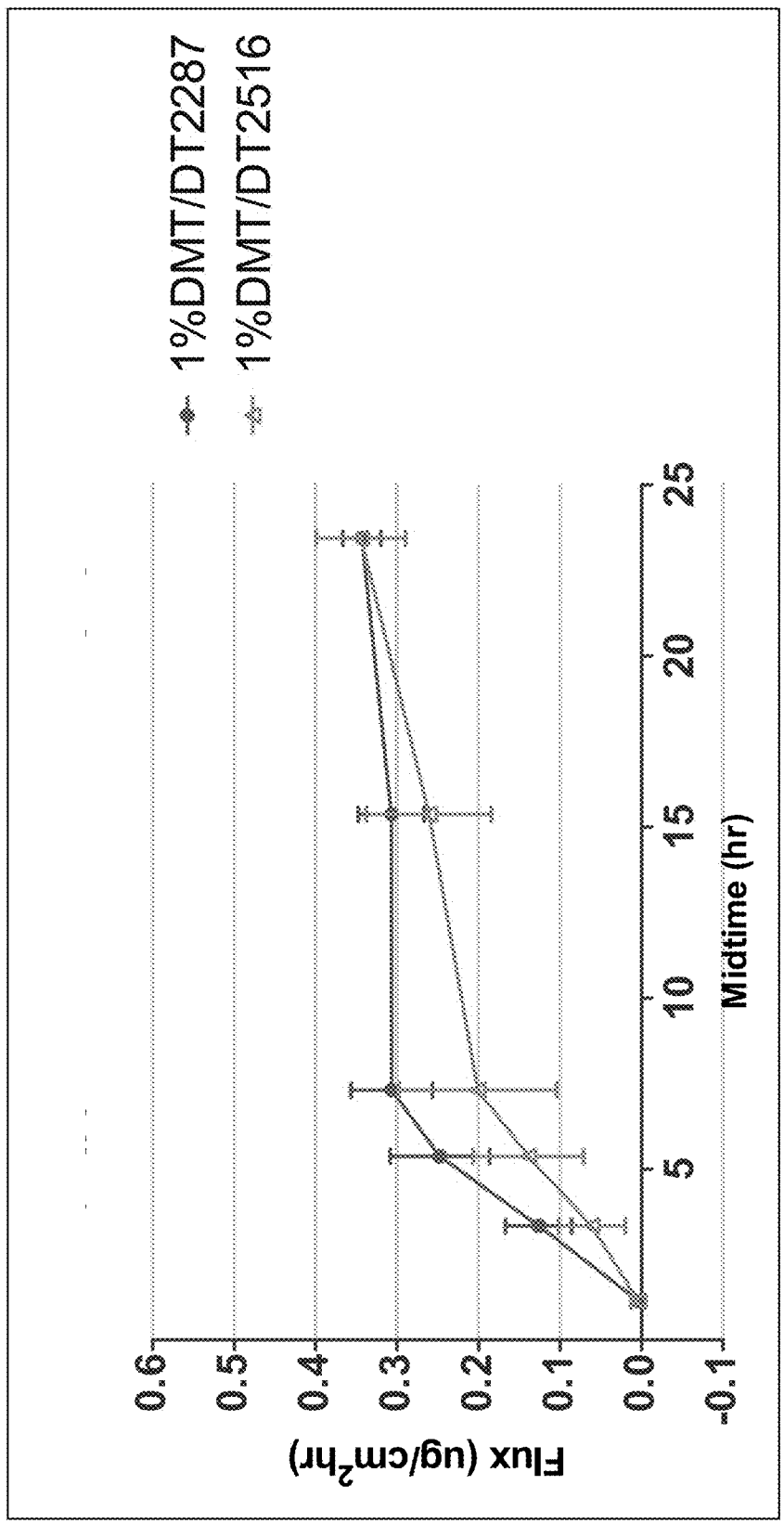
FIG. 6 shows an example of a plot of average dexmedetomidine flux as a function of transdermal delivery device application time for a dexmedetomidine transdermal composition having hydroxyl functionalized acrylate adhesive and a hydroxyl functionalized acrylate adhesive containing vinyl acetate according to another embodiment.

Tables 6 show the dexmedetomidine transdermal composition formulations containing 1% dexmedetomidine in another hydroxyl functionalized acrylate polymers containing vinyl acetate, e.g., Duro-Tak 87-2287 (no crosslinker added polymer) and Duro-Tak 87-2516 (crosslinker added polymer). The mean dexmedetomidine in-vitro fluxes are illustrated in FIG. 6. As depicted in FIG. 6, in-vitro flux obtained from Duro-Tak 387/87-2287 was slightly higher than that from Duro-Tak 387/87-2516, possibly resulting from the higher adhesion properties of Duro-Tak 387/87-2287 compared with Duro-Tak 387/87-2516.

TABLE 6

| | % w/w | |
|---|---|---|
| Components | Formulation 14 (1% DMT/DT2287) | Formulation 15 (1% DMT/DT2516) |
| Dexmedetomidine base | 1.00 | 1.00 |
| Pressure Sensitive Adhesive Duro-Tak 387/87-2287 | 99.00 | 0.00 |
| Pressure Sensitive Adhesive Duro-Tak 387/87-2516 | 0.00 | 99.00 |

Example 4

Figure 7A:
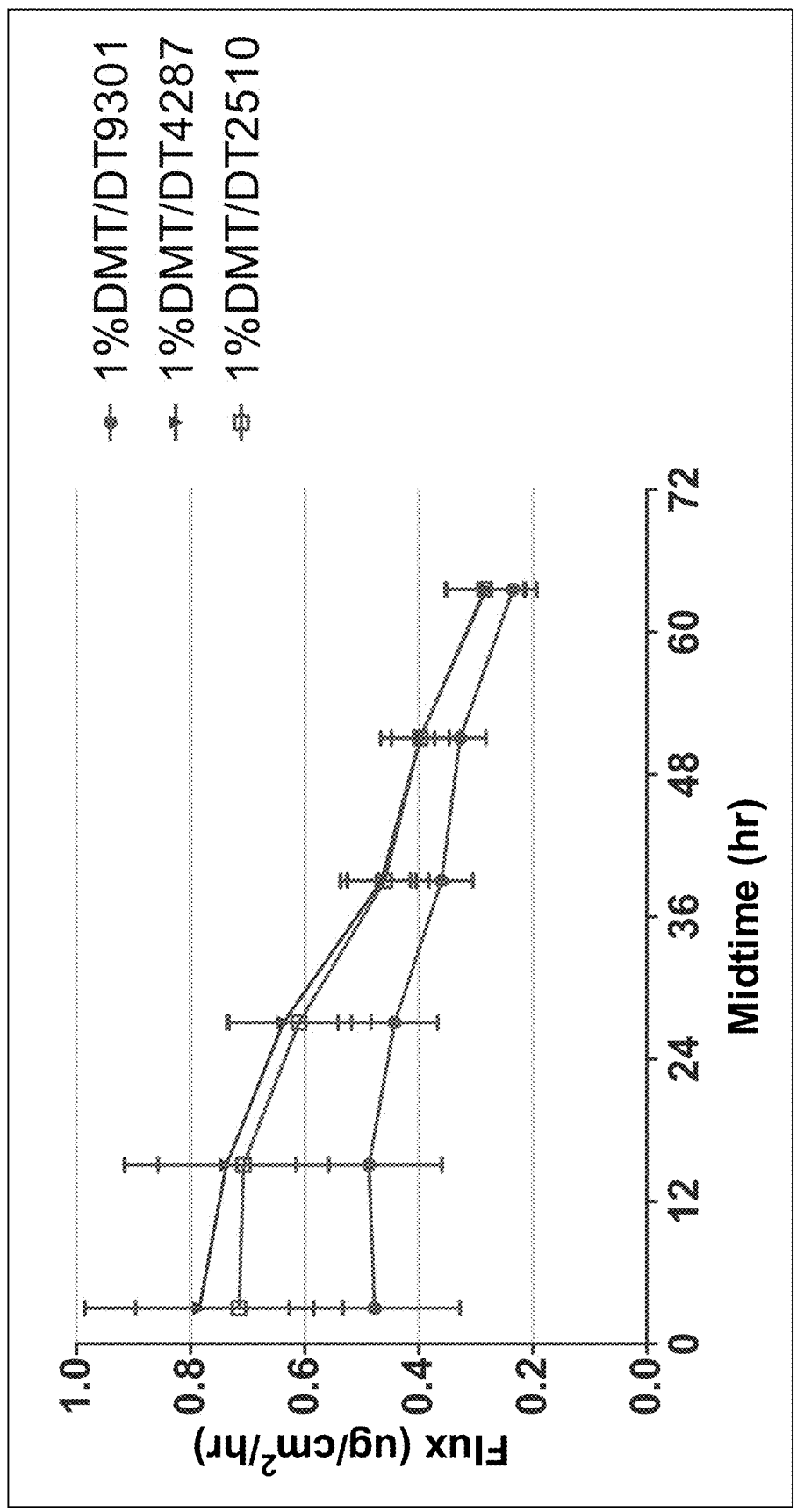
FIG. 7A-7B show an example of a plot of average dexmedetomidine flux as a function of transdermal delivery device application time for dexmedetomidine transdermal compositions having a non-functionalized acrylate adhesive, a hydroxyl functionalized acrylate adhesive and a hydroxyl functionalized acrylate adhesive containing vinyl acetate according to one embodiment.
Figure 7B:
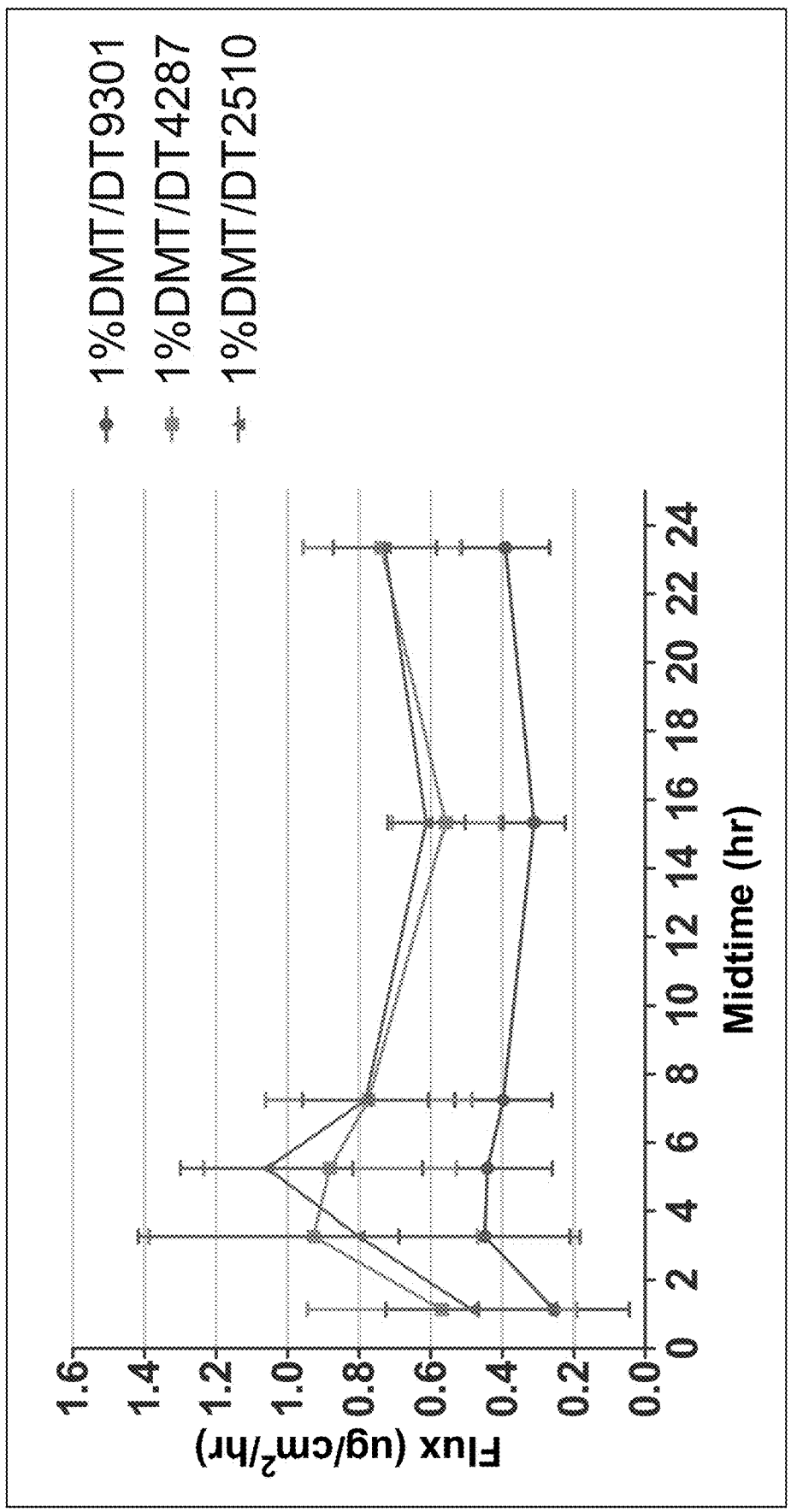

In-Vitro Flux Obtained from 1% Dexmedetomidine Transdermal Composition Formulations in Non-Functionalized or Hydroxyl (—OH) Functionalized Acrylate Polymers Another set of examples of dexmedetomidine transdermal formulations are transdermal compositions which include 1% w/w dexmedetomidine with non-functionalized acrylate polymer (Duro-Tak 87-9301, Formulation 5), hydroxyl functionalized acrylate polymer (Duro-Tak 387/87-2510, Formulation 11) and hydroxyl functionalized acrylate polymer containing vinyl acetate (Duro-Tak 87-4287, Formulation 8). In-vitro flux experiments were performed for 3 days and 1 day and the results are shown in FIGS. 7A and 7B, respectively. As depicted in both FIGS. 7A and 7B, dexmedetomidine in-vitro flux was less in non-functional adhesives as compared to hydroxyl functionalized adhesives with the same drug loading.

Example 5

In-Vitro Flux Obtained from Dexmedetomidine Transdermal Composition Formulations in Acid (—COOH) Functionalized or Acid/Hydroxyl (—COOH/OH) Functionalized Acrylate Polymers Dexmedetomidine in-vitro flux was measured using acid (—COOH) functionalized or acid/hydroxyl (—COOH/OH) functionalized acrylate adhesives. Examples of acid (—COOH) functionalized acrylate adhesive used in this study is Duro-Tak 387/87-2353 (no crosslinker added acrylate polymer). The acid/hydroxyl (—COOH/OH) functionalized acrylate adhesive used in this study is Duro-Tak 87-2979 (crosslinker added acrylate-vinyl acetate polymer).

Tables 7 and 8 show the dexmedetomidine transdermal composition formulations with different acid (—COOH) functionalized or acid/hydroxyl (—COOH/OH) functionalized acrylate polymers. The concentration of dexmedetomidine in the formulations was selected based on the solubility of dexmedetomidine in each adhesive. The solubility of dexmedetomidine in Duro-Tak 387/87-2353 was found to be about 10-15%, whereas that in Duro-Tak 87-2979 was found to be less than 2%. The solubility of drug in acid functionalized acrylate adhesives was greater than that in non-functionalized or hydroxyl functionalized acrylate adhesives.

Figure 8:
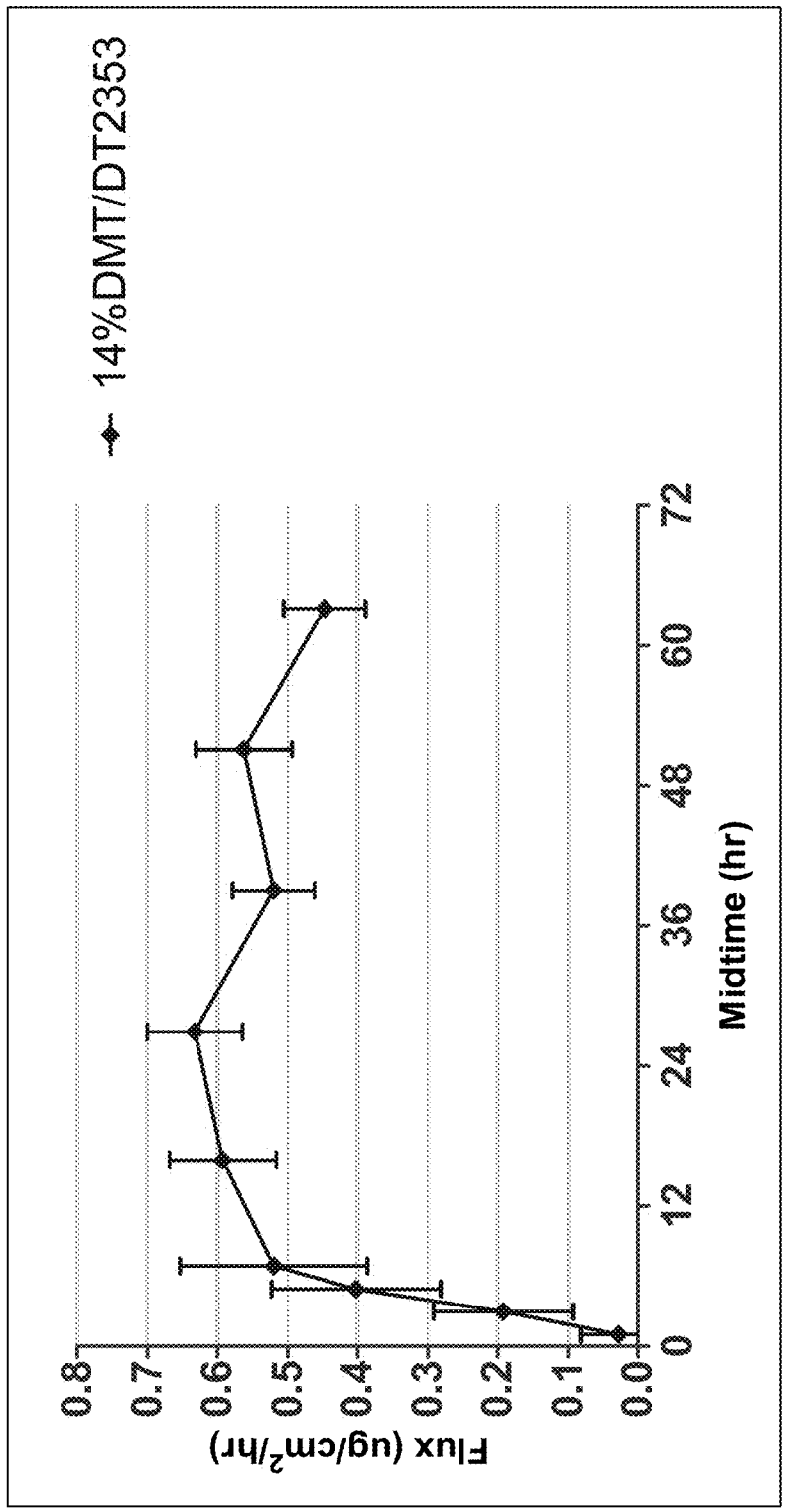
FIG. 8 shows an example of a plot of average dexmedetomidine flux as a function of transdermal delivery device application time for a dexmedetomidine transdermal composition having a carboxylic acid functionalized acrylate adhesive according to another embodiment.
Figure 9:
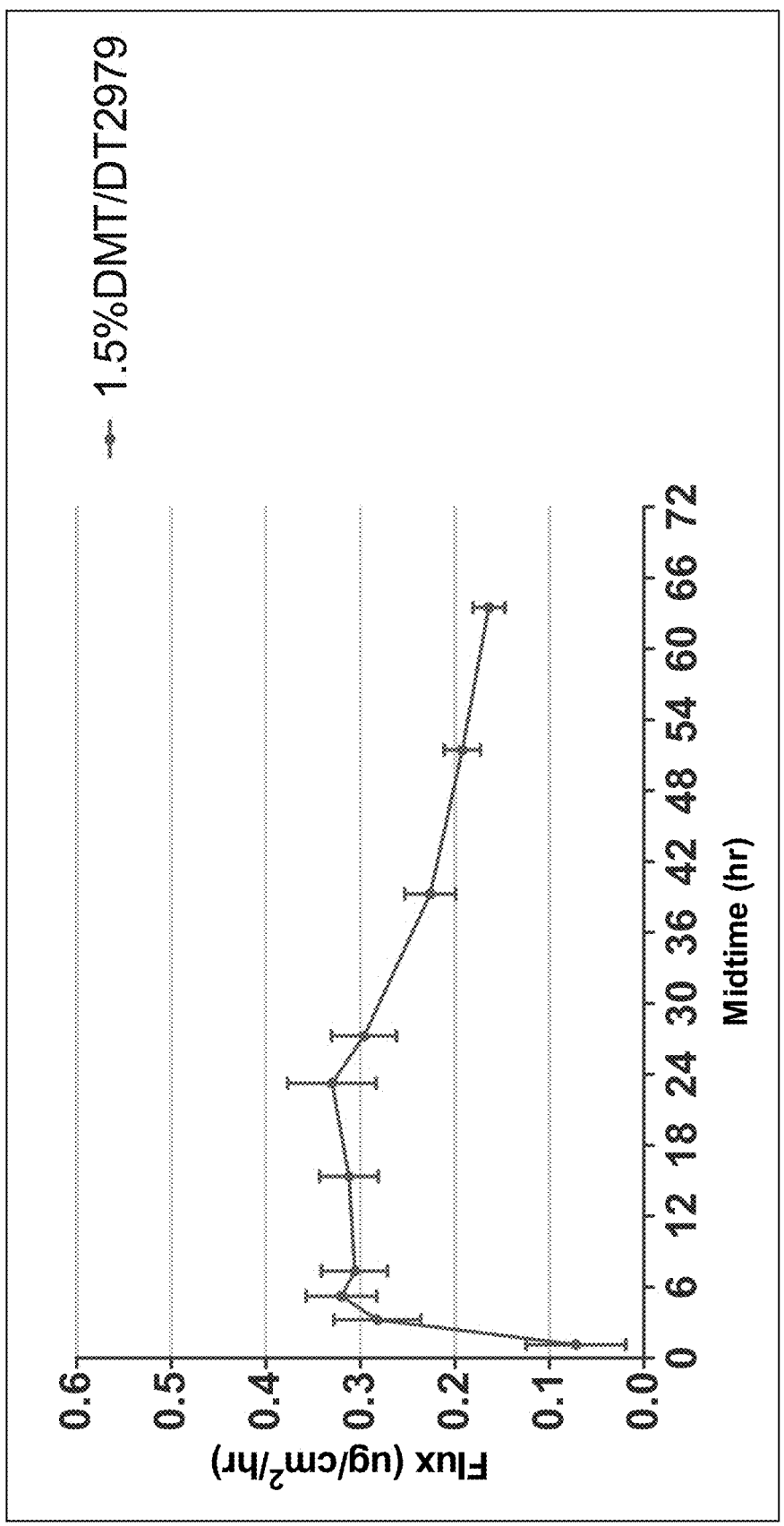
FIG. 9 shows an example of a plot of average dexmedetomidine flux as a function of transdermal delivery device application time for a dexmedetomidine transdermal composition having acrylic adhesive with carboxyl group and hydroxyl group as the functional group containing vinyl acetate according to another embodiment.

In-vitro skin flux study was performed as described above. The mean dexmedetomidine in-vitro fluxes are illustrated in FIGS. 8 and 9.

TABLE 7

| Components | % w/w Formulation 16 (14% DMT/DT2353) |
|---|---|
| Dexmedetomidine base | 14.00 |
| Pressure Sensitive Adhesive Duro-Tak 387/87-2353 | 86.00 |

TABLE 8

| Components | % w/w Formulation 17 (1.5% DMT/DT2979) |
|---|---|
| Dexmedetomidine base | 1.00 |
| Pressure Sensitive Adhesive Duro-Tak 87-2979 | 99.00 |

Example 6

In-Vitro Flux Obtained from Dexmedetomidine Transdermal Composition Formulations in PIB/PB Polymers Containing PVP-CLM and Duro-Tak 387/87-2353

Another example of dexmedetomidine transdermal composition formulation is shown in Table 9. In order to increase the solubility of drug in PIB/PB (e.g., Indopol H-1900) adhesive, PVP-CLM and acid (—COOH) functionalized acrylate polymer (Duro-Tak 387/87-2353) were used. Formulations 18 to 21 were prepared with different loadings of Duro-Tak 387/87-2353.

Figure 10:
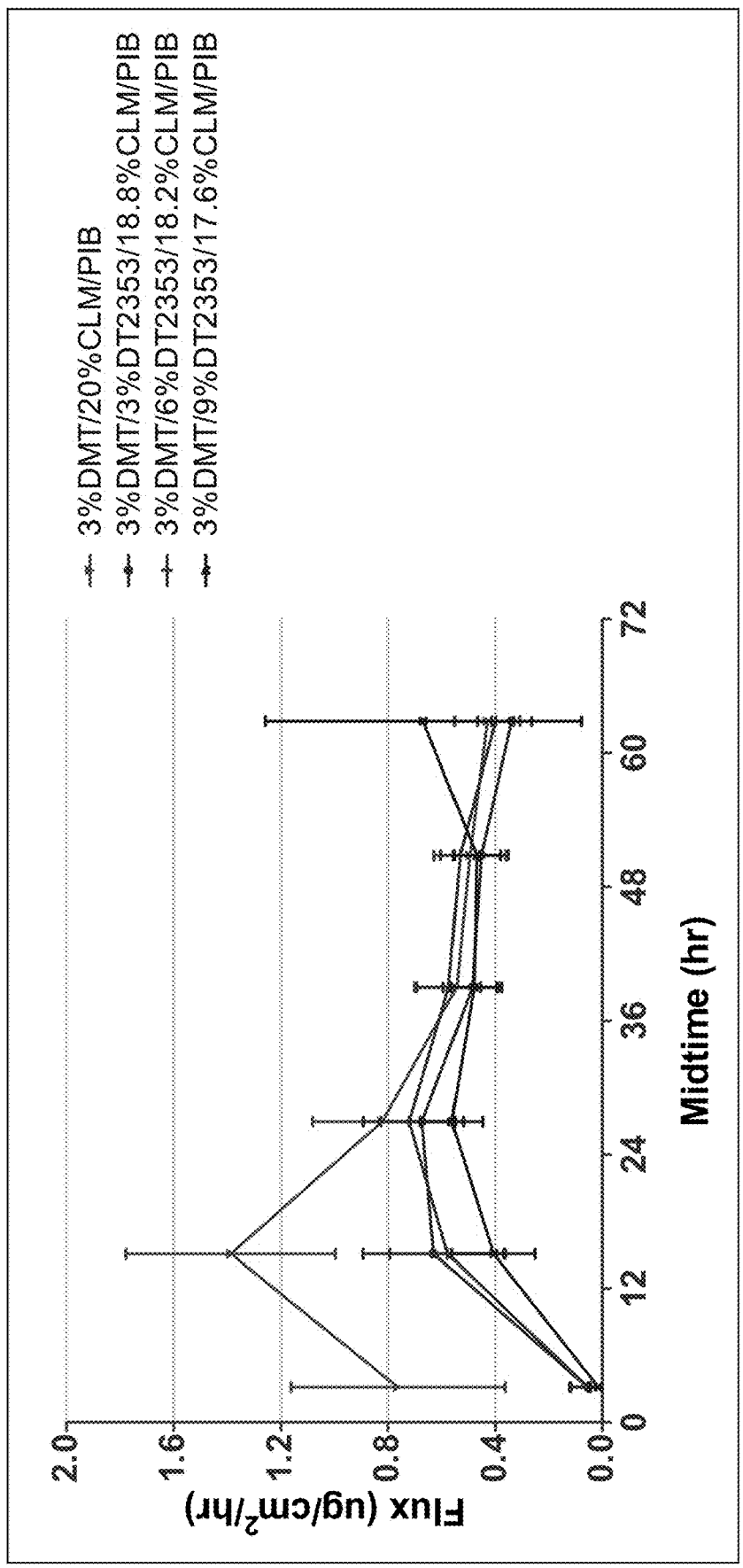
FIG. 10 shows an example of a plot of average dexmedetomidine flux as a function of transdermal delivery device application time for a dexmedetomidine transdermal composition having a polyisobutylene/polybutene adhesive with a carboxylic acid functionalized acrylate adhesive according to one embodiment.

As depicted in FIG. 10, Formulations containing acid (—COOH) functionalized acrylate polymer (Duro-Tak 387/87-2353), Formulations 19, 20 and 21, appear to have lower initial flux compared with Formulations without Duro-Tak 2353 (Formulation 18). The in-vitro flux of dexmedetomidine did not change with 3% and 6% of acid functionalized adhesive, however, at 9% acid functionalized adhesive, a slight decrease in the in-vitro flux is observed.

TABLE 9

| | % w/w | | | |
|---|---|---|---|---|
| Components | Formulation 18 (3% DMT/20% CLM/ PIB) | Formulation 19 (3% DMT/3% DT2353/ 18.8% CLM/ PIB) | Formulation 20 (3% DMT/6% DT2353/ 18.2% CLM/PIB) | Formulation 21 (3% DMT/9% DT2353/ 17.6% CLM/ PIB) |
| Dexmedetomidine base | 3.00 | 3.00 | 3.00 | 3.00 |
| PVP-CLM | 20.00 | 18.8 | 18.7 | 18.6 |
| Pressure Sensitive Adhesive Duro-Tak 387/87-2353 | — | 3.00 | 6.00 | 9.00 |
| PIB/PB (Indopol H-1900) | q.s. to 100 | q.s. to 100 | q.s. to 100 | q.s. to 100 |

Example 7

In-Vitro Flux Obtained from Dexmedetomidine Transdermal Composition Formulations in PIB/PB Polymers Containing PVP-CLM and Levulinic Acid Another example of dexmedetomidine transdermal composition formulation is shown in Table 10. In order to increase the solubility of drug in PIB/PB (e.g., Indopol H-1900) adhesive in presence of 20% PVP-CLM, various concentrations of an acid were used to test increased dexmedetomidine solubility. Formulations 22 to 25 were prepared with different loadings of levulinic acid.

TABLE 10

| Components | Formulation 22 (3% DMT/0.6% LA/20% CLM/PIB) | Formulation 23 (3% DMT/0.9% LA/20% CLM/PIB) | Formulation 24 (3% DMT/1.75% LA/20% CLM/PIB) | Formulation 25 (3% DMT/6.9% LA/20% CLM/PIB) |
|---|---|---|---|---|
| Dexmedetomidine base | 3.00 | 3.00 | 3.00 | 3.00 |
| PVP-CLM | 20.00 | 20.00 | 20.00 | 20.00 |
| Levulinic Acid | 0.60 | 0.90 | 1.75 | 6.90 |
| PIB/PB (Indopol H-1900) | q.s. to 100 | q.s. to 100 | q.s. to 100 | q.s. to 100 |

Figure 11:
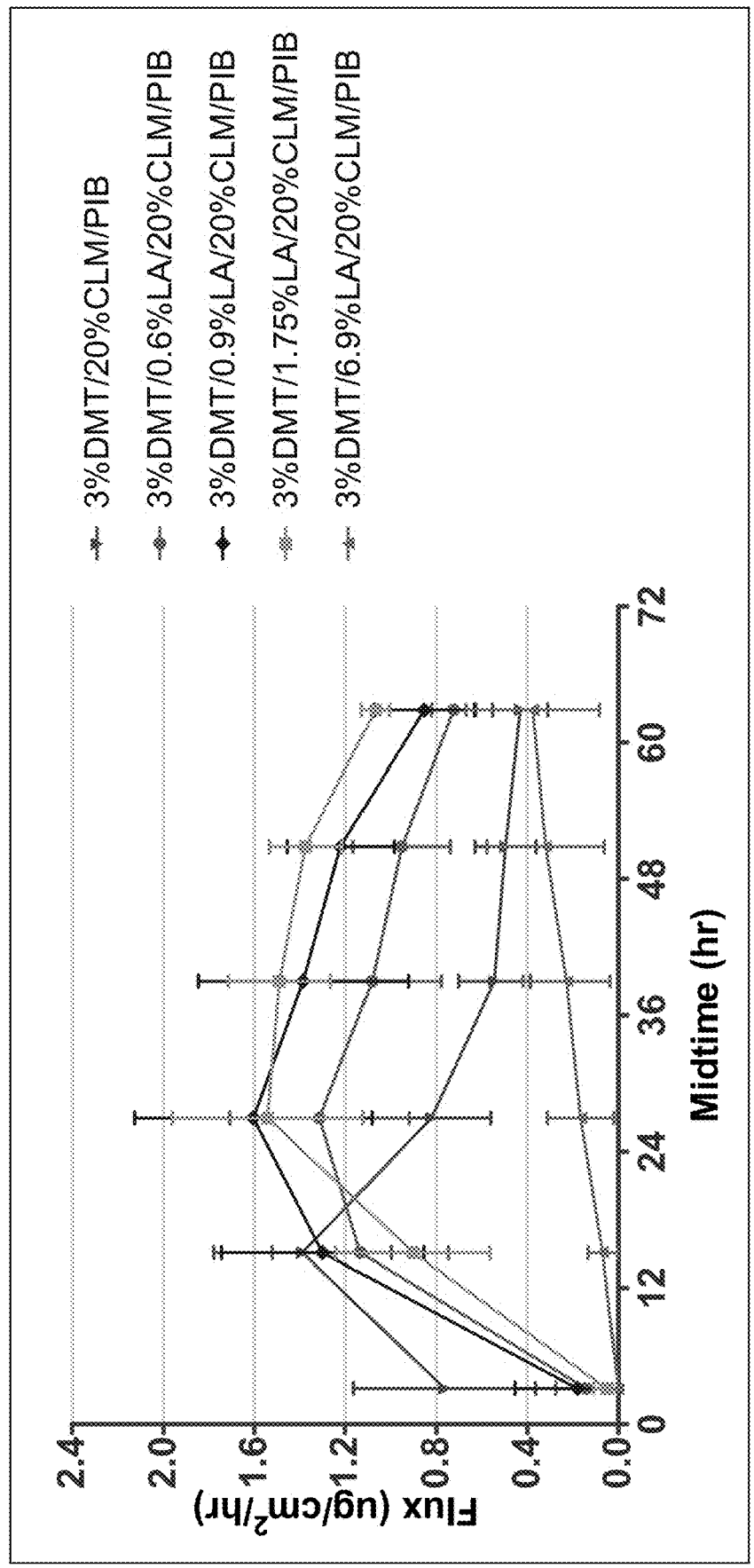
FIG. 11 shows an example of a plot of average dexmedetomidine flux as a function of transdermal delivery device application time for a dexmedetomidine transdermal composition having a polyisobutylene/polybutene adhesive with the solubility enhancer levulinic acid according to one embodiment.

As depicted in FIG. 11, in-vitro flux of dexmedetomidine was reduced dramatically where the formulation included 6.9% of levulinic acid. However, at a concentration of 1.75% levulinic acid, in-vitro flux was comparable to lower concentrations of levulinic acid (i.e., 0.6% and 0.9%). The initial flux obtained from formulations containing levulinic acid (Formulations 22,23,24 and 25) was lower than that from formulation without levulinic acid (Formulation 18) However, after 24 hr, the flux obtained from the formulations containing levulinic acid (Formulations 22, 23, 24 and 25) appear to be higher than that from formulation without levulinic acid (Formulation 17). Dexmedetomidine crystals were observed at levulinic acid concentrations of 1.75% and lower.

Example 8

Figure 12:
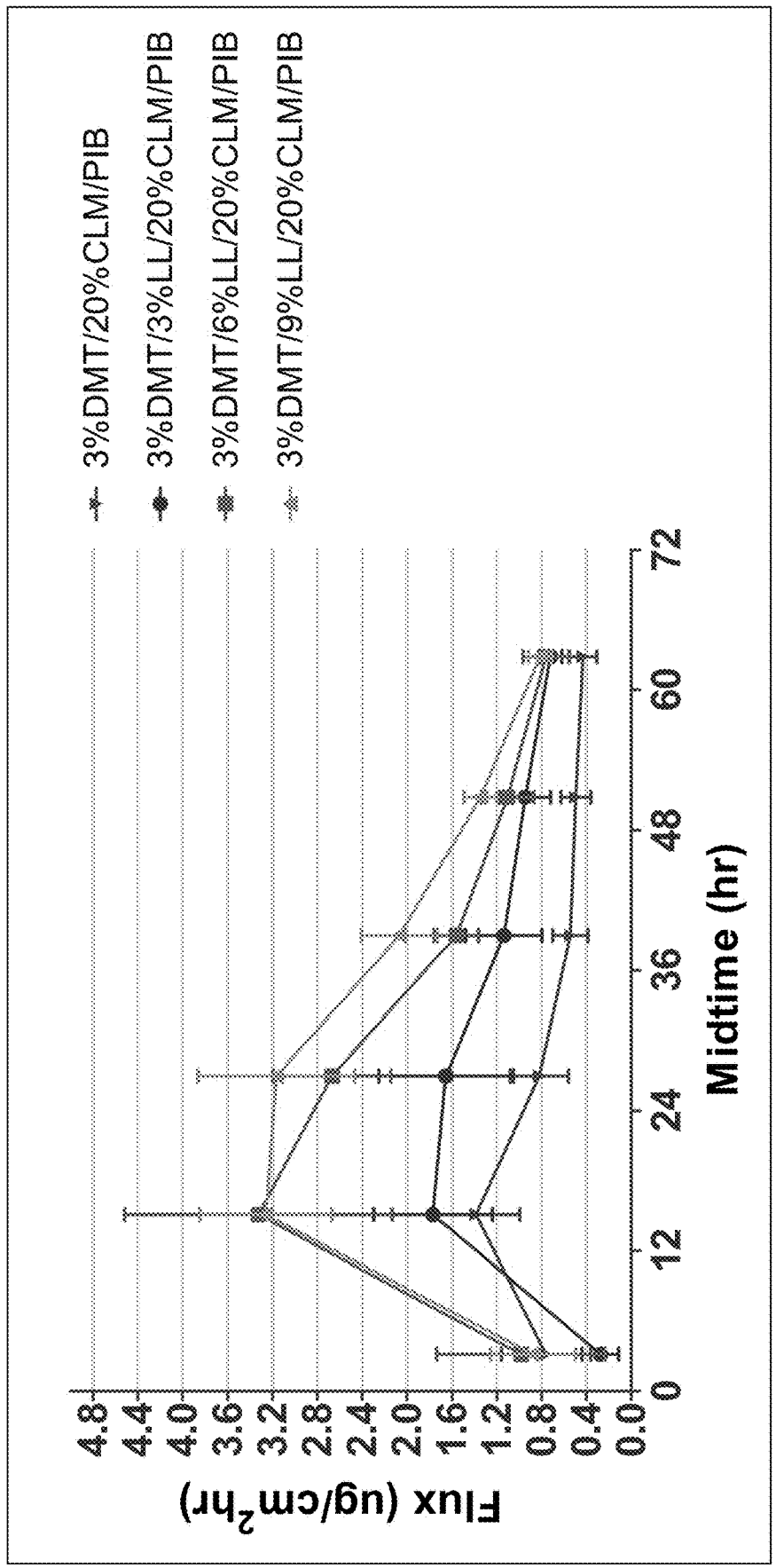
FIG. 12 shows an example of a plot of average dexmedetomidine flux as a function of transdermal delivery device application time for a dexmedetomidine transdermal composition having a polyisobutylene/polybutene adhesive with the solubility enhancer lauryl lactate according to one embodiment.
Figure 13:
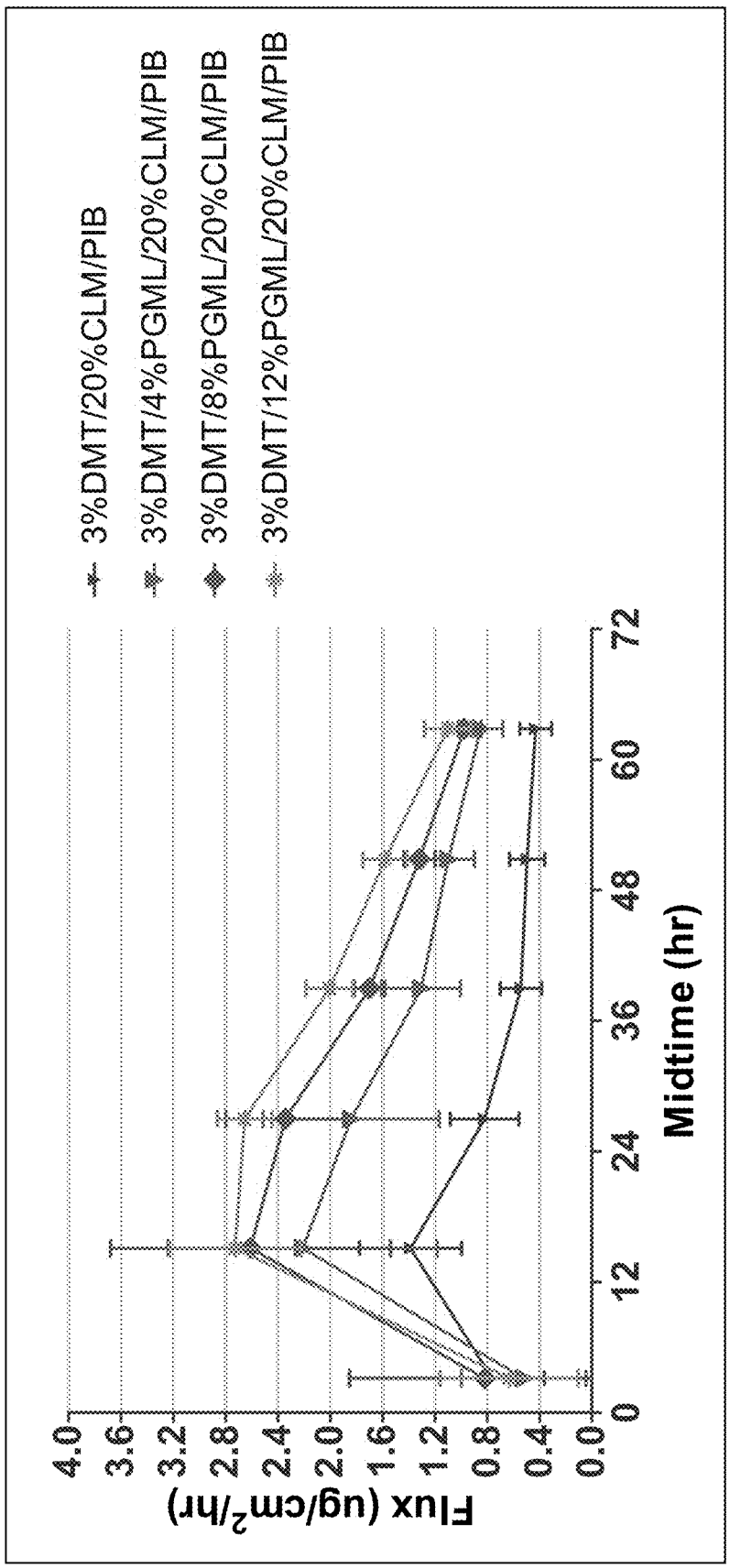
FIG. 13 shows an example of a plot of average dexmedetomidine flux as a function of transdermal delivery device application time for a dexmedetomidine transdermal composition having a polyisobutylene/polybutene adhesive with the solubility enhancer propylene glycolmonolaurate according to one embodiment.

In-Vitro Flux Obtained from Dexmedetomidine Transdermal Composition Formulations in PIB/PB Polymers Containing PVP-CLM and Lauryl Lactate or Propylene Glycolmonolaurate Another example of dexmedetomidine transdermal composition formulations are shown in Tables 11 and 12. Dexmedetomidine has solubility of 5 to 10% in lauryl lactate and propylene glycolmonolaurate. Each of lauryl lactate and propylene glycolmonolaurate increase solubility of dexmedetomidine in the PIB/PB adhesive in the subject formulations. In-vitro flux profiles of Formulations 26 to 28 are shown in FIG. 12. In-vitro flux profiles of Formulations 29 to 31 are shown in FIG. 13. Formulations 26 to 31 were found to have needle-like crystals of dexmedetomidine.

TABLE 11

| Components | Formulation 26 (3% DMT/3% LL/20% CLM/PIB) | Formulation 27 (3% DMT/6% LL/20% CLM/PIB) | Formulation 28 (3% DMT/9% LL/20% CLM/PIB) |
|---|---|---|---|
| Dexmedetomidine base | 3.00 | 3.00 | 3.00 |
| PVP-CLM | 20.00 | 20.00 | 20.00 |
| Lauryl lactate | 3.0 | 6.0 | 9.0 |
| PIB/PB (Indopol H-1900) | q.s. to 100 | q.s. to 100 | q.s. to 100 |

TABLE 12

| Components | Formulation 29 (3% DMT/4% PGML/ 20% CLM/PIB) | Formulation 30 (3% DMT/8% PGML/ 20% CLM/PIB) | Formulation 31 (3% DMT/12% PGML/ 20% CLM/PIB) |
|---|---|---|---|
| Dexmedetomidine base | 3.00 | 3.00 | 3.00 |
| PVP-CLM | 20.00 | 20.00 | 20.00 |
| Propylene glycolmonolaurate | 4.0 | 8.0 | 12.0 |
| PIB/PB (Indopol H-1900) | q.s. to 100 | q.s. to 100 | q.s. to 100 |

Example 9

In-Vitro Flux Obtained from Dexmedetomidine Transdermal Composition Formulations in Duro-Tak 387/87-2287 Polymers Containing Levulinic Acid, PVP K90 or Duro-Tak 387/87-2353

Figure 14A:
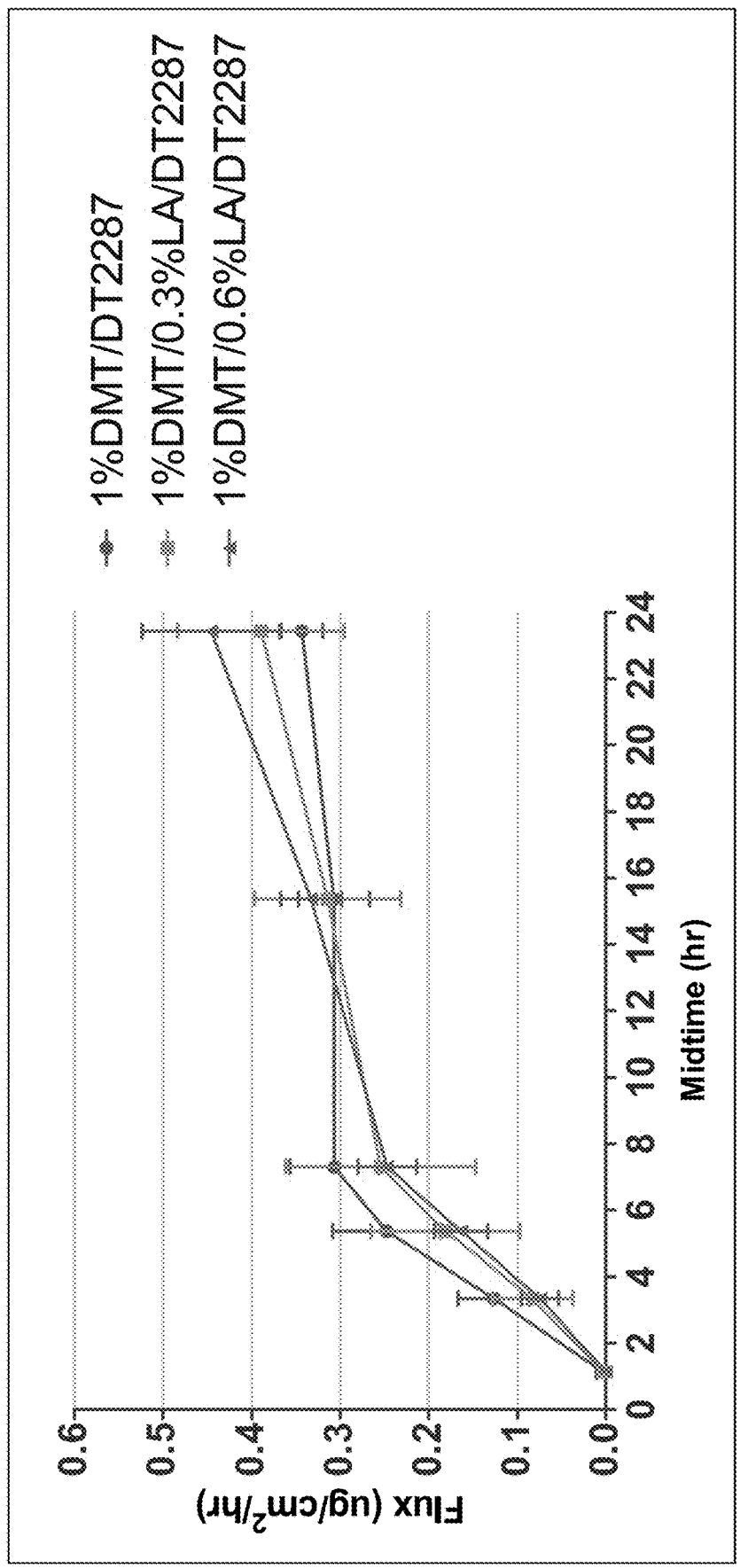
FIG. 14A shows an example of a plot of average dexmedetomidine flux as a function of transdermal delivery device application time for a dexmedetomidine transdermal composition having a hydroxyl functionalized acrylate adhesive containing vinyl acetate with levulinic acid according to one embodiment.
Figure 14B:
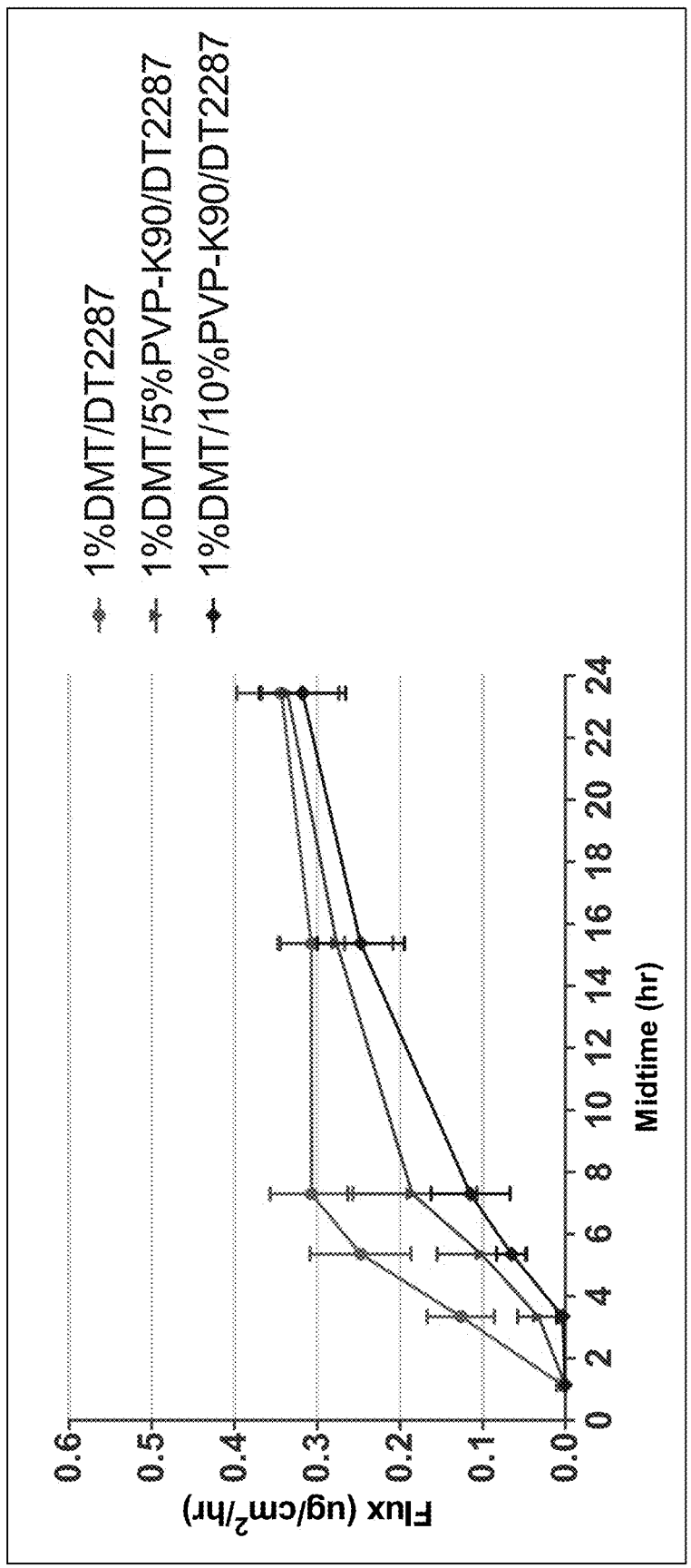
FIG. 14B shows an example of a plot of average dexmedetomidine flux as a function of transdermal delivery device application time for a dexmedetomidine transdermal composition having a hydroxyl functionalized acrylate adhesive containing vinyl acetate with polyvinylpyrrolidone according to one embodiment.
Figure 14C:
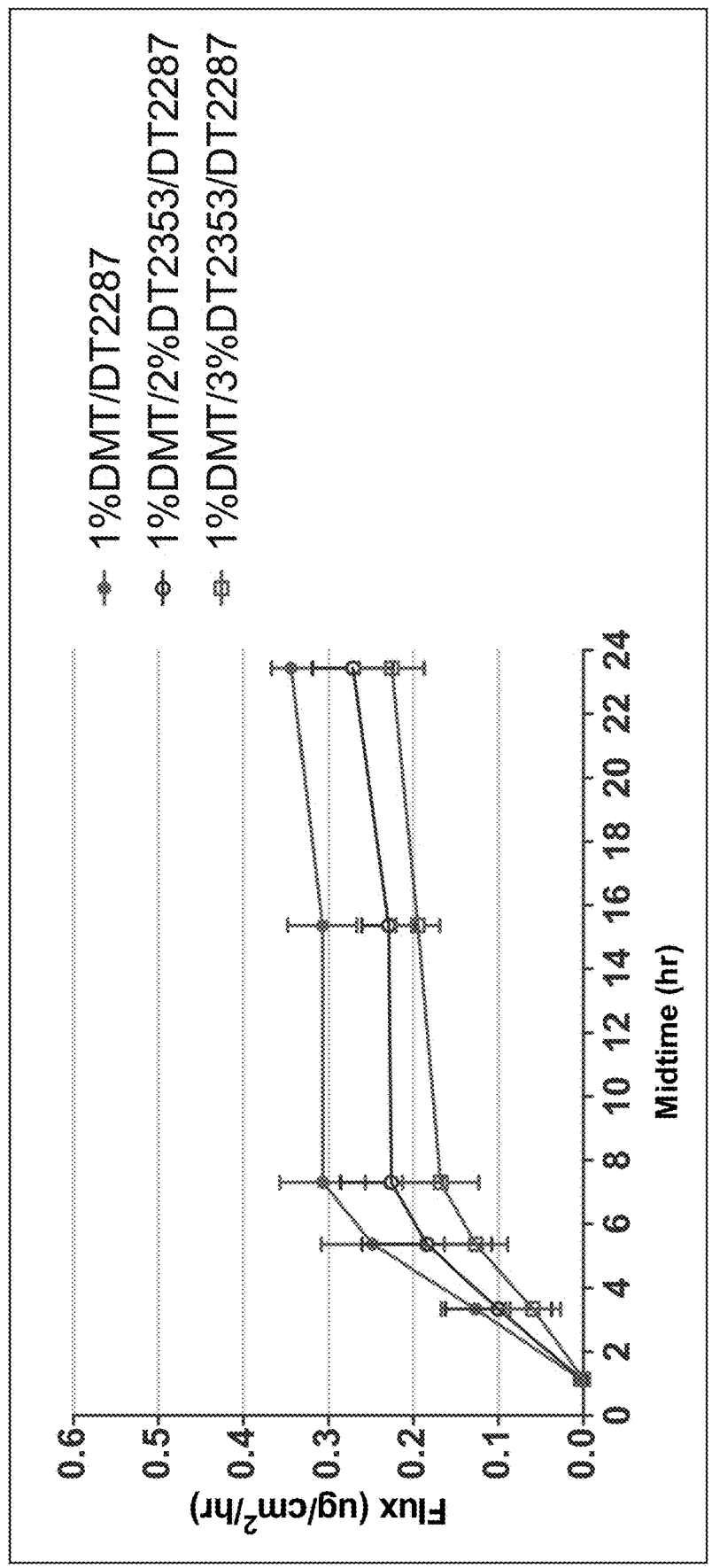
FIG. 14C shows an example of a plot of average dexmedetomidine flux as a function of transdermal delivery device application time for a dexmedetomidine transdermal composition having a hydroxyl functionalized acrylate adhesive containing vinyl acetate with a carboxylic acid functionalized acrylate adhesive according to one embodiment.

Another set of examples of dexmedetomidine transdermal formulation include transdermal compositions having 1% w/w dexmedetomidine with a solubilizer to improve physical stability of the composition. In these formulations, levulinic acid, PVP K90 and Duro-Tak 87-2353 were employed. The formulation compositions are shown in Tables 13, 14 and 15. In-vitro flux profiles for transdermal compositions having 1% dexmedetomidine with 0.3% and 0.6% levulinic acid are shown in FIG. 14(A). In-vitro flux profiles for transdermal compositions having 1% dexmedetomidine with 5% and 10% PVP K90 are shown in FIG. 14(B). In-vitro flux profiles for transdermal compositions having 1% dexmedetomidine with 2% or 3% Duro-Tak 387/87-2353 are shown in FIG. 14(C). From the in-vitro flux profiles, levulinic acid enhanced the permeation after application for 15 hr., PVP K90 delayed transdermal flux of dexmedetomidine whereas Duro-Tak 2353 slightly reduced transdermal flux.

TABLE 13

| | % w/w | |
|---|---|---|
| Components | Formulation 32 (1% DMT/0.3% LA/DT2287) | Formulation 33 (1% DMT/0.6% LA/DT2287) |
| Dexmedetomidine base | 1.00 | 1.00 |
| Levulinic acid | 0.30 | 0.60 |
| Pressure Sensitive Adhesive Duro-Tak 387/87-2287 | 98.70 | 98.40 |

TABLE 14

| | % w/w | |
|---|---|---|
| Components | Formulation 34 (1% DMT/5% PVP-K90/DT2287) | Formulation 35 (1% DMT/10% PVP-K90/DT2287) |
| Dexmedetomidine base | 1.00 | 1.00 |
| PVP K90 | 5.00 | 10.00 |
| Pressure Sensitive Adhesive Duro-Tak 387/87-2287 | 94.00 | 89.00 |

TABLE 15

| | % w/w | |
|---|---|---|
| Components | Formulation 36 (1% DMT/2% DT2353/DT2287) | Formulation 37 (1% DMT/3% DT2353/DT2287) |
| Dexmedetomidine base | 1.00 | 1.00 |
| Pressure Sensitive Adhesive Duro-Tak 387/87-2353 | 2.00 | 3.00 |
| Pressure Sensitive Adhesive Duro-Tak 387/87-2287 | 97.00 | 96.00 |

Example 10

In-Vitro Flux Obtained from Dexmedetomidine Transdermal Composition Formulations in Duro-Tak 87-9301 Polymers Containing Levulinic Acid, Oleic Acid or Duro-Tak 387/87-2353

Figure 15:
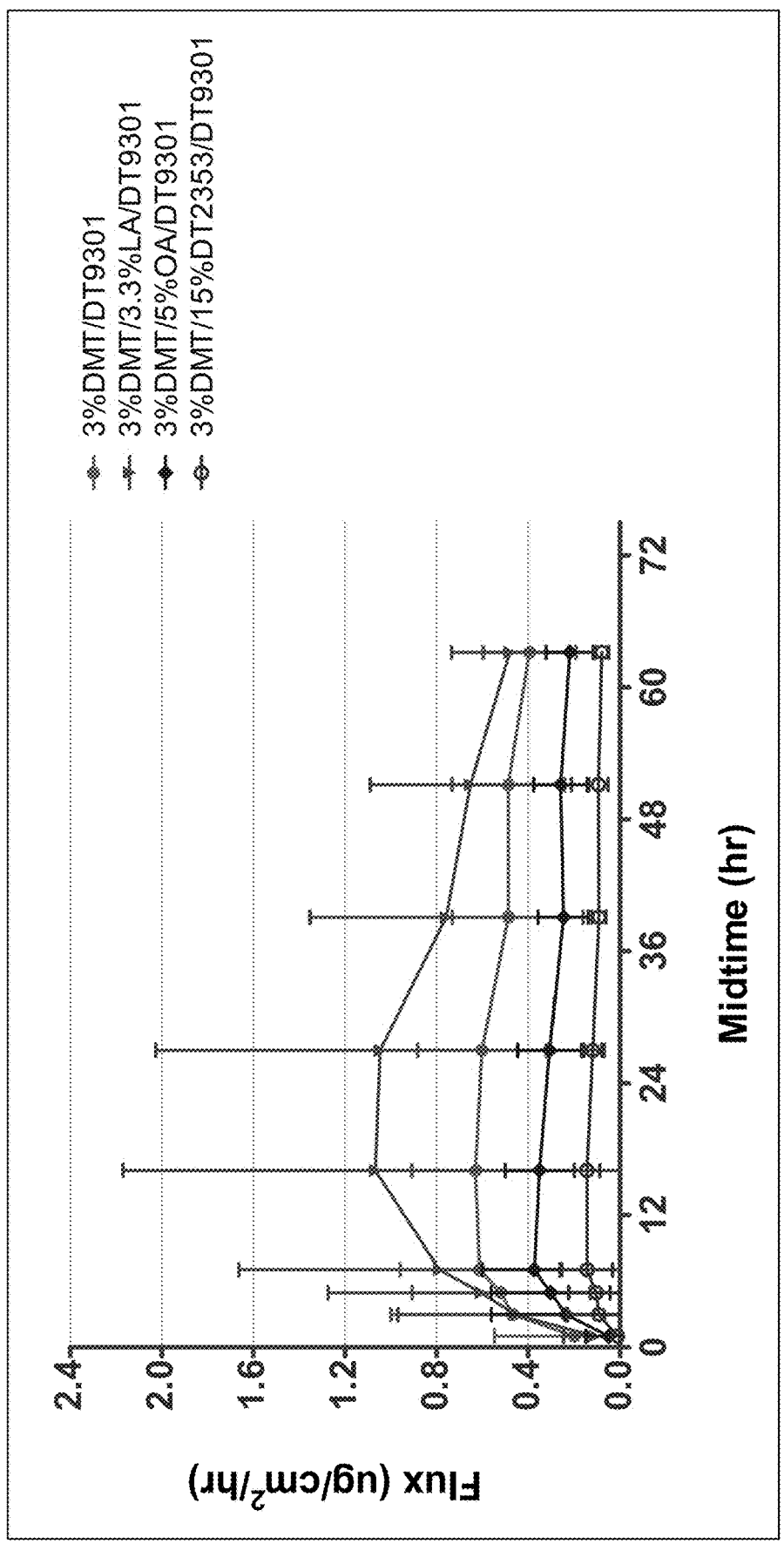
FIG. 15 shows an example of a plot of average dexmedetomidine flux as a function of transdermal delivery device application time for a dexmedetomidine transdermal composition having acrylate pressure sensitive adhesive in the absence and presence of levulinic acid, oleic acid or a carboxylic acid functionalized acrylate adhesive according to one embodiment.

Another set of examples of dexmedetomidine transdermal formulation include transdermal compositions having 3% w/w dexmedetomidine and non-functionalized acrylate polymer Duro-Tak 87-9301 in combination with 3.3% levulinic acid, 5% Oleic acid or 15%Duro-Tak 387/87-2353. The formulation compositions are shown in Table 16. In-vitro flux profiles for these formulations (Formulations 38, 39 and 40), compared with 3% dexmedetomidine in non-functionalized acrylate polymer Duro-Tak 87-9301 without additive (Formulation 7) are illustrated in FIG. 15. Compositions having just 3% dexmedetomidine and non-functionalized acrylate polymer Duro-Tak 87-9301 were supersaturated. Levulinic acid and oleic acid were used as a solubilizer and permeation enhancer and increased flux at the beginning of in-vitro flux, but declined with time. Like with the 1% dexmedetomidine compositions, Duro-Tak 87-2353 reduced flux.

TABLE 16

| | % w/w | | |
|---|---|---|---|
| Components | Formulation 38 (3% DMT/3.3% LA/DT9301) | Formulation 39 (3% DMT/5% OA/DT9301) | Formulation 40 (3% DMT/ 15%/DT2353 DT9301) |
| Dexmedetomidine base | 3.00 | 3.00 | 3.00 |
| Levulinic acid | 3.30 | 0.00 | 0.00 |
| Oleic acid | 0.00 | 5.00 | 0.00 |
| Pressure Sensitive Adhesive Duro-Tak 387/87-2353 | 0.00 | 0.00 | 15.00 |
| Pressure Sensitive Adhesive Duro-Tak 87-9301 | 93.70 | 92.00 | 82.00 |

Example 11

In-Vitro Permeation of Dexmedetomidine Obtained from 1%, 2%, 3% and 4% Dexmedetomidine in the Mixture of Adhesives (15% Duro-Tak2353 in Duro-Tak 2287)

Dexmedetomidine transdermal composition formulations containing the mixture of hydroxyl functionalized acrylate polymer (e.g., Duro-Tak 87-2287) and acid functionalized acrylate polymer (e.g., Duro-Tak 87-2353) are summarized in Table 17. Formulations 41 to 44 were prepared with different loadings of dexmedetomidine.

TABLE 17

| Components | Formulation 41 (1% DMT/15% DT2353/ DT2287) | Formulation 42 (2% DMT/15% DT2353/ DT2287) | Formulation 43 3% DMT/15% DT2353/DT2287 | Formulation 44 4% DMT/15% DT2353/DT2287 |
|---|---|---|---|---|
| | % w/w | | | |
| Dexmedetomidine base | 1.00 | 2.00 | 3.00 | 4.00 |
| Pressure Sensitive Adhesive Duro-Tak 2353 | 15.00 | 15.00 | 15.00 | 15.00 |
| Pressure Sensitive Adhesive Duro-Tak 2287 | 84.00 | 83.00 | 82.00 | 81.00 |

Figure 16:
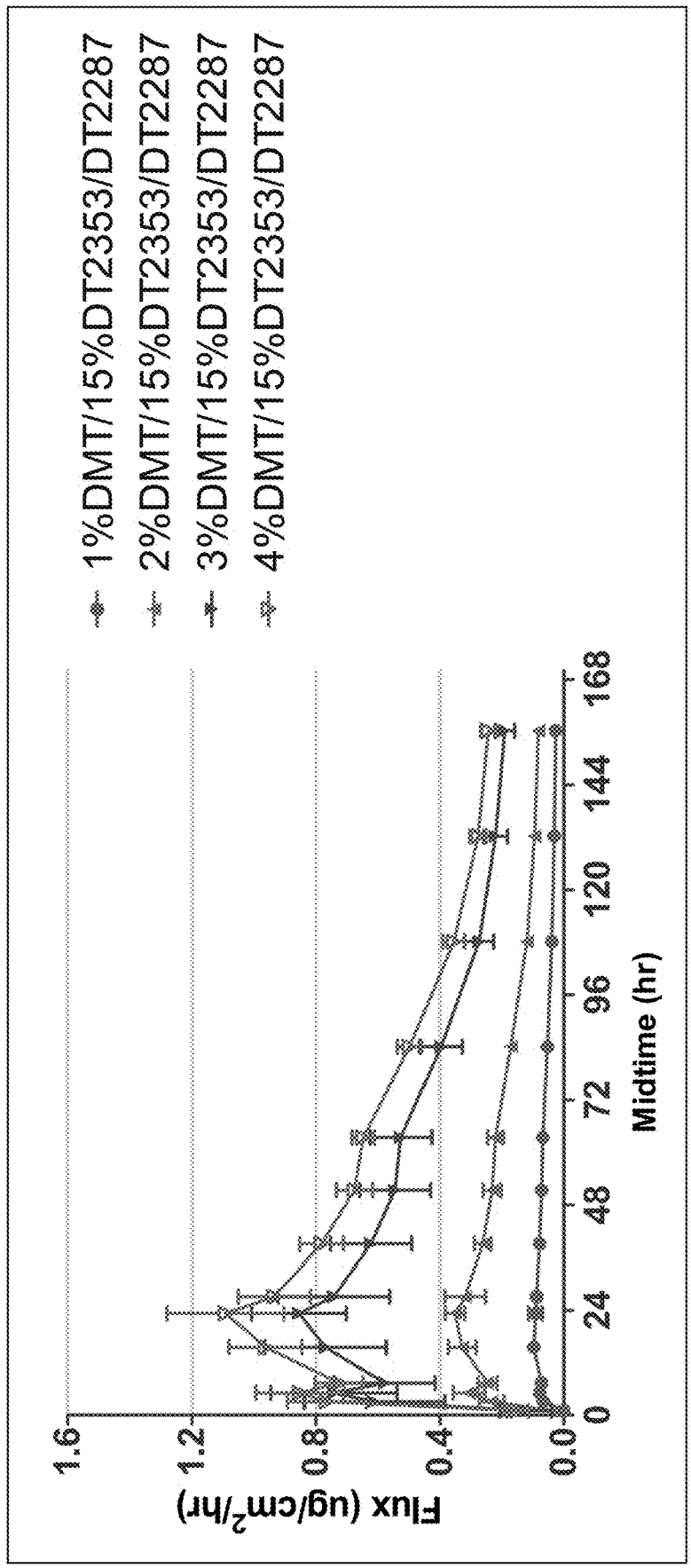
FIG. 16 shows an example of a plot of average dexmedetomidine flux as a function of transdermal delivery device application time for a dexmedetomidine transdermal composition having a hydroxyl functionalized acrylate adhesive containing vinyl acetate with a carboxylic acid functionalized acrylate adhesive according to another embodiment.

As depicted in FIG. 16, in-vitro flux of dexmedetomidine increased with increasing percent of dexmedetomidine loading.

Example 12

In-Vitro Permeation of Dexmedetomidine Obtained from Dexmedetomidine Formulations Containing Oleic Acid Another example of dexmedetomidine transdermal composition formulations is summarized in Table 18. In order to increase the solubility of dexmedetomidine in the hydroxyl functionalized acrylate polymer (e.g., Duro-Tak 87-2287), oleic acid was used. Formulations 45 to 47 were prepared with different loadings of oleic acid and dexmedetomidine.

TABLE 18

| Components | Formulation 45 (3% DMT/5% OA/DT2287) | Formulation 46 3% DMT/7% OA/DT2287 | Formulation 47 3% DMT/5% OA/DT2287 |
|---|---|---|---|
| | % w/w | | |
| Dexmedetomidine base | 3.00 | 3.00 | 4.00 |
| Oleic acid | 5.00 | 7.00 | 5.00 |
| Pressure Sensitive Adhesive Duro-Tak 2287 | 92.00 | 90.00 | 91.00 |

Figure 17:
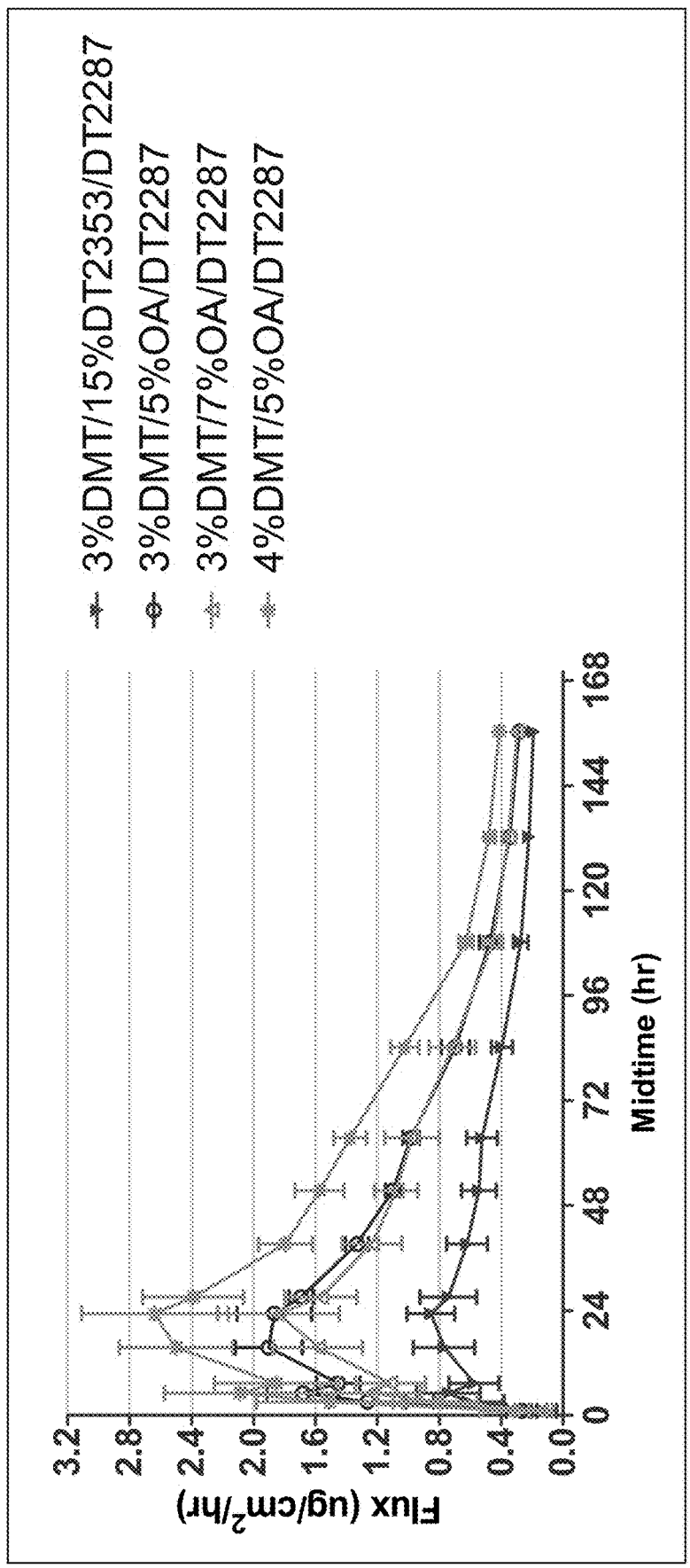
FIG. 17 shows an example of a plot of average dexmedetomidine flux as a function of transdermal delivery device application time for a dexmedetomidine transdermal composition having a hydroxyl functionalized acrylate adhesive containing vinyl acetate with oleic acid or a carboxylic acid functionalized acrylate adhesive according to another embodiment.

As depicted in FIG. 17, dexmedetomidine in formulations containing oleic acid has a higher flux than a dexmedetomidine composition (e.g., Formulation 43) which does not contain oleic acid. Oleic acid enhanced the permeation of dexmedetomidine through the skin. An increase of oleic acid from 5% to 7% (e.g. Formulation 46) did not show an enhancement effect as compared to the formulation containing 5% oleic acid (e.g. Formulation 45). This may be the result of the contribution of oleic acid in increasing in solubility of dexmedetomidine in the composition. A comparison of Formulation 45 and Formulation 47 shows that the in-vitro flux increases with increasing percent drug loading.

Example 13

In-Vitro Permeation of Dexmedetomidine Obtained from Dexmedetomidine Formulations Containing Levulinic Acid Dexmedetomidine transdermal formulations were also prepared with levulinic acid. The composition is shown in Table 19.

TABLE 19

| Components | Formulation 48 (3% DMT/4% LA/DT2287) | Formulation 49 (4% DMT/4% LA/DT2287) |
|---|---|---|
| | % w/w | |
| Dexmedetomidine base | 3.00 | 4.00 |
| Levulinic acid | 4.00 | 4.00 |
| Pressure Sensitive Adhesive Duro-Tak 2287 | 93.00 | 92.00 |

Figure 18:
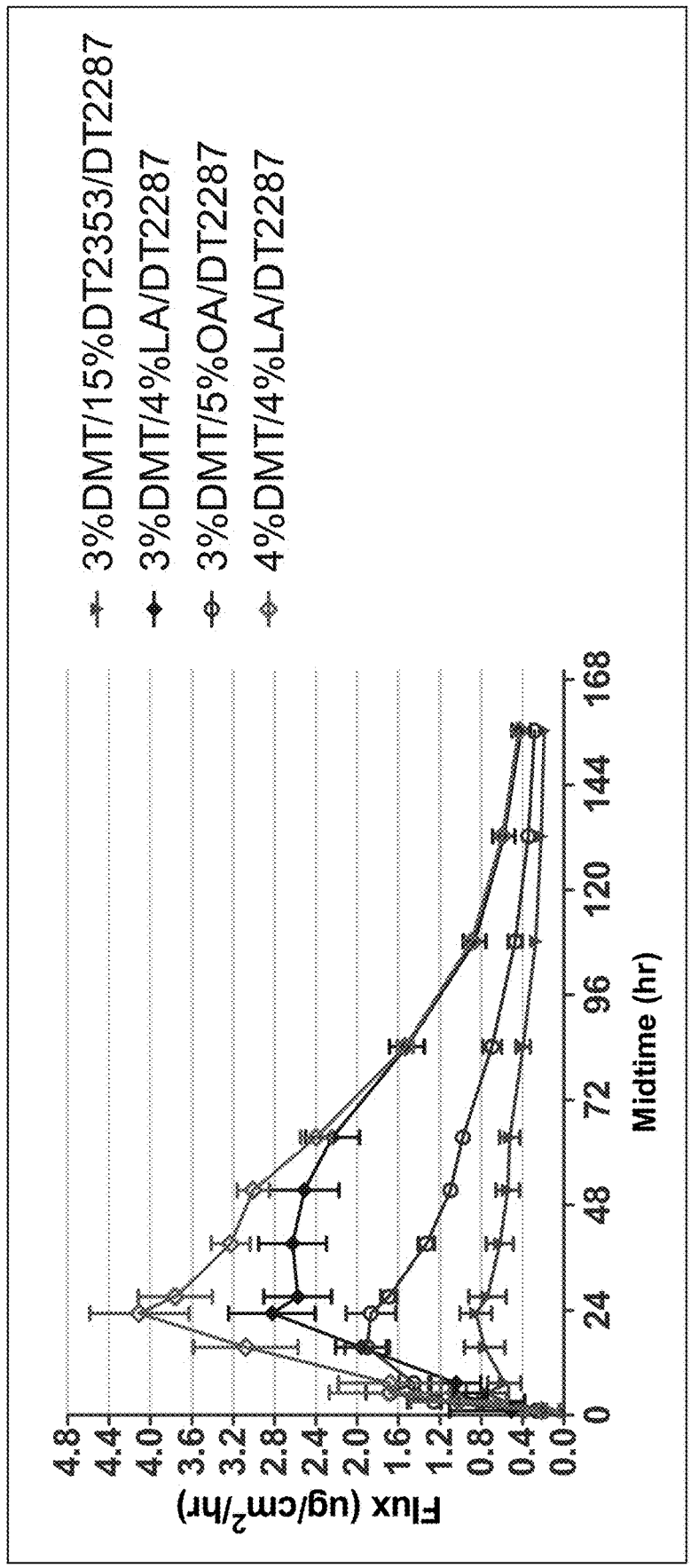
FIG. 18 shows an example of a plot of average dexmedetomidine flux as a function of transdermal delivery device application time for a dexmedetomidine transdermal composition having a hydroxyl functionalized acrylate adhesive containing vinyl acetate with solubility enhancers such as carboxylic acid functionalized acrylate adhesives, lauryl lactate or oleic acid according to another embodiment.

As shown in FIG. 18, in-vitro flux of dexmedetomidine in formulations containing levulinic acid (Formulations 48 and 49) increased with percent dexmedetomidine loading. The enhancement effect of levulinic acid on permeation of dexmedetomidine through the skin was higher than oleic acid.

The results of percent in-vitro penetration of dexmedetomidine in formulations 43, 45 and 48 relative to the amount of dexmedetomidine in the patch are summarized in Table 20. Formulations 45 and 48, which contain levulinic acid and oleic acid, demonstrate a substantial enhancement in permeation of dexmedetomidine under in-vitro condition.

TABLE 20

| Formulation No. | Formulation names | Amount of dexmedetomidine base in patch (μg) | % Permeation of dexmedetomidine base relative to the amount of drug in patch after 7 days | No. of replicates |
|---|---|---|---|---|
| Formulation 43 | 3% DMT/15% DT2353/DT2287 | 690 ± 27 | 18 ± 4 | 4 |
| Formulation 45 | 3% DMT/5% Oleic acid/DT2287 | 486 ± 11 | 52 ± 4 | 4 |
| Formulation 48 | 3% DMT/4% Levulinic acid/DT2287 | 573 ± 39 | 74 ± 5 | 5 |

The solubility of dexmedetomidine in hydroxyl functionalized acrylate polymer was less than 1%. In order to increase the dexmedetomidine, an acid functionalized acrylate polymer (e.g., Duro-Tak2353), oleic acid and levulinic acid were used. The solubility of dexmedetomidine in Duro-Tak2353, oleic acid and levulinic acid was about 10-15%, 40% and 60% respectively. The amount of acid added in the formulation was adjusted according to the solubility of each component in the formulation.

After preparation, the crystal presence was examined using microscope. Results obtained from this microscope examination indicated that all formulations (Formulations 41 to 48) did not contain crystals.

The flux profile of all formulations (Formulations 41 to 48) showed a clear increasing trend in flux with time during the first 24 hours (FIGS. 16 to 18). This is followed by a gradual decrease in flux with time. As such, the increase in flux during the first 24 hours may, in certain instances, be useful for achieving a rapid higher initial therapeutic concentration in the body. Where there is a decrease in flux with time, the decrease in flux could be due to the crystallization of the drug in the adhesive induced by the absorbed water in the patch.

Example 14

In-Vitro Flux Obtained from Different Backings

Pressure-sensitive adhesives used in this example are polyisobutylene/polybutene (PIB/PB) adhesives. The PIB/PB adhesives are mixtures of high molecular weight PIB (5% Oppanol B100), low molecular weight PIB (25% Oppanol B12) and a polybutene tackifier, e.g., Indopol H1900 or Panalane H-300e (20%), in an organic solvent, e.g., heptane (50%). The combination was mixed for about 3 days, until the mixture was homogeneous. Example dexmedetomidine transdermal composition formulations are shown in Table 21. Same formulation was coated on release liner but laminated with three different backing materials: backing 1 has a MVTR value (g/m²/24 hr) around 10, Backing 2 has a MVTR value around 50 (g/m²/24 hr), and backing 3 has MVTR value around 150(g/m²/24 hr).

Figure 19:
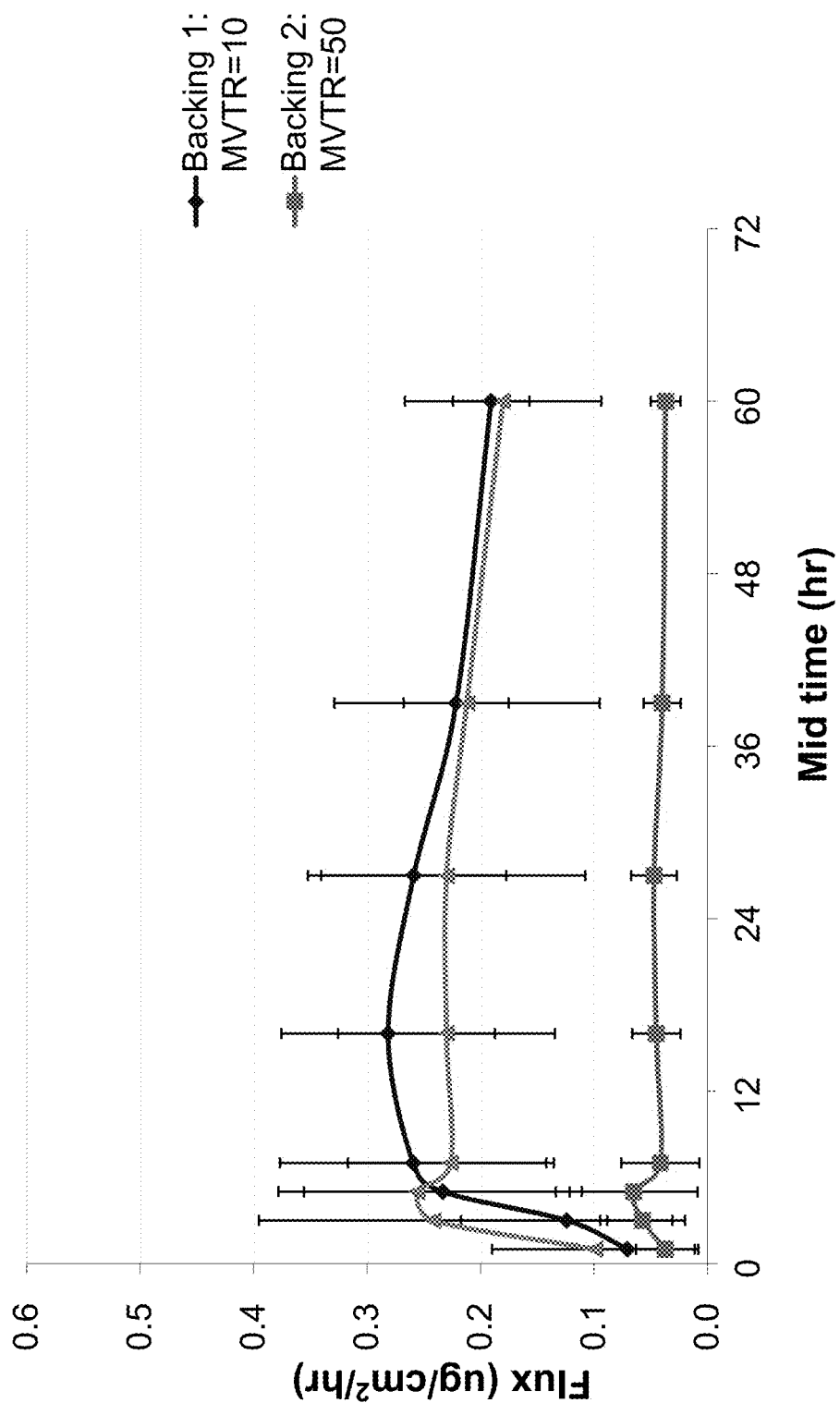
FIG. 19 shows the average dexmedetomidine in-vitro skin flux with respect to time from various formulations.

The average dexmedetomidine in-vitro skin flux with respect to time is illustrated in FIG. 19. As depicted in FIG. 19, dexmedetomidine in-vitro skin flux was similar for backing 1 and 2. But it is significantly lower with backing 3.

TABLE 21

| Components | % w/w |
|---|---|
| Dexmedetomidine | 1.00 |
| PVP-CLM | 20.00 |
| PIB/PB (Indopol H1900) | 79.00 |

Example 15

In-Vitro Flux Obtained from Formulations with Lauryl Lactate as Enhancer

Figure 20:
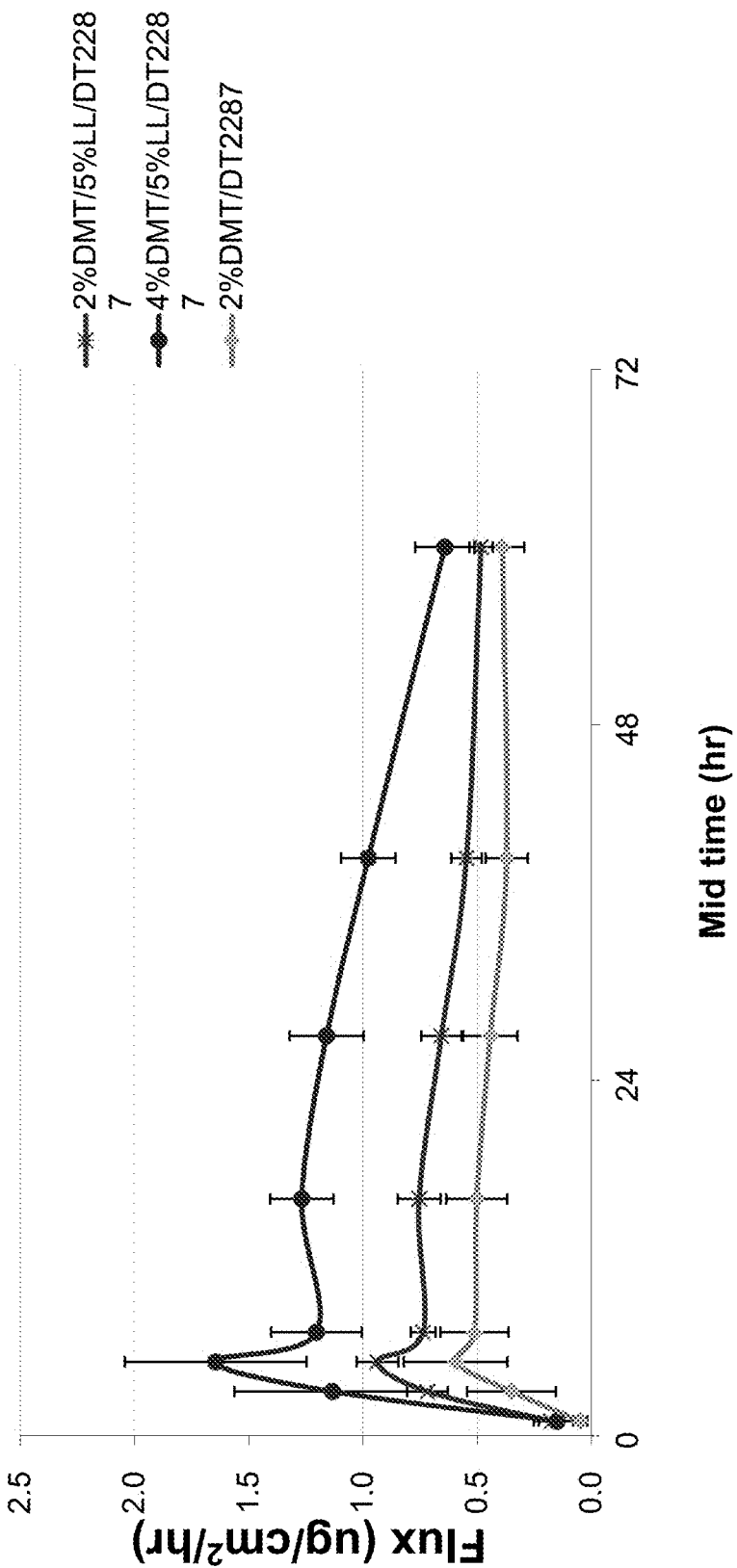
FIG. 20-21 show the flux on two different skin samples from various formulations.
Figure 21:
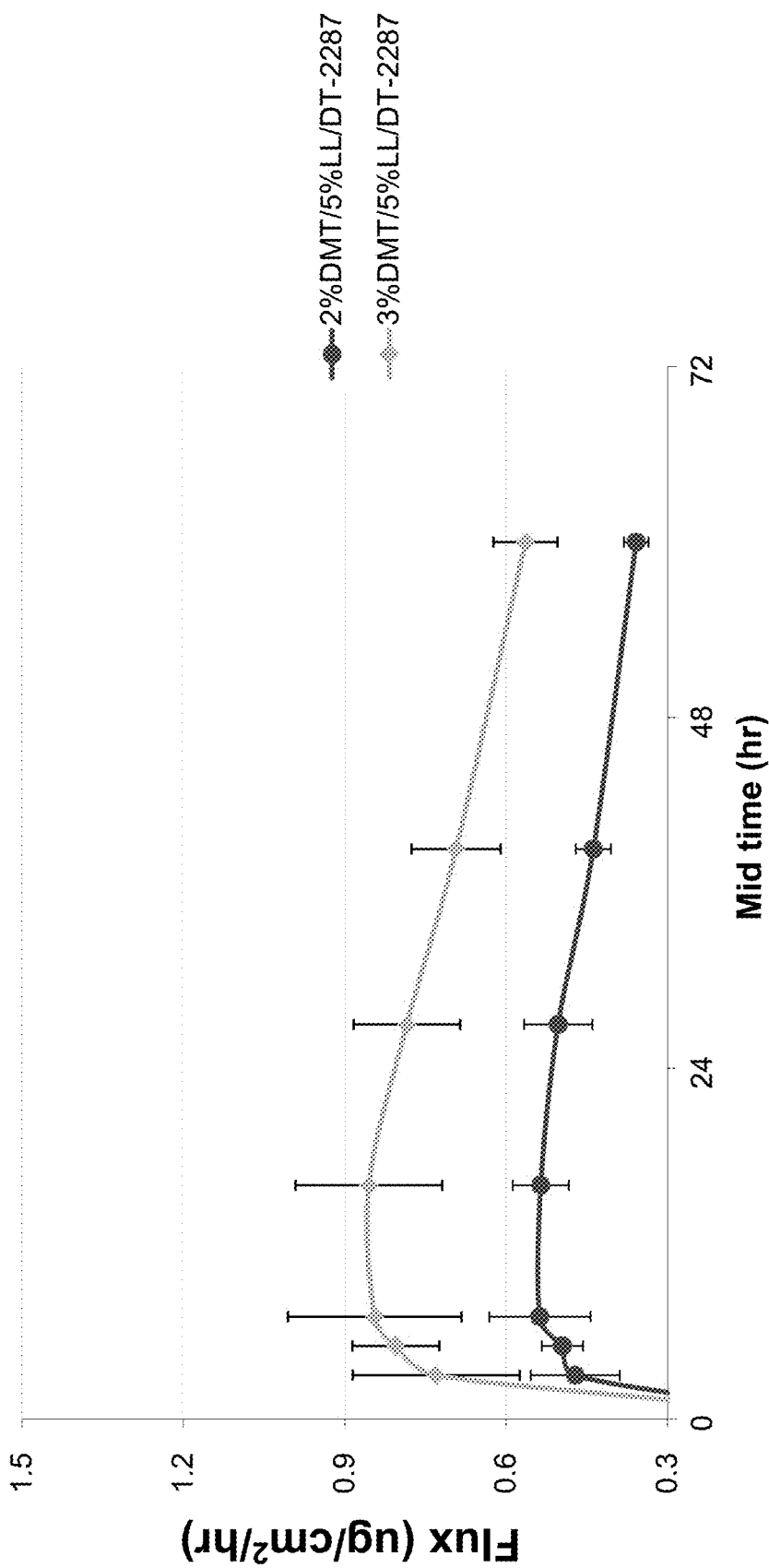

Another set of examples of dexmedetomidine transdermal formulation include transdermal compositions having 2-4% w/w dexmedetomidine with an enhancer to improve skin permeability. In these formulations, lauryl lactate (LL) and Duro-Tak 87-2287 were employed. The formulation compositions are shown in Table 22. In-vitro flux profiles for transdermal compositions. FIGS. 20 and 21 show the flux on two different skin samples. From the in-vitro flux profiles, LL shows its skin permeability enhancement effect. The flux is also proportional to API loading.

TABLE 22

| Components | % w/w | | | |
|---|---|---|---|---|
| Dexmedetomidine base | 2 | 2 | 3 (TPU-006) | 4 |
| Lauryl lactate | 0 | 5 | 5 | 5 |
| Pressure Sensitive Adhesive Duro-Tak 87-2287 | 98 | 93 | 92 | 91 |

Example 16

Dexmedetomidine Transdermal System for Post-Operative Analgesia Following Bunionectomy A randomized, double-blind, placebo-controlled, single-dose study of dexmedetomidine transdermal system (DMTS) such as described above or matching placebo patches over a 3-day period is performed. The DMTS provides extended release of dexmedetomidine over a 3-day application period. Each DMTS has a surface area of 3 cm² and contains 0.73 mg of dexmedetomidine. In this study, subjects receive 2 DMTS for a total dexmedetomidine dose of 1.46 mg. Excipients in the DMTS include lauryl lactate and an acrylate-based copolymer. The matching placebo patch is identical to the DMTS, except it contains no dexmedetomidine.

Subjects scheduled for surgical correction of unilateral hallux valgus (first metatarsal bunion, without accompanying hammertoe), are screened up to 28 days prior to surgery. Eligible subjects are randomized in a 1:1 ratio to receive 2 DMTS or 2 matching placebo patches and reside at the clinical study unit starting the day prior to surgery through 3 days post-surgery. The surgery is performed in a hospital or outpatient surgery center. The surgical procedure (i.e., Austin bunionectomy) and the intra-operative anesthesia (Mayo block) are standardized.

In this study, subjects receive 2 DMTS or 2 matching placebo patches, depending on randomization. On Day 1, 12±2 hours prior to the scheduled bunionectomy, patches are applied by trained study-site personnel to a non-hairy portion of the subject's upper arm. The DMTS/matching placebo patches are applied following an overnight fast (in accordance with the surgical center's requirements for surgery). The 2 DMTS/matching placebo patches are worn for 3 days.

Following surgery and the immediate post-operative recovery period, subjects return to the clinical study unit. During the 3-day post-operative period in the clinical study unit, recovery procedures are standardized (including use of rescue analgesic medication); and the following are performed: pain assessments (utilizing the NRS), sedation-level assessments, safety assessments (vital signs including oxygen saturation [SpO2]), patch adhesion, and skin irritation. In addition, plasma concentration of dexmedetomidine is obtained for a subset of subjects.

During the treatment period, subjects receive a 3-day application of 2 DMTS (dose of 1.46 mg) or 2 matching placebo patches. As needed, subjects receive rescue analgesic medications.

The procedures and assessments described below are performed during the treatment period; in addition to these procedures, AEs, vital signs, and concomitant medications will be assessed on all study days.

On Day 1, pain intensity is scored by the subject, sedation level is assessed by the investigator/site staff, and use of rescue analgesic medication is assessed starting 4 hours after surgery; blood samples are collected for PK analysis; and adhesion is evaluated.

On Days 2 and 3, pain intensity is scored by the subject, sedation level is assessed by the investigator/site staff, use of rescue analgesic medication is assessed, blood samples are collected for PK analysis, and patch adhesion is evaluated.

On Day 4, prior to DMTS/matching placebo patch removal, pain intensity is scored by the subject, sedation level is assessed by the investigator/site staff, use of rescue analgesic medication is assessed, a blood sample is collected for PK analysis, and patch adhesion is evaluated. Then, the DMTS/matching placebo patches are removed. After patch removal, blood samples are collected for PK analysis; cardiac telemetry monitoring is discontinued; and the patch application site is assessed for skin irritation (1 hour after patch removal; a follow-up visit will be scheduled if the skin irritation score is >0). After the 1-hour skin irritation assessment, any visible residue from the patch application area is removed with a damp cloth.

After completion of all study procedures, on Day 4, subjects are discharged from the clinic.

In the above study, use of DMTS as described above is observed to effectively manage patient pain arising from bunionectomy.

Example 17

TPU-006 for Post-Operative Analgesia Following Bunionectomy

A Phase 2 proof of concept (POC) study of TPU-006, a 3-day dexmedetomidine transdermal patch (formulation provided above), was conducted to determine the effectiveness of the patch for the management of post-surgical pain resulting from bunionectomy. Specifically, the double-blind, placebo-controlled, single-dose study evaluated the analgesic efficacy and safety of TPU-006 after bunionectomy surgery. A total of 87 patients had patches applied (either active or placebo).

The preliminary results demonstrated that TPU-006 provided effective pain control across several parameters and produced no unexpected safety events in a postoperative setting. Treatment with TPU-006 showed statistically significant key findings for lower pain scores and reduced use of opioid rescue medication compared with placebo, over the course of the study. TPU-006 was well tolerated, with no unexpected serious adverse events, minimal to no application site skin irritation, or drowsiness. Patients treated with TPU-006 experienced less constipation and nausea due to reduced use of opioid rescue medication.

TPU-006 was shown to offer a potential to improve current post-operative or chronic pain management practices. TPU-006 was also shown to provide a much-needed strategy to reduce the use of narcotic painkillers. The ease of administration (application and removal), as seen in this study, means that the TPU-006 patch can be used in both the inpatient and outpatient setting.

Example 18

Transdermal Dexmedetomidine for Post-Operative Analgesia Following Bunionectomy

A 3-day dexmedetomidine transdermal delivery device (2×3 $cm^2$ patch) having a dexmedetomidine composition and pressure sensitive adhesive as described above was employed to study the effectiveness of the patch for the management of post-bunionectomy surgical pain. Specifically, a double-blind, placebo-controlled, single-dose study evaluated the analgesic efficacy and safety of the dexmedetomidine transdermal delivery device after bunionectomy surgery. Patches were applied to 87 patients, where the patches were either dexmedetomidine patches or placebo. Each transdermal delivery device was applied to the subject between 10 hours and 14 hours before each patient underwent Austin bunionectomy surgery with standard intraoperative anesthesia. The transdermal delivery devices exhibited little to no skin irritation and subjects were well-hydrated and experienced low levels of constipation and nausea.

Pain was evaluated in patients at times from immediately after surgery through 72 hours after surgery using the Pain Intensity Numeric Rating Scale (NRS) and Summed Pain Intensity (NRSSPI). Pain was also evaluated based on the time and first use of rescue pain medication as well as total use of rescue medication.

Figure 22:
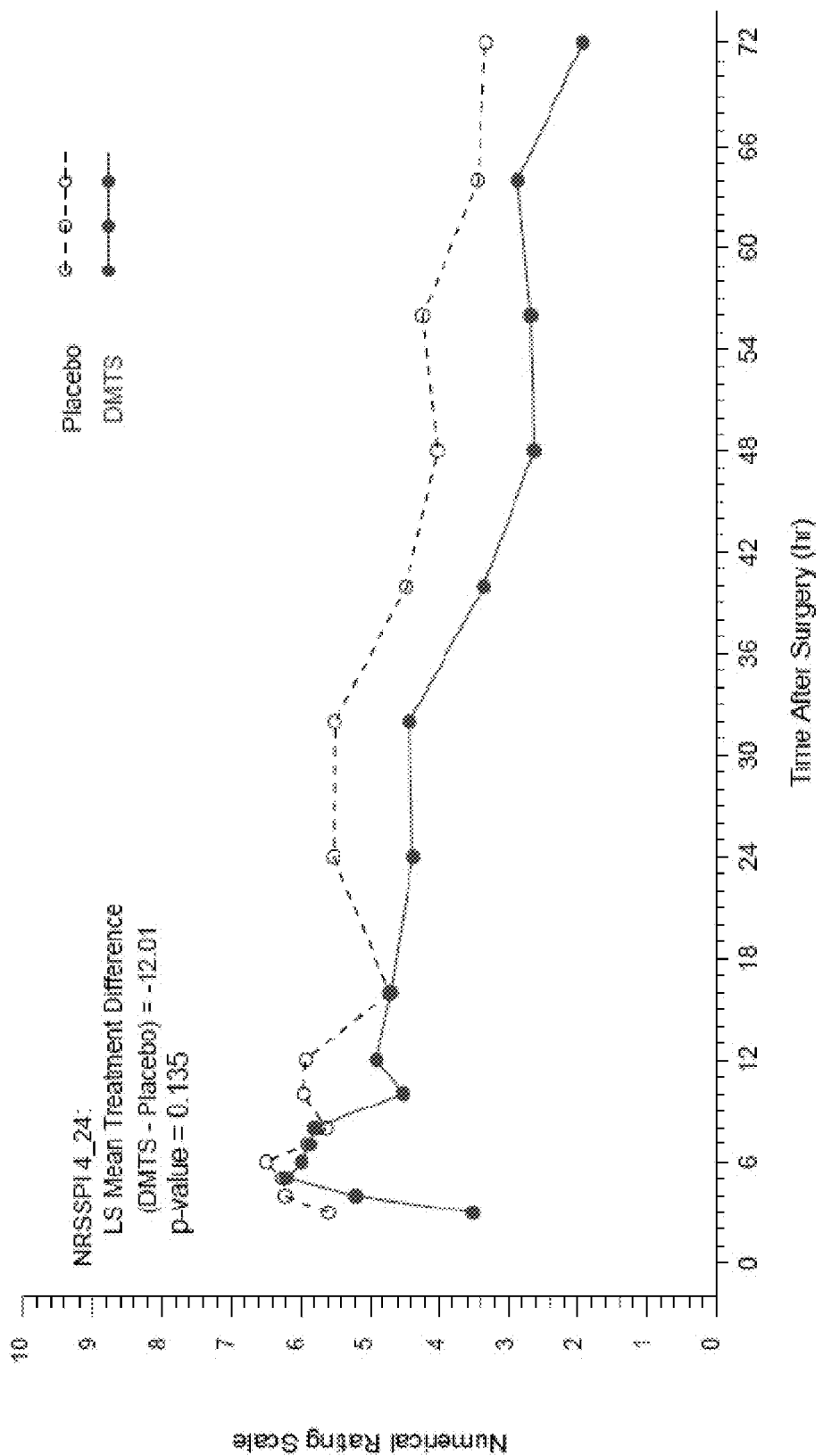
FIG. 22 depicts a comparison of pain ratings of patients following application of a transdermal delivery device containing dexmedetomidine as compared to placebo according to one embodiment.
Figure 23:
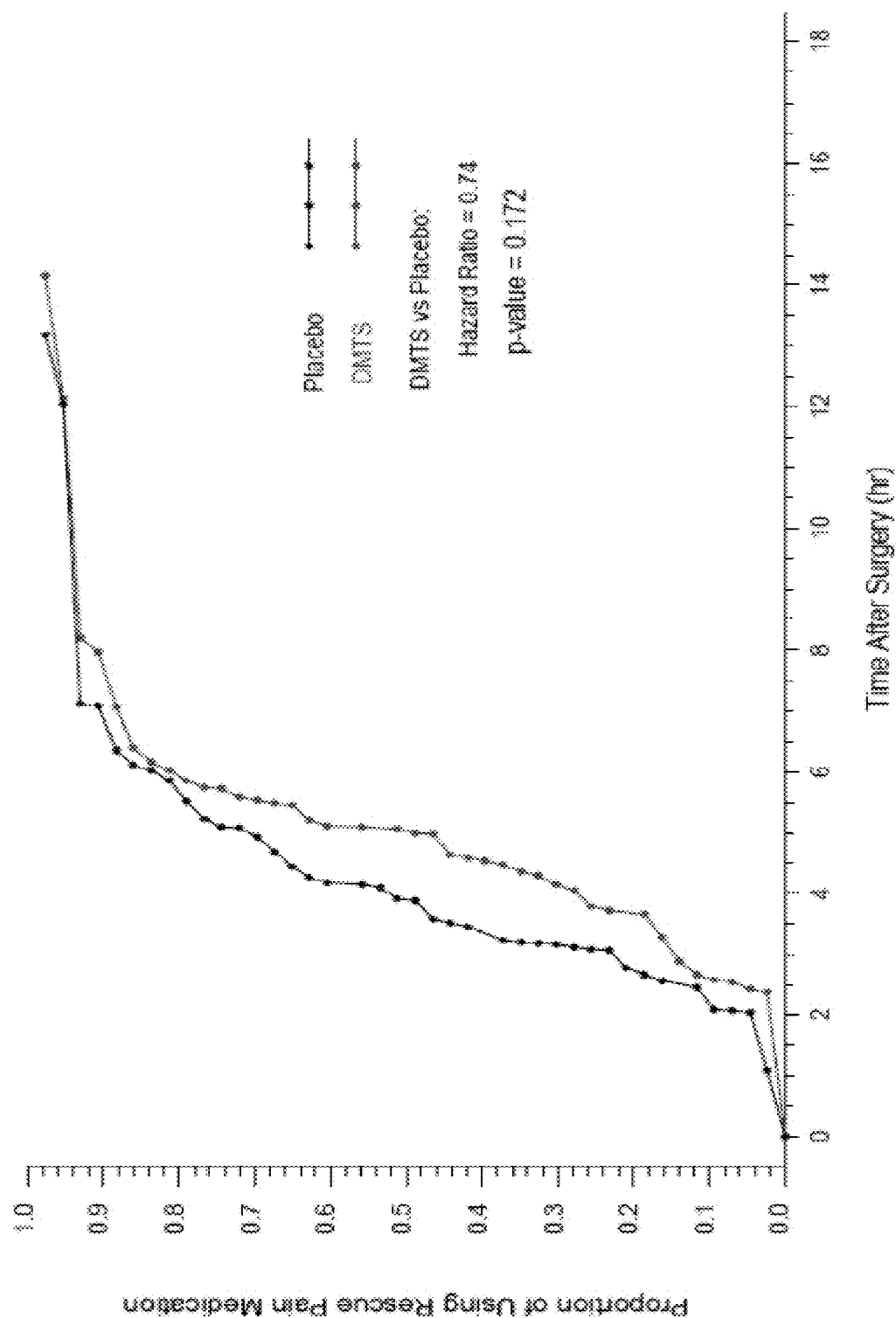
FIG. 23 depicts the use of rescue medication over time after surgery by patients following application of a transdermal delivery device containing dexmedetomidine as compared to placebo according to one embodiment.

Results from the study demonstrated that transdermal delivery devices having a dexmedetomidine composition provided effective pain control across several parameters and produced no unexpected safety events in a postoperative setting. FIG. 22 depicts the control of pain intensity over time comparing the Numerical Rating Scale of patients with the dexmedetomidine containing transdermal delivery device as compared to placebo. As depicted in FIG. 22, patients administered dexmedetomidine exhibited lower pain rating through 72 hours after surgery as compared to those administered placebo. In addition to having a lower pain rating, a lower proportion of patients with applied patches having the dexmedetomidine composition requested rescue medication in the first six hours after surgery. Patients with patches having dexmedetomidine also request rescue medication less frequently as compared to placebo. FIG. 23 depicts the time to first use of rescue medication for comparing patients with transdermal delivery devices having the dexmedetomidine containing composition and placebo. As shown in FIG. 23, patients with placebo patches requested rescue medication earlier than those with dexmedetomidine-containing patches. Table 23 below summarizes the use of rescue medication (oxycodone) by patients applied placebo transdermal delivery devices and those patients applied transdermal delivery devices containing dexmedetomidine. As summarized in Table 23, fewer patients requested rescue medication when applied with the transdermal delivery devices containing dexmedetomidine than when applied with the placebo patch at time all time periods tested (0 to 24 hours; 0 to 48 hours and 0 to 72 hours).

TABLE 23

| | | Placebo (n = 43) | Dexmedetomidine (n = 43) |
|---|---|---|---|
| 0 to 24 Hours after Surgery | Mean (SD) (Min, Max) p-value | 28.3 (13.08) (0, 52.5) | 23.5 (11.98) (0, 60) 0.087 |
| 0 to 48 Hours after Surgery | Mean (SD) (Min, Max) p-value | 47.6 (22.96) (0, 82.5) | 37.5 (22.74) (0, 105) 0.044 |
| 0 to 72 Hours after Surgery | Mean (SD) (Min, Max) p-value | 60 (31.69) (0, 112.5) | 46.4 (30.80) (0, 112.5) 0.048 |

Figure 24A:
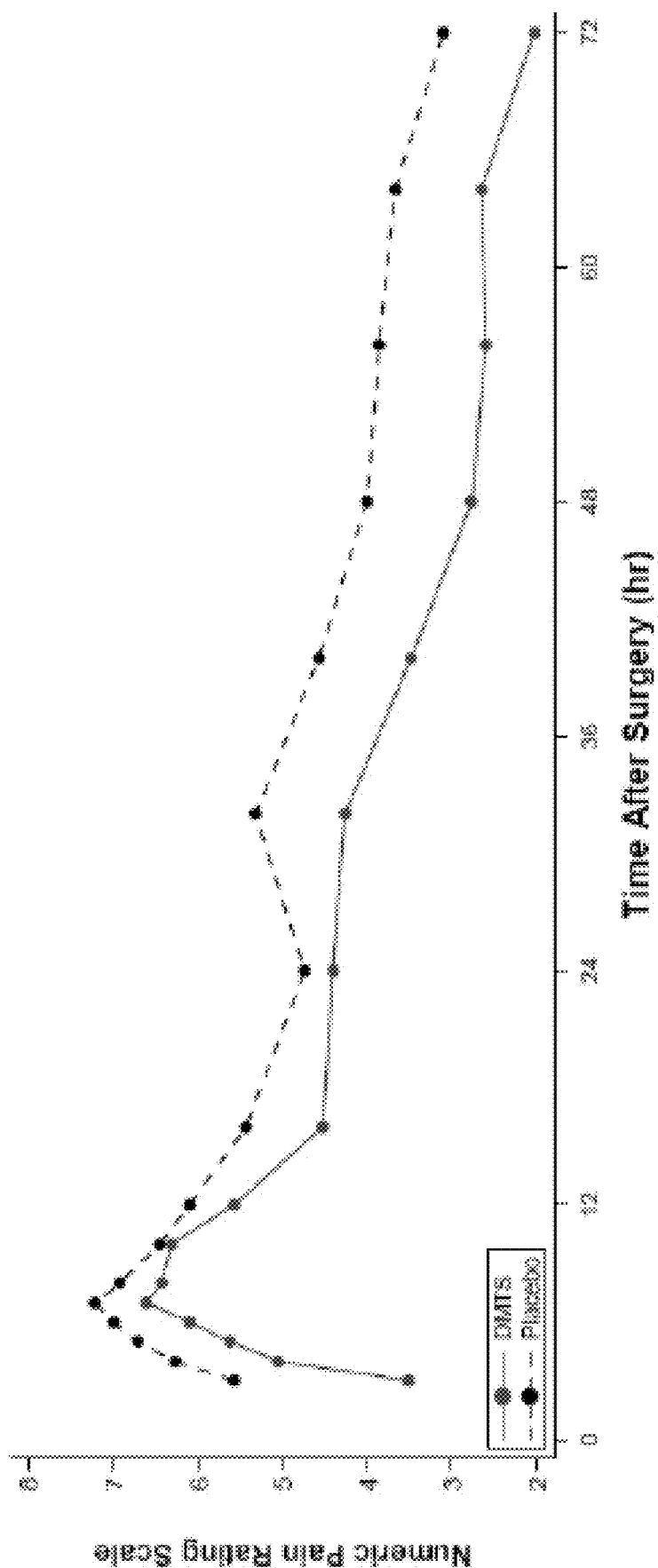
FIG. 24A depicts a comparison of pain ratings of patients following application of a transdermal delivery device containing dexmedetomidine as compared to placebo according to another embodiment.
Figure 24B:
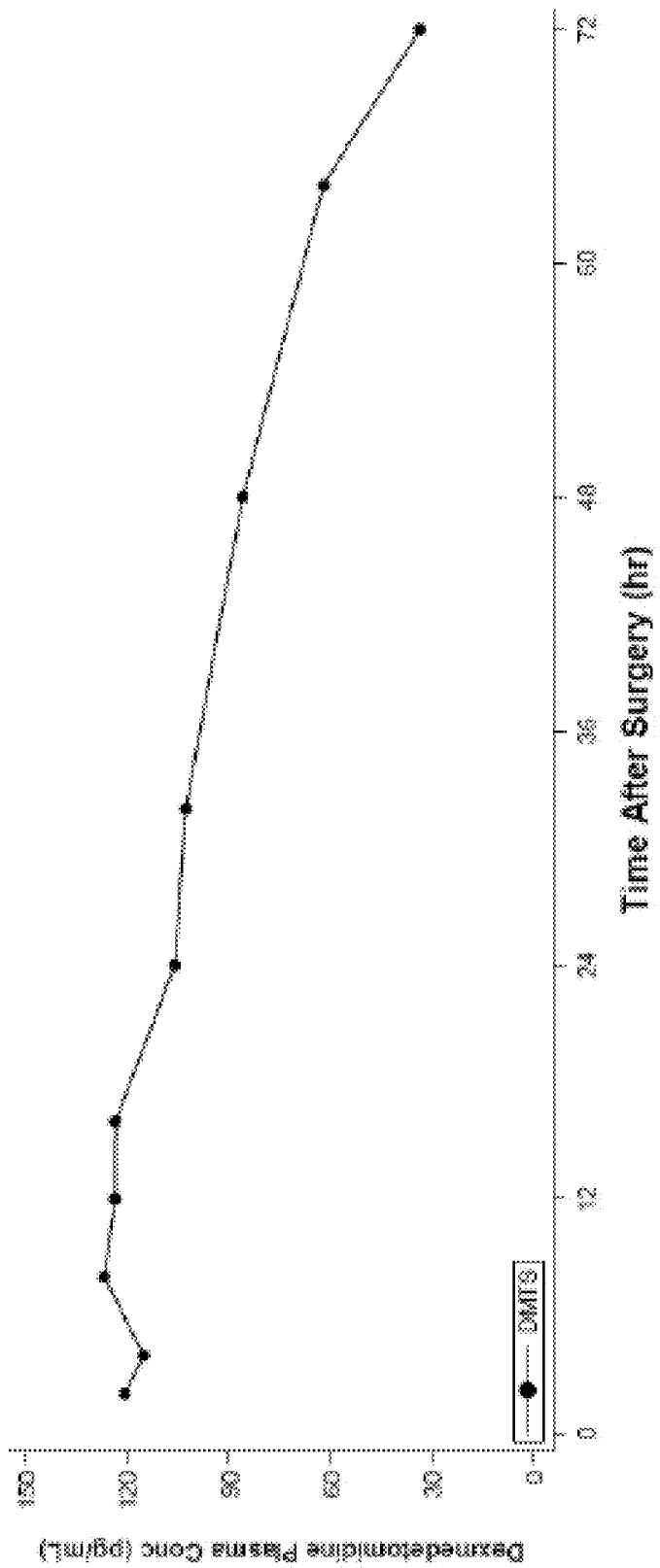
FIG. 24B depicts the plasma concentration of dexmedetomidine in patients following application of a transdermal delivery device containing dexmedetomidine according to another embodiment.

The pharmacokinetic parameters of dexmedetomidine administration with the transdermal delivery device were also evaluated in conjunction with the pain assessment described above. The mean plasma dexmedetomidine concentration was highest on the first day after surgery and lowest on the third day. FIGS. 24A-B compare the relationship between mean plasma dexmedetomidine concentration and imputed numerical summed pain intensity. FIG. 24A, depicts the numerical pain rating (last observation carried forward imputed, LOCF imputed to adjust for contribution of rescue med to NRSPI) from patients applied transdermal delivery devices having the dexmedetomidine composition and placebo. FIG. 24B depicts the plasma concentration of dexmedetomidine in patients applied with the transdermal delivery device having the dexmedetomidine composition. As demonstrated by FIGS. 24A-24B, the pain intensity difference between dexmedetomidine and placebo was constant over a 4-fold mean plasma dexmedetomidine concentration range. In other words, the pain intensity reduction effect of dexmedetomidine remains almost constant over an approximately 4-fold difference in plasma concentration.

Figure 25:
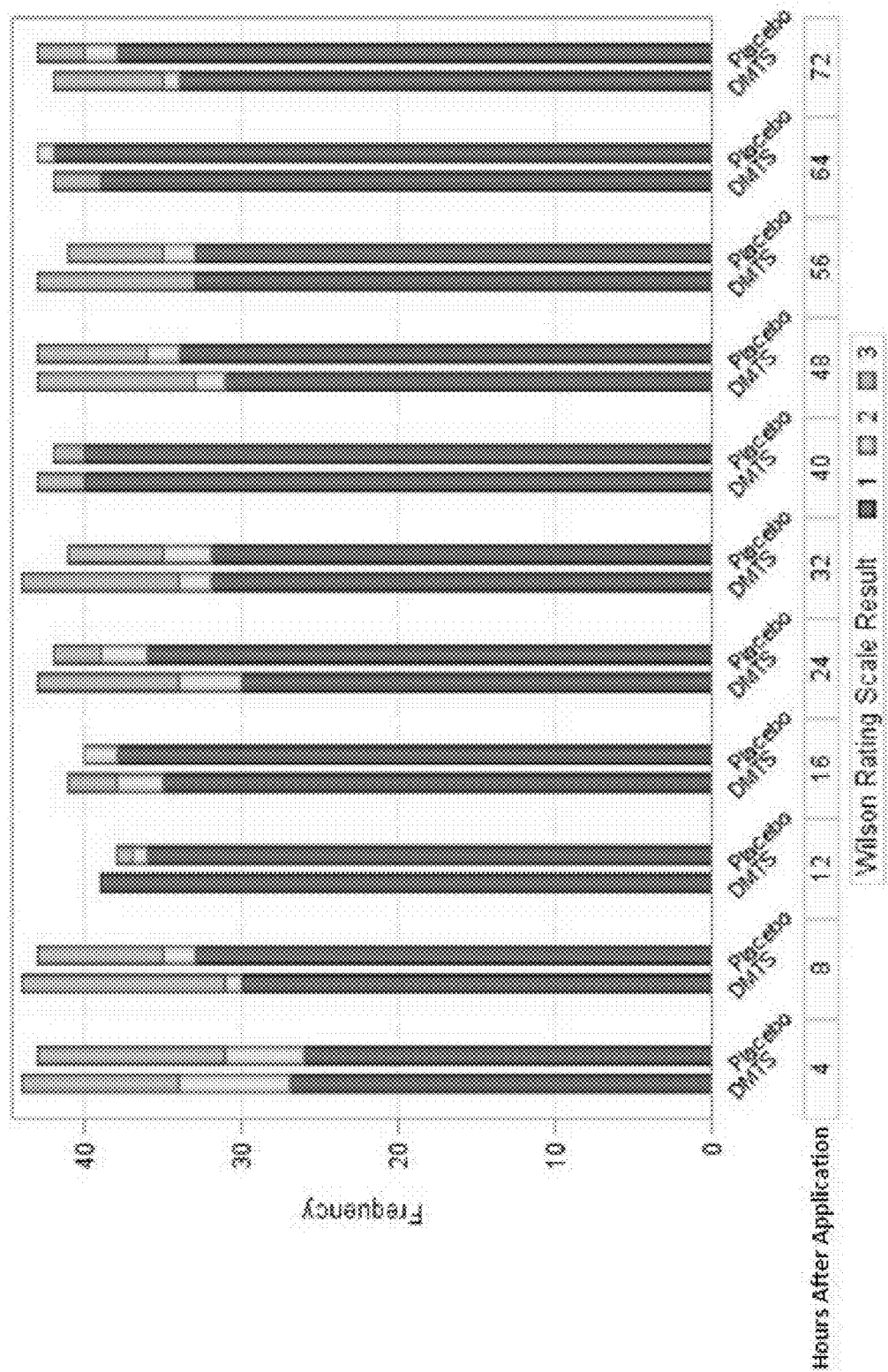
FIG. 25 depicts the sedation of patients applied with the transdermal delivery device containing dexmedetomidine as compared to those applied with a placebo patch according to the Wilson Sedation Rating Scale according to an embodiment.

FIG. 25 depicts the sedation of patients applied with the transdermal delivery device containing dexmedetomidine as compared to those applied with a placebo patch according to the Wilson Sedation Rating Scale. As shown in FIG. 25, the transdermal delivery devices containing dexmedetomidine applied to the subjects exhibited the above-described reduction in pain with a non-sedative amount of dexmedetomidine.

Example 19

Pharmacokinetic and Pharmacodynamic Evaluation of Transdermal Delivery Devices containing Dexmedetomidine in Human Subjects Methods Part 1 was an open-label, single ascending dose study and Part 2 was a randomized cross-over study that compared DMTS (dexmedetomidine transdermal delivery device) (at or below the maximum tolerated dose (MTD)) to an IV dose of PRECEDEX™ dexmedetomidine IV infusion (1 µg/kg) administered over 10 minutes.

Part 1 of the study was designed to evaluate escalating doses of DMTS until an MTD was determined. Three subjects were to be enrolled in each dose cohort. If deemed appropriate, doses could be repeated. Upon reaching the MTD, one additional cohort was to be enrolled with subjects having a BMI≥18 kg/m² and <22 kg/m². Each subject was to receive a 3-day application of the DMTS followed by a 3-day washout period (which started when the patch was removed). In the first dose cohort (Cohort 1), subjects received 2 DMTS. If the 2 DMTS in Cohort 1 were not tolerated, the dose was to be reduced to 1 DMTS in Cohort 2. If 1 DMTS was not tolerated in Cohort 2, the study was to be stopped. If, instead, the 2 DMTS in Cohort 1 were tolerated, the dose was to be increased by 1 DMTS in the next cohort and subjects in Cohort 2 would each receive 3 DMTS. With each subsequent cohort, the dose was to be increased by 1 DMTS as long as the dose in the previous cohort was tolerated. In this manner, the dose was to be increased up to a maximum of 8 DMTS. If at any time, a dose was not tolerated, dose escalation was to be stopped, and the dose tolerated by the previous cohort was to be considered the MTD. DMTS dose escalation only occurred after a safety monitoring committee had reviewed 72-hour safety data from the immediately preceding cohort and found that the dose had been tolerated. If deemed appropriate, additional subjects could be enrolled to obtain additional safety data and enable a decision regarding dose escalation.

In Part 2 of the study, 12 subjects, with a BMI of 22 to 29 kg/m2, inclusive, were to be enrolled and randomized to one of the following treatment sequences:

Sequence A: PRECEDEX™ dexmedetomidine IV infusion, 2 DMTS (6 cm2)

Sequence B: 2 DMTS (6 cm2), PRECEDEX™ dexmedetomidine IV infusion

All 12 subjects were to receive 2 DMTS and an intravenous (IV) dose of PRECEDEX™ dexmedetomidine IV infusion; the 2 doses were separated by a 3-day washout period. The washout period was based on the plasma half-life (T %) of dexmedetomidine following administration of DMTS, determined in Study TPU-DMT-01-1501, as well as adverse events (AEs) observed during the 72-hour period following discontinuation of the DMTS. For both Part 1 and Part 2 of the study, subjects were screened up to 28 days prior to study drug administration. Eligible subjects were housed in the clinic during the study in order to collect blood for determination of plasma concentrations of dexmedetomidine. Assessments of sedation level, safety, and patch adhesion were also performed throughout the study.

Each DMTS had a surface area of 3 cm² and contained 0.73 mg of dexmedetomidine. In Part 1, subjects received 2 DMTS in Cohorts 1 and 2, 1 DMTS in Cohorts 3 and 4, 2 DMTS in Cohort 5, 3 DMTS in Cohort 6, 4 DMTS in Cohort 7, and 3 DMTS in Cohort 8. In Part 2, subjects received 2 DMTS. In both parts of the study, each DMTS was applied on Day 1 to a non-hairy portion of the upper arm and was to remain in place for 3 days.

Plasma concentrations of dexmedetomidine at each time point were summarized by cohort for Part 1 and by treatment for Part 2 using arithmetic mean, standard deviation (SD), median, range, 95% confidence interval, geometric mean, and coefficient of variation (% CV).

Pharmacokinetic and Pharmacodynamic Results

In Part 1 of the study, across the 8 cohorts, geometric mean $C_{max}$ values ranged from 58.5 to 274 pg/mL and geometric mean $AUC_{0-inf}$ values ranged from 3353 to 11085 pg×h/mL, with these values generally increasing with dose. Median $T_{max}$ values ranged from 14 to 30 hours, and median $T_{1/2}$ ranged from 7.9 to
16.4 hours. In Part 2 of the study, with DMTS treatment, the geometric mean Cmax was 115.1 pg/mL, the geometric mean $AUC_{0-inf}$ was 6130 pg×h/mL, the median $T_{max}$ was 24.0 hours, and the median T½ was 12.1 hours.

In comparison, with PRECEDEX™ dexmedetomidine IV infusion treatment, the geometric mean $C_{max}$ was 993.3 pg/mL, the geometric mean $AUC_{0-inf}$ was 1478 pg×h/mL, the median $T_{max}$ was 0.17 hours, and the median $T_{1/2}$ was 2.0 hours. The mean (SD) clearance of dexmedetomidine (determined following PRECEDEX™ dexmedetomidine IV infusion treatment) was 54.6 (9.46) L/h. The geometric mean bioavailability of DMTS (6 cm²) was determined to be 330.8 μg, and the corresponding dose rate was 4.6 μg/h.

In Part 1, across all cohorts, sedation levels at most time points were consistent with a Wilson sedation score of 1 (fully awake and oriented). In all cohorts, scores of 2 (drowsy) or 3 (eyes closed but rousable to command) were observed at occasional time points. No subject in any cohort at any time point had a sedation score of 4 (eyes closed but rousable to mild physical stimulation) or 5 (eyes closed and unrousable to mild physical stimulation).

In Part 2, during DMTS (6 cm²) treatment, most of the 11 subjects had a Wilson sedation score of 1 at all time points; no more than 2 subjects had scores of 2 or 3 at any time point, and no subject had a score of 4 or 5 at any time point. With PRECEDEX™ dexmedetomidine IV infusion treatment, the majority of subjects had a Wilson sedation score of 2 at the end of the infusion, followed by scores of 2 or 3 at the 1-hour post-infusion time point and a score of 2 at the 2-hour post-infusion time point. After the 2-hour time point, most subjects had a score of 1, except at the 4-hour post-infusion time point, when the majority of subjects had scores of 2 or 3.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of managing post-operative pain in a non-sedated subject, the method comprising:
applying a transdermal delivery device to a skin surface of a non-sedated subject 2 to 14 hours before undergoing surgery, the transdermal delivery device maintaining contact with the skin surface for 72 hours or more after application to the skin surface, the transdermal delivery device comprising:
a dexmedetomidine composition comprising dexmedetomidine and a pressure sensitive adhesive; and
a backing layer,
wherein:
the transdermal delivery device delivers a non-sedative amount of dexmedetomidine of from 50 μg/day to 350 μg/day to the subject;
the transdermal delivery device provides to the subject an average maximal plasma concentration of dexmedetomidine over 72 hours of from 50 μg/mL to 250 μg/mL; and
the method reduces, without sedation (Wilson Sedation Score of 1), the post-operative pain experienced by the subject by a constant amount over at least 72 hours after the surgery and for about 10 hours after the transdermal delivery device has been removed from the skin surface when the transdermal delivery device has been removed 72 hours after application to the skin surface.

2. The method according to claim 1, wherein the post-operative pain results from a bony model surgical procedure or a soft tissue model surgical procedure.

3. The method according to claim 2, wherein the post-operative pain results from an osteotomy.

4. The method according to claim 3, wherein the osteotomy is a bunionectomy.

5. The method according to claim 1, wherein the pressure sensitive adhesive is an acrylate pressure sensitive adhesive with pendant hydroxyl functional groups.

6. The method according to claim 5, wherein the dexmedetomidine composition further comprises a permeation enhancer.

7. The method according to claim 6, wherein the permeation enhancer is lauryl lactate.

8. The method according to claim 1, wherein the method further comprises administering an amount of a hydration fluid to the subject.

9. The method according to claim 1, wherein the transdermal delivery device has a surface area from 1 cm² to 10 cm².

10. The method of claim 1, wherein one transdermal delivery device is applied to the subject.

11. The method of claim 1, wherein two or more transdermal delivery devices are applied to the subject at the same time.

12. The method of claim 1, wherein two transdermal delivery devices are applied to the subject at the same time.

13. The method of claim 12, wherein each the transdermal delivery device has a surface area of 6 cm².

14. The method of claim 1, wherein the transdermal delivery device provides to the subject an average absorbed amount of dexmedetomidine over 72 hours from 100 μg to 400 μg.

15. The method of claim 1, wherein the transdermal delivery device provides to the subject an average area under the plasma dexmedetomidine concentration curve over 72 hours from 3,000 h×pg/mL to 10,000 h×pg/mL.

16. The method of claim 1, wherein the transdermal delivery device provides to the subject a peak flux from 0.6 μg/cm$^2$/hr to 5 μg/cm$^2$/hr.

17. The method of claim 16, wherein peak flux is reached from 2 to 24 hours after applying the transdermal delivery device to the skin surface of the subject.

18. The method of claim 1, wherein the transdermal delivery device provides to the subject a steady state average flux of dexmedetomidine of from about 0.005 to 2 μg/cm$^2$/hr at 24 hours after applying the transdermal delivery device to the skin surface of the subject.

19. The method of claim 1, wherein the amount of post-operative pain reduction is measured by the Numeric Pain Rating Scale, and the method reduces the rating of the Numeric Pain Rating Scale by about 1 over at least 72 hours after the surgery.

* * * * *